(12) United States Patent
Yatabe et al.

(10) Patent No.: US 6,633,287 B1
(45) Date of Patent: Oct. 14, 2003

(54) POWER SUPPLY CIRCUIT OF AN ELECTRO-OPTICAL DEVICE, DRIVING CIRCUIT OF AN ELECTRO-OPTICAL DEVICE, METHOD OF DRIVING AN ELECTRO-OPTICAL DEVICE, ELECTRO-OPTICAL DEVICE, AND ELECTRONIC EQUIPMENT

(75) Inventors: Satoshi Yatabe, Shiojiri (JP); Suguru Yamazaki, Suwa (JP); Katsunori Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 09/580,599

(22) Filed: May 30, 2000

(30) Foreign Application Priority Data

Jun. 1, 1999 (JP) ............................. 11-153982
Apr. 27, 2000 (JP) ........................ 2000-127285

(51) Int. Cl.[7] .................................. G09G 5/00
(52) U.S. Cl. .................... 345/211; 315/169.3
(58) Field of Search .................... 345/76, 77, 78, 345/79, 80, 81, 87, 88, 89, 90, 91, 92, 93, 94, 95, 96, 97, 98, 99, 100, 101, 102, 103, 104, 211, 212, 213, 204, 205; 315/169.3

(56) References Cited

U.S. PATENT DOCUMENTS

| | | | | |
|---|---|---|---|---|
| 4,733,228 A | * | 3/1988 | Flegal | 345/76 |
| 4,958,105 A | * | 9/1990 | Young et al. | 315/169.3 |
| 5,315,311 A | * | 5/1994 | Honkala | 345/76 |
| 5,559,402 A | * | 9/1996 | Corrigan, III | 315/169.3 |
| 5,594,305 A | * | 1/1997 | Primm et al. | 315/169.3 |
| 5,598,565 A | * | 1/1997 | Reinhardt | 713/323 |
| 5,929,847 A | * | 7/1999 | Yanagi et al. | 345/204 |
| 6,061,041 A | * | 5/2000 | Yoshida | 345/76 |
| 6,133,672 A | * | 10/2000 | Sasaki et al. | 310/318 |

FOREIGN PATENT DOCUMENTS

| | | |
|---|---|---|
| JP | 48-97028 A | 11/1973 |
| JP | 07-120718 | 5/1995 |
| JP | 09-237070 | 9/1997 |
| JP | 10-262366 | 9/1998 |
| JP | 11-289778 | 10/1999 |

* cited by examiner

*Primary Examiner*—Steven Saras
*Assistant Examiner*—Leland Jorgensen
(74) *Attorney, Agent, or Firm*—Oliff & Berridge, PLC

(57) ABSTRACT

A power supply circuit is provided for supplying a scanning line selection voltage to an electro-optical device. The electro-optical device includes pixels disposed at intersections between a plurality of scanning lines and a plurality of data lines, a voltage generation circuit for generating a selection voltage having a positive polarity (or a negative polarity) with respect to the center voltage of voltages applied to the data lines, a capacitor for storing the selection voltage, and an inverter circuit for inverting the polarity of the voltage stored in the capacitor with respect to the median voltage, and outputting the resultant voltage as a selection voltage having a negative polarity (or a positive polarity if the selection voltage has a negative polarity).

20 Claims, 33 Drawing Sheets

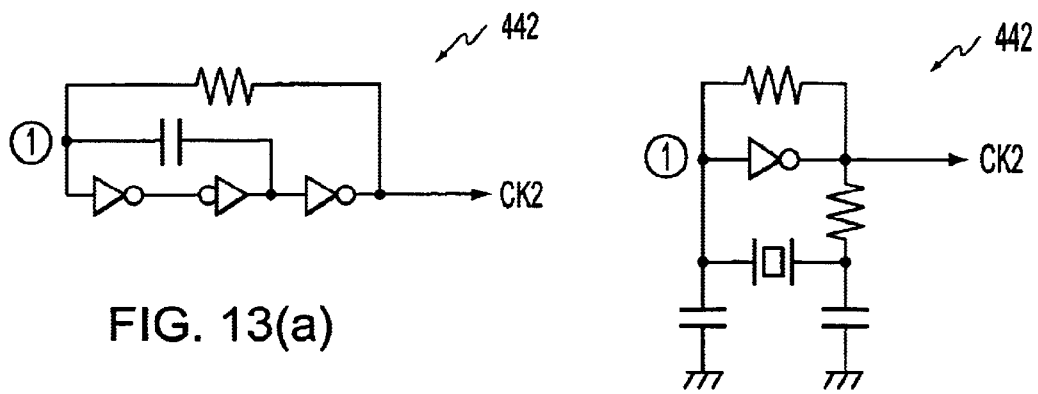
FIG. 13(a)
FIG. 13(b)
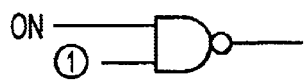
FIG. 13(c)
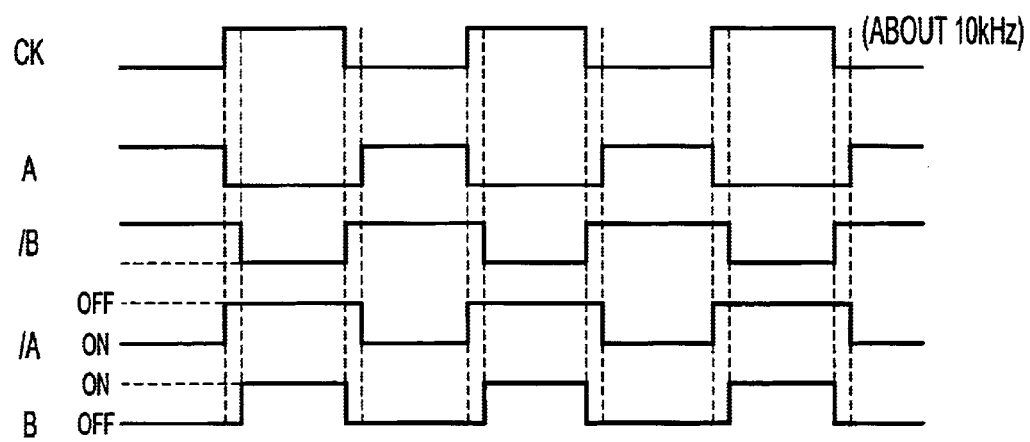
FIG. 14

POWER SUPPLY CIRCUIT OF AN ELECTRO-OPTICAL DEVICE, DRIVING CIRCUIT OF AN ELECTRO-OPTICAL DEVICE, METHOD OF DRIVING AN ELECTRO-OPTICAL DEVICE, ELECTRO-OPTICAL DEVICE, AND ELECTRONIC EQUIPMENT

BACKGROUND OF THE INVENTION

1. Field of Invention

The present invention relates to a power supply circuit of an electro-optical device, a driving circuit of an electro-optical device, a method of driving an electro-optical device, an electro-optical device, and an electronic equipment, in which a reduced number of components are mounted.

2. Description of Related Art

In general, electro-optical devices can be classified into various types according to the driving method or the electrode structure. In an electro-optical device of the simplest type, a plurality of scanning electrodes (scanning lines) are formed on one substrate, a plurality of data electrodes (data lines) are formed on the other substrate, and an electro-optical material such as a liquid crystal is disposed between these two substrates, whereby an image is displayed by means of an electro-optical change caused by a potential difference between the two electrodes.

In such an electro-optical device, a selection voltage required to drive the electro-optical material is generally in the range of 20 to 25 V, which is much higher than input voltages of 3 to 5 V applied to logic circuits. In order to obtain such a high selection voltage, electro-optical devices generally include a power supply circuit using a charge pump circuit which generates the selection voltage by stepping up a voltage supplied from a single power supply.

However, the technique of generating the selection voltage using the charge pump circuit needs as many capacitors as the voltage stepping-up factor. In electro-optical devices, as described above, the input voltage has to be stepped up by a large factor to obtain the selection voltage, and thus the charge pump circuit needs a large number of capacitors.

Capacitors used in power supply circuits are generally large in size, and thus it is difficult to form them on semiconductor substrates. In most cases, therefore, capacitors of power supply circuits are not integrated on semiconductor chips, but they are instead mounted as external components. Therefore, if a large number of capacitors are used, the result is an increase in the total cost and an increase in complexity of the assembly process which causes a reduction in the production efficiency.

SUMMARY OF THE INVENTION

In view of the above problems, it is an object of the present invention to provide a power supply circuit of an electro-optical device, a driving circuit of an electro-optical device, a method of driving an electro-optical device, an electro-optical devices and an electronic equipment using an electro-optical device, which need a less number of externally mounted components and thus which allows simplification of the assembly process and a reduction in cost.

According to a first aspect of the present invention, to achieve the above object, there is provided a power supply circuit for supplying a potential to an electro-optical device which includes a plurality of scanning lines and a plurality of data lines, the scanning lines crossing the data lines, and the potential serving as a selection voltage for selecting a scanning line. The power supply circuit may consist of a voltage generation circuit for generating one of a selection voltage having a positive polarity and a selection voltage having a negative polarity, defined with respect to a median value of signal voltages applied to the data lines; a voltage storage element for storing a voltage based on the one selection voltage generated by the voltage generation circuit; and an inverter circuit for inverting the polarity of the voltage stored in the voltage storage element with respect to a predetermined reference value and outputting the inverted voltage as another one of the selection voltage having a positive polarity and the selection voltage having a negative polarity. The voltage generation circuit may consist of a switching element; and an inductor that stores electric power between a first input voltage and a second input voltage when the switching element turns on, and that releases the stored electric power when the switching element turns off, whereby, using the electric power released from the inductor, the voltage generation circuit generates the one of selection voltage having a positive polarity and the selection voltage having a negative polarity with respect to the median value of signal voltages applied to the data lines.

In the power supply circuit according to the first aspect, either one of the selection voltages having positive and negative polarities applied to the scanning lines is generated by the voltage generation circuit using electric power which is released from the inductor when the switching element is turned off. This allows the one selection voltage to become greater than the difference between the first and second input potentials. Furthermore, in the power supply circuit according to the first aspect, the other selection voltage is generated by the inverter circuit by inverting the polarity of the one selection voltage stored in the voltage storage element after being generated by the voltage generation circuit. Thus, in the power supply circuit according to the first aspect of the present invention, it is possible to reduce the number of components such as voltage storage elements which cannot be formed on a semiconductor substrate, and thus, which have to be externally mounted without causing an increase in electric power consumption. Therefore, the first aspect of the present invention allows the components to be mounted in a simpler fashion, and brings about cost reduction. As for the voltage storage element used in the present invention, a capacitor or a secondary battery capable of charging and discharging may be employed. The capacitor is more desirable because it can be produced in a small form.

In the power supply circuit according to the first aspect, the voltage generation circuit preferably further includes a control circuit for controlling a turning-on/off operation of the switching element in accordance with a comparison result of a voltage based on the electric power released from the inductor with respect to a target voltage. In this circuit configuration, the turning-on/off of the switching element is controlled by feeding back the output voltage, thereby regulating the selection voltage having the inverted polarity as well as the selection voltage having the non-inverted polarity, regardless of the load.

Preferably, the switching element is turned on and off using a pulse signal such that the generated electric power is controlled by adjusting the pulse width or the pulse intervals.

According to a second aspect, to achieve the above-described object, there is provided a power supply circuit for supplying a voltage to an electro-optical device including a plurality of scanning lines and a plurality of data lines, the scanning lines crossing the data lines, and the potential serving as a selection voltage for selecting a scanning line from the plurality of scanning lines. The power supply circuit may consist of a voltage generation circuit for generating one of a selection voltage having a positive polarity and a selection voltage having a negative polarity, defined with respect to a median value of signal voltages applied to the data lines; a voltage storage element for storing a voltage based on the one selection voltage generated by the voltage generation circuit; and an inverter circuit for inverting the polarity of the voltage stored in the voltage storage element with respect to a predetermined reference value, and outputting the inverted voltage as another one of the selection voltage having a positive polarity and the selection voltage having a negative polarity. The voltage generation circuit may consist of a transformer which inputs a pulse signal via a primary side of the transformer, the voltage generation circuit generating the one of the selection voltage having a positive polarity and the selection voltage having a negative polarity using a voltage output from a secondary side of the transformer.

In the power supply circuit according to the second aspect, either one of the selection voltages having positive and negative polarities applied to the scanning lines is generated by the voltage generation circuit using a voltage obtained by stepping up a signal via the transformer. In this technique, the one selection voltage having a high voltage can be easily generated. Furthermore, as compared with the first aspect of the present invention, the switching element can be turned on and off with less electric power consumption, which results in a reduction in the total power consumption. Furthermore, in the power supply circuit according to the second aspect of the present invention, the other selection voltage is generated using the inverter circuit by inverting the polarity of the one selection voltage stored in the voltage storage element after being generated by the voltage generation circuit. Thus, as in the power supply circuit according to the first aspect of the present invention, it is possible to reduce the number of components such as a voltage storage element which cannot be formed on a semiconductor substrate, and thus, which have to be externally mounted. Thus, also in this second aspect of the invention, simplification of the assembly process and a reduction in cost can be achieved.

In this second aspect of the present invention, the transformer is preferably a piezoelectric transformer which generates mechanical vibration in response to a voltage applied to the primary side of the transformer, which converts the mechanical vibration to a voltage, and which outputs the voltage resulting, from the secondary side. The use of the piezoelectric transformer allows a reduction in size. Furthermore, if the resonance frequency of mechanical vibration is set to a value close to the natural frequency, an increase in the voltage conversion efficiency can be achieved.

In the power supply circuit according to the present invention, the voltage generation circuit preferably further includes a control circuit for controlling a supply of the pulse signal to the primary side of the transformer in accordance with a comparison result of a voltage based on an output from the secondary side of the transformer with respect to a target voltage. In this circuit configuration, the pulse signal is controlled by feeding back the output voltage, thereby regulating the selection voltage having the inverted polarity, as well as the original selection voltage having the non-inverted polarity, regardless of the load. Furthermore, it is possible to control the generated electric power by adjusting the pulse width or the pulse intervals.

In the power supply circuit according to the first or second aspect of the present invention, the inverter circuit preferably includes a voltage storage element having an electrode connected to a voltage terminal which is switched in response to a clock signal so that the voltage is stored and released in a highly efficient manner.

In the first or second aspect of the present invention, when only a first area covered by some of the plurality of scanning lines is displayed and a second area covered by the remaining scanning lines is not displayed, and when a scanning line in the second area is selected, it is desirable that the polarity inversion by the inverter circuit be disabled or be performed at a reduced frequency. In this technique, when a scanning line which is not involved in displaying an image is selected, the inverting operation of the inverter circuit is disabled or is performed at a reduced frequency thereby preventing useless power consumption.

According to an another aspect of the present invention, to achieve the above object, there is provided a driving circuit of an electro-optical device, for driving pixels disposed at intersections between a plurality of scanning lines and a plurality of data lines. The driving circuit may consist of a power supply circuit for generating a selection voltage having a positive polarity and a selection voltage having a negative polarity, the positive polarity and the negative polarity being defined with respect to a median value of signal voltages applied to the data lines; and a scanning line driving circuit for applying the selection voltage having a positive polarity and the selection voltage having a negative polarity, generated by the power supply circuit, to respective scanning lines in a predetermined order. The power supply circuit may consist of a voltage generation circuit for generating one of the selection voltage having a positive polarity and the selection voltage having a negative polarity, from a first input potential and a second input potential; a voltage storage element for storing a voltage based on the selection voltage generated by the voltage generation circuit; and an inverter circuit for inverting the polarity of the voltage stored in the voltage storage element with respect to a predetermined reference value, and outputting the inverted voltage as another one of the selection voltage having a positive polarity and the selection voltage having a negative polarity. The voltage generation circuit may consist of a switching element; and an inductor which stores electric power between the first input potential and the second input potential when the switching element turns on, and which releases the stored electric power when the switching element turns off whereby the voltage generation circuit generates the one of the selection voltage having a positive polarity and the selection voltage having a negative polarity using the electric power released from the inductor. The configuration according to the present aspect also allows a reduction in the number of components such as a voltage storage element, as in the first aspect, and thus, it becomes possible to install the components in a simpler fashion, and a reduction in cost can be achieved.

According to still another aspect of the present invention, there is provided a driving circuit of an electro-optical device, for driving pixels disposed at intersections between a plurality of scanning lines and a plurality of data lines. The driving circuit may consist of a power supply circuit for generating a selection voltage having a positive polarity and a selection voltage having a negative polarity, the positive polarity and the negative polarity being defined with respect to a median value of signal voltages applied to the data lines; and a scanning line driving circuit for applying the selection voltage having a positive polarity and the selection voltage having a negative polarity, generated by the power supply circuit, to the respective scanning lines in a predetermined order. The power supply circuit may consist of a voltage generation circuit for generating one of the selection voltage having a positive polarity and the selection voltage having a negative polarity, from a first input potential and a second input potential; a voltage storage element for storing a voltage based on the one selection voltage generated by the voltage generation circuit; and an inverter circuit for inverting the polarity of the voltage stored in the voltage storage element with respect to a predetermined reference value, and outputting the inverted voltage as another one of the selection voltage having a positive polarity and the selection voltage having a negative polarity. The voltage generation circuit including a transformer which receives a pulse signal via a primary side of the transformer, and the voltage generation circuit generating the one of the selection voltage having a positive polarity and the selection voltage having a negative polarity using a voltage output from a secondary side of the transformer. The configuration according to the present aspect also allows a reduction in the number of components such as a voltage storage element, as in the second aspect, and thus it becomes possible to install the components in a simpler fashion, and a reduction in cost can be achieved.

According to still another aspect of the present invention, to achieve the above object, there is provided a method of driving an electro-optical device, for driving pixels disposed at intersections between a plurality of scanning lines and a plurality of data lines. The method may consist of a first step of turning on and turning off a switching element such that, when the switching element is turned on, electric power is stored in an inductor between a first input potential and a second input potential, and when the switching element is turned off, the electric power stored in the inductor is released, thereby generating one of a selection voltage having a positive polarity and a selection voltage having a negative polarity with respect to a median value of signal voltages supplied to the data lines, and storing a voltage based on the one of selection voltage; and a second step of inverting the polarity of the voltage stored in the first step, with respect to a predetermined value, and outputting the inverted voltage as another one of the selection voltage having a positive polarity and the selection voltage having a negative polarity, selection voltages generated in the first step and the second step being applied to respective scanning lines in a predetermined order. The configuration according to the present aspect also allows a reduction in the number of components such as a voltage storage element, as in the first aspect, and thus, it becomes possible to install the components in a simpler fashion, and a reduction in cost can be achieved.

According to still another aspect of the present invention, there is provided a method of driving an electro-optical device, for driving pixels disposed at intersections between a plurality of scanning lines and a plurality of data lines. The method may consist of a first step of inputting a pulse signal to a primary side of a transformer, and generating, using a voltage output from a secondary side of the transformer, one of a selection voltage having a positive polarity and a selection voltage having a negative polarity with respect to a median value of signal voltages supplied to the data lines, and storing a voltage based on the one selection voltage; and a second step of inverting the polarity of the voltage stored in the first step, with respect to a predetermined value, and outputting the inverted voltage as another one of the selection voltage having a positive polarity and the selection voltage having a negative polarity, selection voltages generated in the first step and the second step being applied to respective scanning lines in a predetermined order. The configuration according to the present aspect also allows a reduction in the number of components such as a voltage storage element, as in the second aspect, and thus it becomes possible to install the components in a simpler fashion, and a reduction in cost can be achieved.

According to still another aspect of the present invention, to achieve the above object, there is provided an electro-optical device which may consist of pixels disposed at intersections between a plurality of scanning lines and a plurality of data lines. The electro-optical device may further consist of a power supply circuit for generating a selection voltage having a positive polarity and a selection voltage having a negative polarity, the positive polarity and the negative polarity being defined with respect to a median value of signal voltages applied to the data lines; and a scanning line driving circuit for applying the selection voltage having a positive polarity and the selection voltage having a negative polarity, generated by the power supply circuit, to respective scanning lines in a predetermined order. The power supply circuit may consist of a voltage generation circuit for generating one of the selection voltage having a positive polarity and the selection voltage having a negative polarity, from a first input potential and a second input potential; a voltage storage element for storing a voltage based on the one selection voltage generated by the voltage generation circuit; and an inverter circuit for inverting the polarity of the voltage stored in the voltage storage element with respect to a predetermined reference value, and outputting the inverted voltage as another one of the selection voltage having a positive polarity and the selection voltage having a negative polarity. The voltage generation circuit may consist of a switching element; and an inductor which stores electric power between the first input potential and the second input potential when the switching element turns on, and which releases the stored electric power when the switching element turns off, whereby the voltage generation circuit generates the one of the selection voltage having a positive polarity and the selection voltage having a negative polarity using the electric power released from the inductor. The configuration according to the present aspect also allows a reduction in the number of components such as a voltage storage element, as in the first aspect, and thus, it becomes possible to install the components in a simpler fashion, and a reduction in cost can be achieved.

According to still another aspect of the present invention, to achieve the above object, there is provided an electro-optical device which may consist of pixels disposed at intersections between a plurality of scanning lines and a plurality of data lines. The electro-optical device may further consist of a power supply circuit for generating a selection voltage having a positive polarity and a selection voltage having a negative polarity, the positive polarity and the negative polarity being defined with respect to a median value of signal voltages supplied to the data lines; and a scanning line driving circuit for applying the selection voltage having a positive polarity and the selection voltage having a negative polarity, generated by the power supply circuit, to respective scanning lines in a predetermined order. The power supply circuit may consist of a voltage generation circuit for generating one of the selection voltage having a positive polarity and the selection voltage having a negative polarity, from a first input potential and a second input potential; a voltage storage element for storing a voltage based on the one selection voltage generated by the voltage generation circuit; and an inverter circuit for inverting the polarity of the voltage stored in the voltage storage element with respect to a predetermined reference value, and outputting the inverted voltage as another one of the selection voltage having a positive polarity and the selection voltage having a negative polarity. The voltage generation circuit may consist of a transformer which inputs a pulse signal via a primary side of the transformer, and the voltage generation circuit generates the one of the selection voltage having positive polarity and the selection voltage having a negative polarity using a voltage output from the secondary side of the transformer. The configuration according to the present aspect also allows a reduction in the number of components such as a voltage storage element, as in the second aspect, and thus it becomes possible to install the components in a simpler fashion, and a reduction in cost can be achieved.

According to still another aspect of the present invention, there is provided an electro-optical device which may consist of pixels disposed at intersections between a plurality of scanning lines and a plurality of data lines. The electro-optical device may further consist of a power supply circuit for generating a selection voltage having a positive polarity and a selection voltage having a negative polarity, the positive polarity and the negative polarity being defined with respect to a median value of signal voltages applied to the data lines. The power supply circuit may consist of a voltage generation circuit for generating one of the selection voltage having a positive polarity and the selection voltage having a negative polarity from a first input potential and a second input potential using an inductor or a transformer driven in response to a pulse signal; a voltage storage element for storing a voltage based on the one selection voltage generated by the voltage generation circuit; and an inverter circuit for inverting the polarity of the voltage stored in the voltage storage element with respect to a predetermined reference value, and outputting the inverted voltage as another one of the selection voltage having a positive polarity and the selection voltage having a negative polarity. When only a first area covered by some of the plurality of scanning lines is displayed and a second area covered by remaining scanning lines is not displayed, and when a scanning line in the second area is selected, polarity inversion by the inverter circuit is not performed or is performed at a reduced frequency. The configuration according to the present aspect also allows a reduction in the number of components such as a voltage storage element, as in the previous aspects, and thus it becomes possible to install the components in a simpler fashion, and a reduction in cost can be achieved. Furthermore, in this technique, when a scanning line which is not involved in displaying an image is selected, the inverting operation of the inverter circuit is disabled or is performed at a reduced frequency, thereby preventing useless power consumption.

According to still another aspect of the present invention, there is provided an electronic equipment which may consist of the electro-optical device according to one of above aspects as a display unit. This electronic equipment also has the advantage in that a less number of externally mounted components are required, and thus, simplification of the assembly process and a reduction in cost can be achieved.

In the present invention, the inductor or the piezoelectric transformer may be disposed on a substrate of a liquid crystal panel or on a flexible board whose terminals formed on one end are connected to the substrate of the liquid crystal panel, or otherwise on a printed circuit board connected to the other end of the flexible board. In the conventional technique, a great number of capacitors used in the power supply circuit are mounted on the printed circuit board or the like. In contrast, the present invention needs a greatly reduced number of capacitors mounted on the circuit board or the like, which makes it possible to miniaturize the device.

BRIEF DESCRIPTION OF THE DRAWINGS

FIGS. 13($a$) and 13($b$) are block diagrams illustrating two examples of the circuit configuration of a source signal generator of the oscillator circuit, and FIG. 13($c$) illustrates a NAND circuit which can be employed instead of the inverter used in the source signal generator.

FIG. 14 is a timing chart illustrating signals generated by the oscillator circuit.

DETAILED DESCRIPTION OF PREFERRED EMBODIMENTS

The present invention is described below with reference to specific embodiments in conjunction with drawings.

First Embodiment

Figure 1:
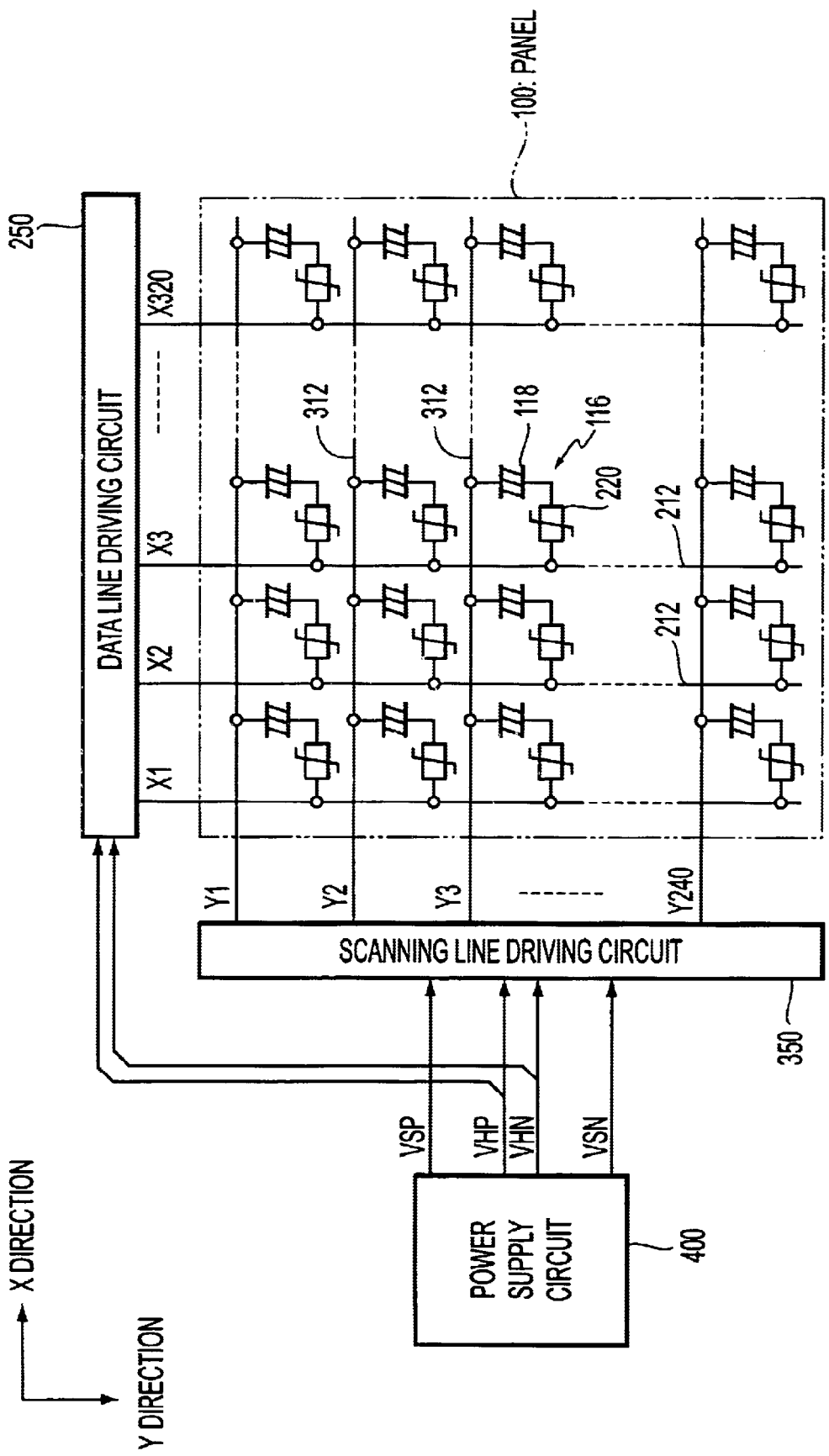
FIG. 1 is a block diagram illustrating the general configuration of an electro-optical device including a power supply circuit according to a first embodiment of the present invention.

Before describing embodiments of power supply circuits according to the present invention, there is first described an electro-optical device to which the power supply circuit is to be applied. FIG. 1 is a block diagram illustrating the electrical configuration of the electro-optical device.

As shown in FIG. 1, a panel 100 includes a plurality of data lines (segment electrodes) 212 extending in a column direction (Y direction), and also includes a plurality of scanning lines (common electrodes) 312 extending in a row direction (X direction). Furthermore, pixels 116 are formed at intersections of the data lines 212 and the scanning lines 312. Each pixel 116 is composed of a series connection of an electro-optical material (liquid crystal layer) 118 and a thin-film diode (hereinafter referred to simply as a TFD) 220, which is one of two-terminal switching elements. In the following description, by way of example, but not of limitation, there are a total of 240 scanning lines 312 and a total of 320 data lines 212, whereby a 240×320 matrix display device is formed.

Figure 2:
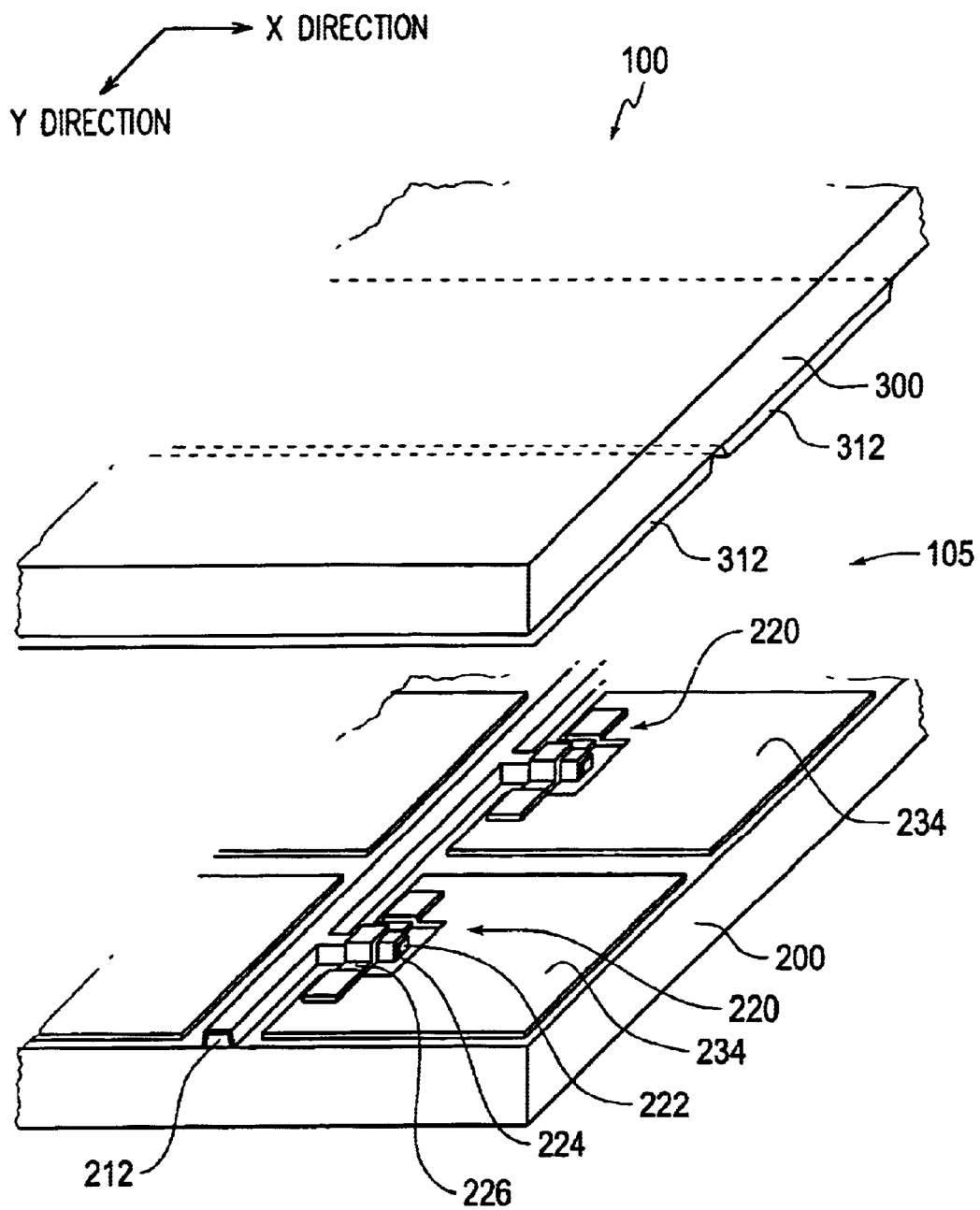
FIG. 2 is a partially cutaway perspective view illustrating the structure of the panel of the electro-optical device.

The structure of the panel 100 is briefly described below. FIG. 2 is a partially cutaway perspective view illustrating the structure of the panel 100. As shown in FIG. 2, the panel 100 includes a device substrate 200 and an opposite substrate 300 disposed opposite the device substrate 200. The device substrate 200 includes, on its surface facing the opposite substrate 300, pixel electrodes 234 made of a transparent conductive material such as ITO (indium tin oxide) or a reflective metal such as an aluminum alloy or a silver alloy, wherein the pixel electrodes 234 are disposed in X and Y directions into the form of a matrix. Of these pixel electrodes 234, 240 pixel electrodes disposed in each column are connected, via corresponding TFDs 220, to one of the data lines 212 extending in the Y direction. When seen from the side of the substrate, each TFD 220 has a conductor/insulator/conductor sandwich structure consisting of a first conductor 222 branching from a data line 212, an insulator 224 formed by anodizing the first conductor 222, and a second conductor 226 such as chromium. Thus, each TFD 220 has a switching diode characteristic having a nonlinear current-voltage characteristic in both forward and reverse directions.

On the other hand, the opposite substrate 300 includes, on its surface facing the device substrate 200, scanning lines 312 extending in the X direction, wherein each scanning line is located opposite corresponding pixel electrodes 234. The device substrate 200 and the opposite substrate 300 are spaced from each other by a sealing material (not shown) and a spacer (not shown) such that a gap is formed between them. In this closed space, a liquid crystal 105 is sealed, serving as the electro-optical material so as to form a liquid crystal layer 118 as shown in FIG. 1. As for the liquid crystal 105, various types of liquid crystals may be employed. They include a bistable type liquid crystal such as a TN (twisted nematic) or ferroelectric liquid crystal, a polymer dispersed liquid crystal, a non-twisted homeotropic-alignment liquid crystal, and a homogeneous alignment liquid crystal. That is, the liquid crystal layer 118 is formed of the scanning lines 312 serving as electrodes disposed at intersections between the data lines 212 and the scanning lines 312, the pixel electrodes 234, and the liquid crystal 105 disposed between the corresponding scanning electrodes and pixel electrodes.

Referring again to FIG. 1, a scanning line driving circuit 350 selects voltages generated by a power supply circuit 400 in a predetermined order for each scanning line 312, thereby supplying scanning signals Y1–Y240 to the respective scanning lines 312. A data line driving circuit 250 selects a voltage generated by the power supply circuit 400 for each data line 212 in accordance with the content to be displayed by a pixel at an intersection with a selected scanning line 312, and also in accordance with the polarity of the selection voltage applied to that scanning line 312, thereby supplying data signals X1–X320 to the respective data lines 212.

Figure 3:
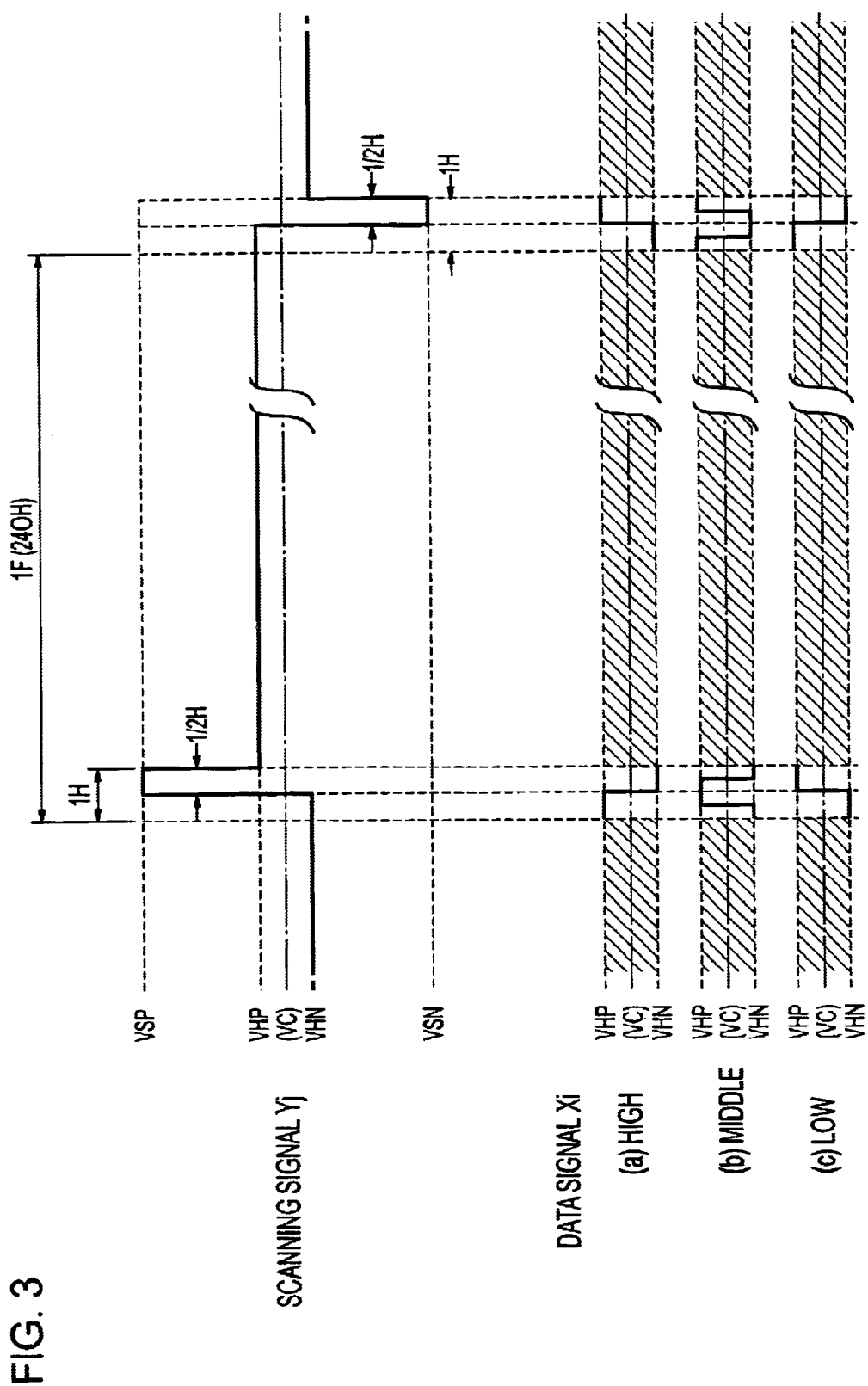
FIG. 3 is a waveform diagram illustrating an example of a driving signal waveform used in the electro-optical device.

FIG. 3 illustrates a scanning line signal Yj applied to a scanning line 312 at the jth position (j is an integer in the range of $1 \leq j \leq 240$) counted from the top position in FIG. 1. FIG. 3 also illustrates examples of waveforms of the data signal Xi applied to a data line 212 at the ith position (i is an integer in the range of $1 \leq i \leq 320$) counted from the leftmost position in FIG. 1.

In FIG. 3, voltages VSP and VSN are selection voltages, and voltages VHP and VHN are non-selection voltages. The non-selection voltages VHP and VHN are also used as the high-level data signal voltage and the low-level data signal voltage, respectively. The selection voltages VSP and VSN are symmetric with respect to the center voltage VC of the high-level and low-level data signal voltages. The symmetry of the selection voltages VSP and VSN with respect to the center voltage VC of the data signal voltages is required to drive the liquid crystal layer 118 in an alternating fashion. In some cases, the selection voltages VSP and VSN are selected to be asymmetric with respect to the center voltage VC of the data signal voltages so as to compensate for asymmetry of the current-voltage characteristics of the TFDs 220 with respect to the polarity of the applied voltage. In any case, the polarity is defined with respect to the center voltage VC such that voltages higher than VC are said to be positive, and voltages lower than VC are said to be negative.

As shown in FIG. 3, the scanning signal Yj has a waveform which is repeated periodically in such a manner as described below. First, the scanning signal Yj becomes equal to the selection voltage VSP during the second half period (½H) of one horizontal scanning period (1H) during which one scanning line 312 is selected. Second, at the end of the horizontal scanning period, the scanning signal Yj becomes equal to the non-selection voltage VHP. Third, when the same scanning line 312 is again selected after one vertical scanning period (1F) has elapsed since the application of the selection voltage VSP, the scanning signal Yj becomes equal to the selection voltage VSN during the second half period (½H) of one horizontal scanning period. Fourth, at the end of that horizontal scanning period, the scanning signal Yj becomes equal to the non-selection voltage VHN. Thereafter, the above process is repeated. A similar scanning signal is applied to all scanning lines 312 on a line-by-line basis, such that each scanning line 312 is selected during one horizontal period (1H) in each vertical scanning period (1F).

The data signal Xi is applied, depending on the scanning signal Yj, in a manner as described below. That is, when on-level data (black data in the normally white mode or white data in the normally black mode) is displayed by the pixel 116 located at the intersection between the ith data line 212 and the jth scanning line 312, and when the positive-polarity selection voltage is applied to the jth scanning line 312 during the second half period of one horizontal period during which the jth scanning line 312 is selected, the data signal Xi becomes, as shown in portion (a) of FIG. 3, equal to the high-level data signal voltage VHP during the first half period of that horizontal scanning period (1H), and becomes equal to the low-level data signal voltage VHN having a polarity opposite to that of the applied selection voltage during the second half period. On the other hand, when on-level data is displayed by the same pixel but the negative-polarity selection voltage is applied to the jth scanning line 312 during the second half period of one horizontal period during which the jth scanning line 312 is selected, the data signal Xi becomes, as shown in portion (a) of FIG. 3, equal to the low-level data signal voltage VHN during the first half period of that horizontal scanning period (1H), and becomes equal to the high-level data signal voltage VHP having a polarity opposite to that of the applied selection voltage during the second half period.

Conversely, when off-level data (white data in the normally white mode or black data in the normally black mode) is displayed by the pixel located at the intersection between the ith data line 212 and the jth scanning line 312 and when the positive-polarity selection voltage is applied to the jth scanning line 312 during the second half period of one horizontal scanning period during which the jth scanning line 312 is selected, the data signal Xi becomes, as shown in portion (c) of FIG. 3, equal to the low-level data signal voltage VHN during the first half period of that horizontal scanning period (1H) and becomes equal to the high-level data signal voltage VHP having the same polarity as that of the applied selection voltage during the second half period. On the other hand, when off-level data is displayed by the same pixel, but the negative-polarity selection voltage is applied to the jth scanning line 312 during the second half period of one horizontal scanning period during which the jth scanning line 312 is selected, the data signal Xi becomes, as shown in portion (c) of FIG. 3, equal to the high-level data signal voltage VHP during the first half period of that horizontal scanning period (1H), and becomes equal to the low-level data signal voltage VHN having the same polarity as that of the applied selection voltage during the second half period.

In the case where halftone data is displayed by means of pulse width modulation, a data signal having a waveform such as that shown in portion (b) of FIG. 3 is applied. During periods represented by means of shading in FIG. 3, the voltage of the data signal Xi is determined in accordance with the contents to be displayed by pixels at intersections with scanning lines 312 other than the ith scanning line 312 and also in accordance with the polarity of the scanning signal applied during the second half period of each corresponding selection period.

As described above, instead of applying the selection voltage associated with the scanning signal Yi over one full horizontal scanning period at a time, the selection voltage is applied during a half horizontal scanning period (½H), the data signal Xi is applied during two periods, each having a length half the horizontal scanning period so that the data signal Xi has a high-level voltage VHP during one period and a low-level voltage VHN during the other period. As a result, the voltage applied to the TFDs 220 during non-selection periods becomes constant, regardless of the contents being displayed, and thus, the amount of off-leakage through the TFDs 220 during the non-selection periods becomes constant. This prevents crosstalk.

In FIGS. 1 and 2, the scanning lines and the data lines may be replaced with each other. In this case, reference numeral 312 in FIG. 2 denotes data lines and 212 denotes scanning lines, and, furthermore, in FIG. 1, the connection between the liquid crystal layer 118 and each TFD 220 is modified in correspondence with the replacement between the data lines and the scanning lines. In this configuration, pixels can be driven in a similar manner as described above without having any problem due to the modification of the configuration.

The waveform of the driving signal is not essential to the present invention, and thus, further detailed discussion is not given herein. However, note that the scanning line driving circuit 350 serves to supply scanning signals Y1–Y240 to the respective scanning lines 312 using voltages generated by the power supply circuit 400, and the data line driving circuit 250 serves to supply data signals X1–Y320 to the respective data lines 212 using voltages generated by the power supply circuit 400. Furthermore, the electro-optical device also needs a structure which supplies control signals and clock signals to the scanning line driving circuit 350 and the data line driving circuit 250, thereby controlling them. However, such a circuit is not essential to the invention, and thus, it is not shown in FIG. 1.

Power Supply Circuit

Figure 4:
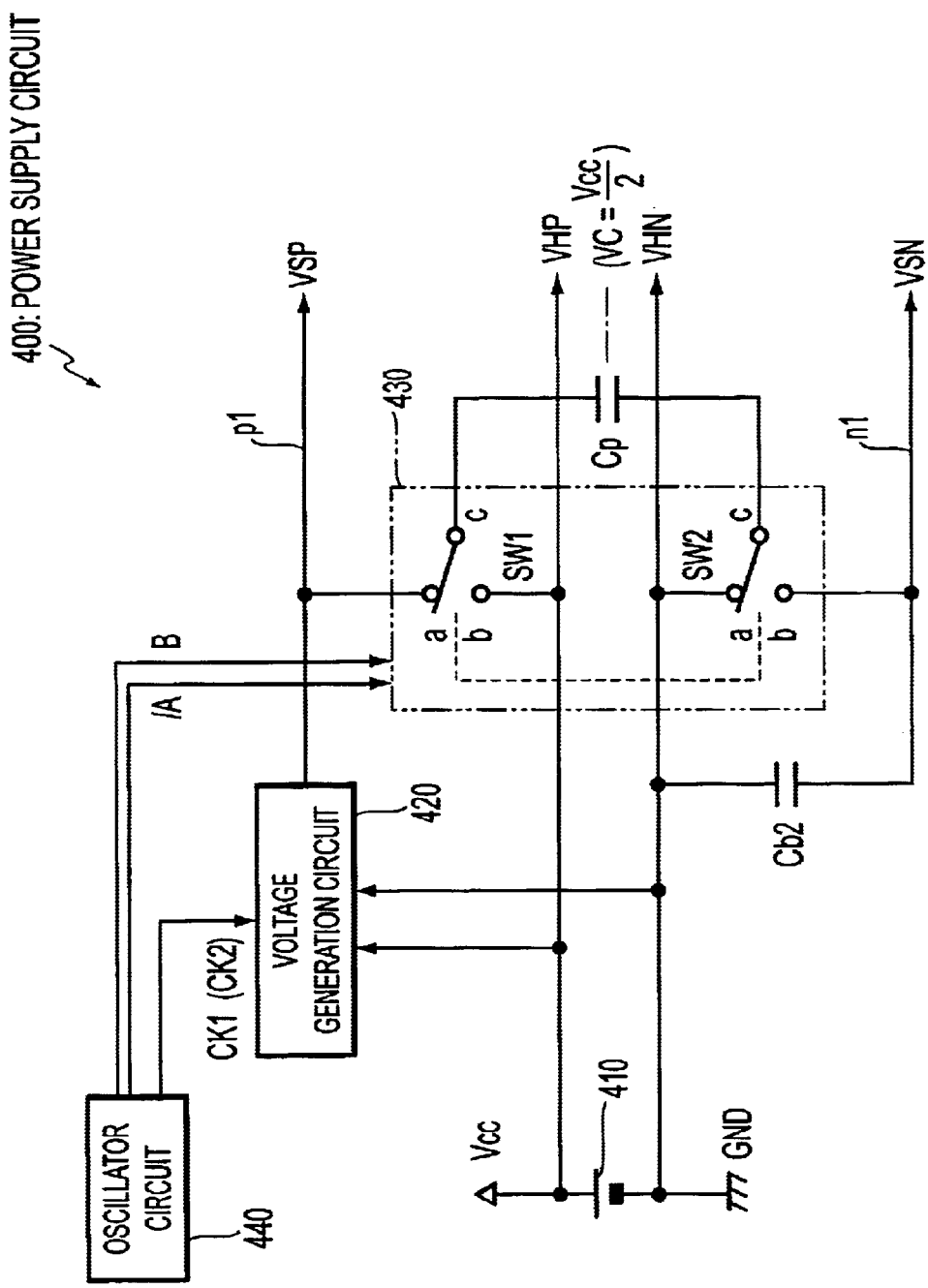
FIG. 4 is a block diagram illustrating the configuration of the power supply circuit in the electro-optical device.

Now, a first embodiment of a power supply circuit according to the present invention, for use in an electro-optical device, is described below. FIG. 4 is a block diagram showing the configuration of this power supply circuit 400. The power supply circuit 400 generates selection voltages VSP and VSN from voltages Vcc-GND supplied from a single power supply 410. The power supply circuit 400 also supplies non-selection voltages VHP and VHN by directly outputting the voltage Vcc and the ground voltage GND.

As described earlier, the non-selection voltages VHP and VHN are also used as the high-level data signal voltage and the low-level data signal voltage, respectively. Therefore, the center voltage VC used as a reference value to define the polarity becomes the median value between the voltage Vcc (VHP) and the ground voltage GND (VHN), that is, Vcc/2. Note that in the present embodiment, the center voltage is a virtual voltage and is not actually generated.

In FIG. 4, a voltage generation circuit 420 generates a selection voltage VSP with a positive polarity using a voltage difference between the voltage Vcc (first input potential) and the ground potential GND (second input potential), and outputs the resultant voltage via a supply line p1. An inverter circuit 430 is constructed as described below, using switches SW1 and SW2 which are linked to each other. A selection terminal a of the switch SW1 is connected to the supply line p1 for supplying the selection voltage VSP with the positive polarity, and a selection terminal b of the switch SW1 is connected to a supply line for supplying the voltage Vcc. An non-selection terminal c of the switch SW1 is connected to one end of a capacitor Cp. On the other hand, a selection terminal a of the switch SW2 is connected to the ground potential GND, and a selection terminal b of the switch SW2 is connected to a supply line n1. A non-selection terminal c of the switch SW2 is connected to the other end of the capacitor Cp. Each switch may be realized using one or more switching elements such as a transistor.

An oscillator circuit 440 supplies a clock signal CK1 (or CK2), which will be described later, to the voltage generation circuit 420. The oscillator circuit 440 also supplies signals /A and B to the inverter circuit 430, thereby controlling the switching operations of the switches SW1 and SW2. Herein, and also in the following description, symbol "/" placed in front of a signal name is used to represent an inverted signal.

The power supply circuit 400 further includes a capacitor Cb2 disposed between the supply line n1 and the ground potential GND.

In the power supply circuit 400 constructed in the above-described manner, the voltage generation circuit 420 first generates the selection voltage VSP with the positive polarity, and outputs the resultant voltage. In the inverter circuit 430, the terminals a and b of each switch SW1 and SW2 are alternately selected in response to the signals /A and B supplied from the oscillator circuit 440. When the terminals a of the respective switches SW1 and SW2 are selected, one terminal of the capacitor Cp is connected to the selection voltage VSP, and the other terminal of the capacitor Cp is connected to the ground potential GND. Thus, the capacitor Cp is charged such that the one terminal has a high potential corresponding to the selection voltage VSP and the other terminal has a low voltage corresponding to the ground potential GND, as represented by (1) in FIG. 5.

Figure 5:
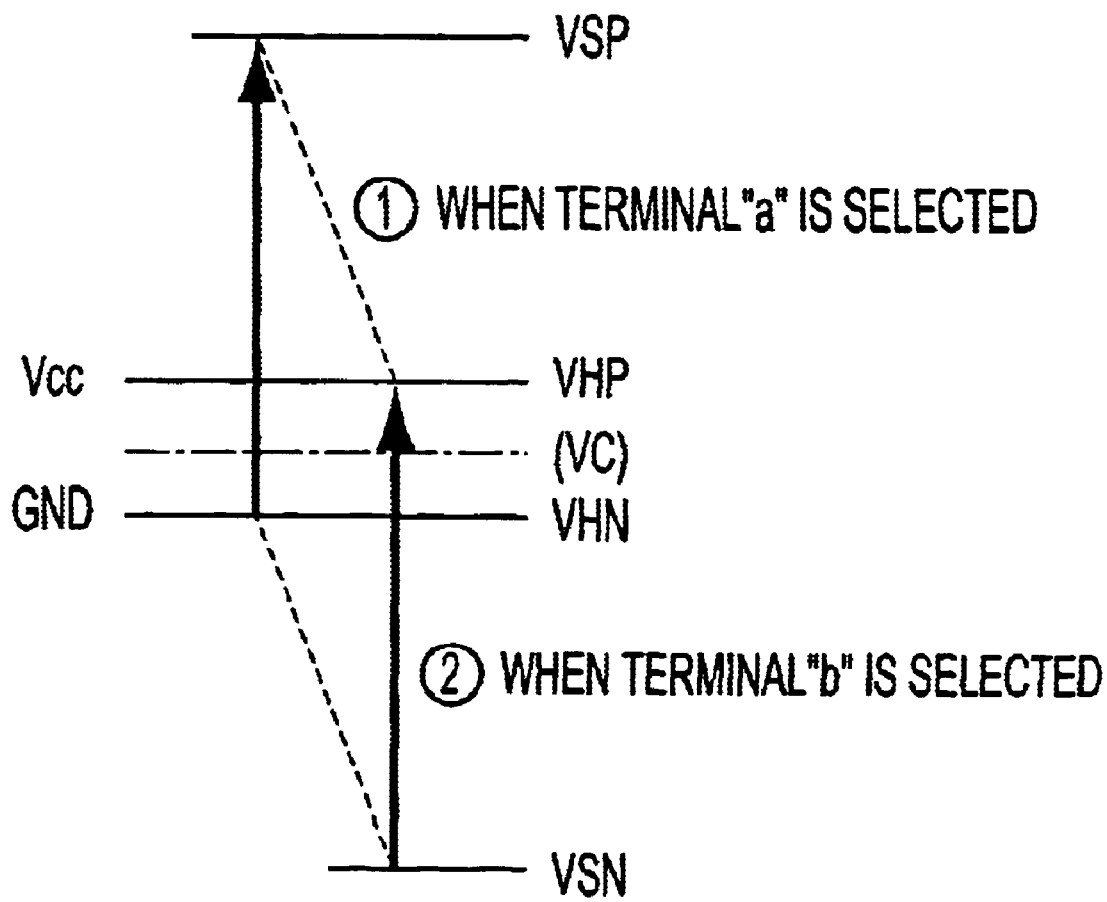
FIG. 5 is a schematic illustration of a polarity inverting operation in the power supply circuit.

Thereafter, when the terminals b of the respective switches SW1 and SW2 are selected, the high-potential end of the capacitor Cp is connected to the voltage Vcc, and thus the potential of the low-potential end of the capacitor is lowered, by a magnitude equal to the potential shift (VSP-Vcc) at the high-potential end of the capacitor Cp, from the ground potential GND at which the low-potential end was when the terminals a were selected, as represented by (2) in FIG. 5. As a result, the potential of the supply line n1 connected to the low-potential end of the capacitor Cp becomes equal to a voltage obtained by inverting the positive-polarity selection voltage VSP with respect to the center voltage VC.

Thereafter, the terminals a of the respective switches SW1 and SW2 are again selected. As a result, the high-potential end of the capacitor Cp is connected to the selection voltage VSP, and the low-potential end of the capacitor Cp is connected to the ground potential GND, thereby charging the capacitor Cp. The above-described operation is performed repeatedly.

During periods in which the terminals a of the respective switches SW1 and SW2 are selected, the potential of the supply line n1 is maintained by the capacitor Cb2 at the negative-polarity selection voltage VSN.

The respective parts of the power supply circuit 400 are described in further detail below.

Voltage Generation Circuit

First, the voltage generation circuit 420 is described. The voltage generation circuit 420 for use in the power supply circuit according to the present embodiment may be constructed in various configurations. Herein, two types suitable for use in the electro-optical device are described.

Voltage Generation Circuit: Fist Type

Figure 6:
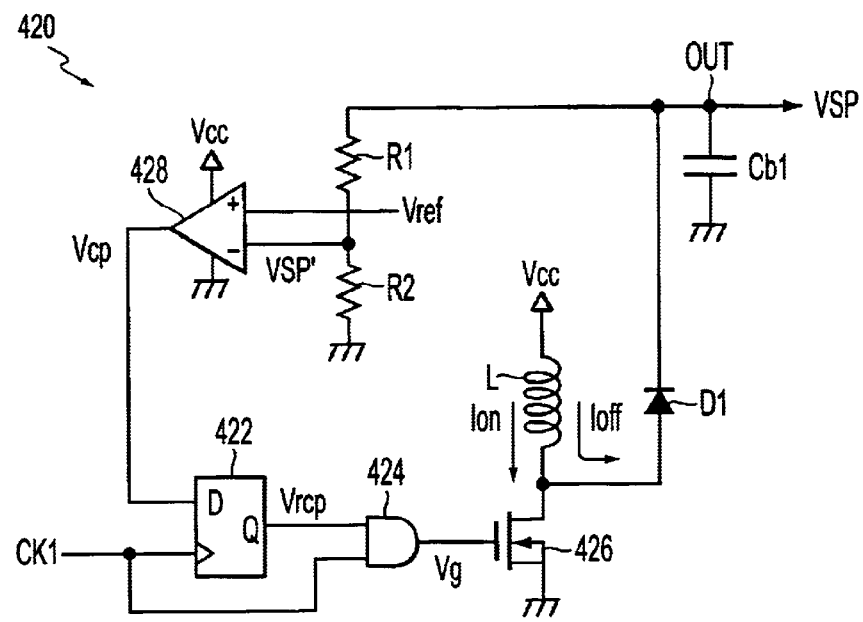
FIG. 6 is a circuit diagram illustrating a first-type circuit configuration of a voltage generation circuit in the power supply circuit.

A first type of voltage generation circuit 420 is first described. FIG. 6 is a circuit diagram illustrating the circuit configuration of the first type of voltage generation circuit 420. As shown in FIG. 6, the first type of voltage generation circuit 420 is constructed in the form of a switching regulator which steps up the voltage Vcc using an inductor (coil) L.

Figure 7:
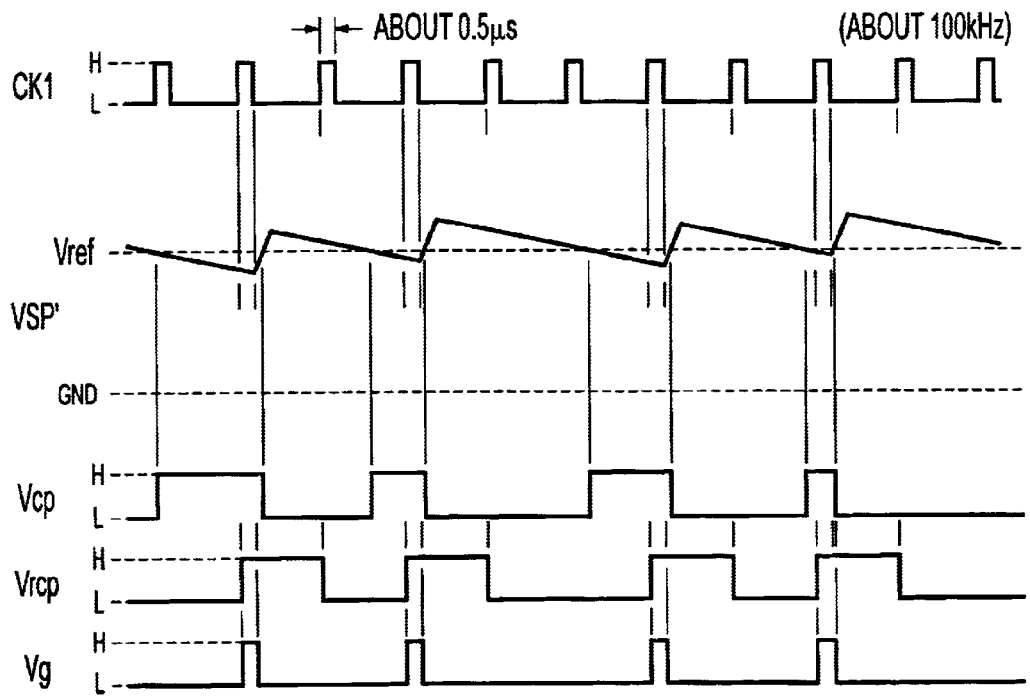
FIG. 7 is a timing chart illustrating the operation of the voltage generation circuit.

In FIG. 6, at each rising edge of a clock signal CK1 supplied from the oscillator circuit 440, a latch circuit 422 latches a signal Vcp applied to its input terminal D, and outputs a signal Vrcp via its output terminal Q. An AND gate 424 calculates the AND of the signal Vrcp and the clock signal CK1, and outputs the resulting signal as a pulse signal Vg. In other words, the AND gate 424 outputs the clock signal CK1 in accordance with the signal Vrcp output from the latch circuit 422. Herein, for example, the clock signal CK1 has a pulse width of 0.5 $\mu$s and a frequency of several hundred kHz, as shown in FIG. 7.

The pulse signal Vg output from the AND gate 424 is applied to the gate of an n-channel transistor 426 serving a switch according to an embodiment of the present invention. The source of the transistor 426 is connected to the ground potential GND, and the drain of the transistor 426 is connected to one end of an inductor L, the other end of which is connected to the voltage supply line for supplying the voltage Vcc. The above-described one end of the inductor L is also connected, via a diode D1, to one end OUT of a capacitor Cb1, the other end of which is connected to the ground potential GND so that a voltage at the end OUT of the capacitor Cb1 is output as a selection voltage VSP with a positive polarity.

The end OUT of the capacitor Cb1 is connected to the ground potential GND via resistors R1 and R2. For convenience of description, the voltage at the node between the resistors R1 and R2, that is, the voltage obtained by dividing the selection voltage VSP via the resistors R1 and R2 is denoted by VSP'. The voltage VSP' is applied to the negative input terminal of a comparator 428, whose positive input terminal is coupled to the reference voltage Vref. In this circuit configuration, if the voltage VSP' becomes lower than the reference voltage Vref, the output signal Vcp of the comparator 428 goes to a high level. On the other hand, if the voltage VSP' becomes higher than the reference voltage Vref, the output signal Vcp falls to a low level. The output signal Vcp is fed back to the input terminal D of the latch circuit 422. The reference voltage Vref is not fixed at a particular value, but is varied in dependence upon settings and environmental parameters such as temperature, as will be described later.

The voltage generation circuit 420 operates as follows. First, when the transistor 426 serving as the switching element turns on, an on-current ion flows through the inductor L in a direction from the voltage Vcc toward the ground voltage. As a result, energy is stored in the inductor L. Thereafter, if the transistor 426 turns off, an off-current Ioff flows through the inductor L. As a result, the energy which has been stored during the on-period of the transistor 426 plus the voltage Vcc is transferred to the capacitor Cb1 via the diode D1 in a forward direction. When all energy stored in the inductor L has been transferred to the capacitor Cb1, the diode D1 is reverse biased, and thus no current flows in a reverse direction from the selection voltage VSP appearing at the end OUT of the capacitor Cb1 toward the voltage Vcc. As a result, the selection voltage increases each time the transistor 426 turns on and off.

However, in practice, the voltage stored in the capacitor Cb1 is reduced by a discharge to a load including resistance and capacitance of scanning lines or the like of the liquid crystal device. Thus, a reduction in the selection voltage VSP occurs. If, as a result of the reduction in the selection voltage VSP, the voltage VSP' generated by division via the resistors R1 and R2 becomes lower than the reference voltage Vref, a low-to-high transition occurs in the output signal Vcp of the comparator 428. Thus, at a first rising edge of the clock signal CK1 after the low-to-high transition of the signal Vcp, the signal Vrcp of the latch circuit 422 rises to a high level. As a result, the AND gate 424 is opened, and thus the clock signal CK1 is output as the pulse signal Vg from the AND gate 424. For the above reason, if the voltage VSP' becomes lower than the reference voltage Vref, the transistor 426 turns on and off at least once, thereby increasing the selection voltage VSP. That is, if the voltage VSP' becomes lower than the reference voltage Vref, the operation is intentionally controlled so as to increase the selection voltage VSP.

On the other hand, if the selection voltage VSP increases as much as the voltage VSP' becomes higher than the reference voltage Vref, the output voltage Vcp of the comparator 428 falls down to the low level.

Thus, at a first rising edge of the clock signal CK1 after the high-to-low transition of the signal Vcp, the signal Vrcp falls down to the low level. As a result, the AND gate 424 is closed. Thus, the clock signal CK1 is blocked by the AND gate 424, and no clock signal CK1 is applied to the gate of the transistor 426. As a result, the selection voltage gradually decreases with the discharge of the capacitor Cb1. That is, if the voltage VSP' becomes higher than the reference voltage Vref, the operation is automatically controlled so as to reduce the selection voltage VSP.

The overall effect of the above operations is that the voltage VSP' settles at a value at which the increasing and decreasing operations are in balance, that is, the voltage VSP' settles at a value close to the reference voltage Vref. Because the voltage VSP' is obtained by dividing the selection voltage VSP via the resistors R1 and R2, VSP' is given by VSP'=VSP·R2/(R1+R2). Because this voltage is regulated at a value equal to the reference voltage Vref, the selection voltage VSP with the positive polarity generated by the power supply circuit 420 has a value regulated at Vref(R1+R2)/R2.

In order to regulate the voltage VSP, it is required that the resistors R1 and R2 have sufficiently high resistance. This can be achieved by forming the resistors using a polycrystalline silicon interconnection layer formed in the semiconductor integrated circuit. In FIG. 7, in order to provide a better understanding, the vertical scale associated with the voltage VSP' is enlarged relative to the other signals. In other words, because the comparator 428 is operated with the voltage Vcc supplied as the power supply voltage, it is required that any voltage input to the comparator should be within the range from GND to Vcc. To meet this requirement, both the voltage VSP' and the reference voltage Vref are set within the range from GND and Vcc.

Voltage Generation Circuit: Second Type

Figure 8:
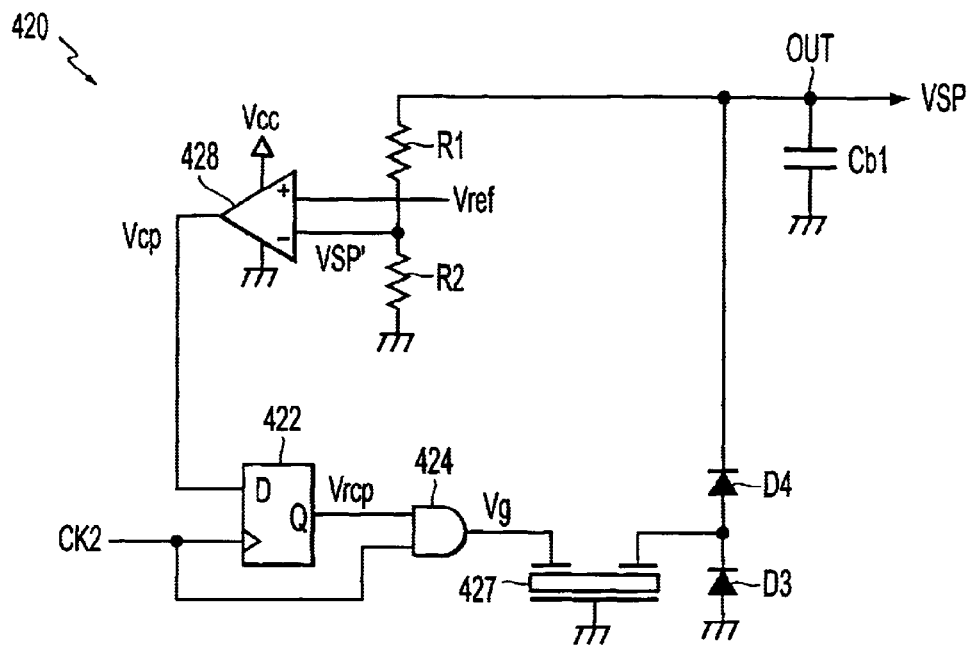
FIG. 8 is a circuit diagram illustrating a second-type circuit configuration of the voltage generation circuit in the power supply circuit.

A second type of voltage generation circuit 420 is described below. FIG. 8 is a circuit diagram illustrating the circuit configuration of the second type of voltage generation circuit. In this voltage generation circuit 420, the voltage Vcc is increased using a piezoelectric transformer 427. That is, the circuit configuration of this voltage generation circuit 420 is obtained by replacing the transistor 426 and the inductor L in FIG. 6 with the piezoelectric transformer 427 so that a part of the output voltage on the secondary side, higher than the ground potential GND, is half-wave rectified by diodes D3 and D4, thereby charging the capacitor Cb1. Furthermore, in order to use the piezoelectric transformer 427, the clock signal CK1 used in the first type is replaced with a clock signal CK2, such as that shown in FIG. 9, having a duty ratio of about 50% and a frequency of about 100 kHz. The other parts are similar to those of the first type described above with reference to FIG. 6, and thus they are not described in further detail herein.

The piezoelectric transformer 427 includes a dielectric material disposed between electrodes on the primary side and also on the secondary side. On the primary side, the dielectric material is expanded and compressed by an applied pulse signal Vg, thereby generating mechanical vibration, which causes dielectric polarization to occur on the secondary side. As a result, an increased voltage is output from the secondary side. The common electrode of the piezoelectric transformer 427 is connected to the ground line GND.

It is desirable to set the duty ratio of the clock signal CK2 to about 50%, because a high conversion efficiency is obtained when the piezoelectric transformer 427 is driven by a signal having good symmetry. Furthermore, it is desirable to set the frequency of the clock signal CK2 to a value in the order of several hundred kHz close to the natural frequency of the dielectric material of the piezoelectric transformer 427, because the transformer has a high conversion efficiency when the frequency of the clock signal CK2 is close to the natural frequency of the dielectric material of the piezoelectric transformer 427.

Figure 9:
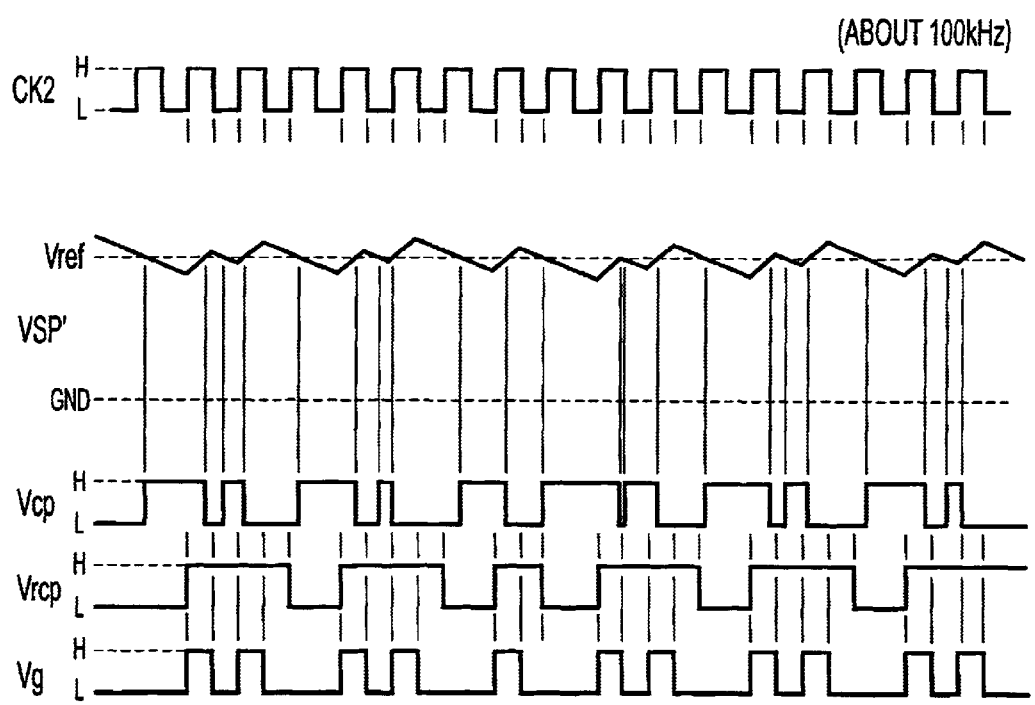
FIG. 9 is a timing chart illustrating the operation of the voltage generation circuit.

The second type of the voltage generation circuit 420 operates in a similar manner as that of the first type shown in FIG. 6, as described below. That is, if the selection voltage VSP decreases as much as the divided voltage VSP' becomes lower than the reference voltage Vref, the output voltage Vcp of the comparator 428 rises up to a high level as shown in FIG. 9. This high-level signal is latched by the latch circuit 422 at a rising edge of the clock signal CK2, and thus, the AND gate 424 is opened. As a result, the clock signal CK2 is supplied as a pulse signal Vg to the piezoelectric transformer 427. The voltage of the clock signal CK2 is increased by the piezoelectric transformer 427, and then rectified by the diodes D3 and D4. Thus, the capacitor Cb1 is charged by the rectified voltage. As a result, the selection voltage VSP increases.

On the other hand, if the selection voltage VSP increases as much as the divided voltage VSP' becomes higher than the reference voltage Vref, the output signal Vcp of the comparator 428 falls down to the low level as shown in FIG. 9. This low-level signal is latched by the latch circuit 422 at a rising edge of the clock signal CK2. As a result, the AND circuit 424 is closed, and no clock signal CK2 is supplied to the piezoelectric transformer 427. Thus, the voltage stored in the capacitor Cb1 decreases with a discharge to a load. As a result, the selection voltage decreases.

Thus, in the second type of voltage generation circuit 420, as in the first type described above with reference to FIG. 6, the positive selection voltage VSP settles at Vref(R1+R2)/R2. Also in FIG. 9, the vertical scale associated with the voltage VSP' is enlarged with respect to those for other signals for the same reason as the first type.

In the second type of voltage generation circuit, the piezoelectric transformer 427 may be replaced with a commonly-used transformer with windings. However, the disadvantage of the commonly-used transformer is its large size. Thus, from the viewpoint of the size, it is desirable to employ the piezoelectric transformer 427.

Although in the configuration shown in FIG. 8, the common electrode of the piezoelectric transformer 427 and the cathode of the diode D3 are connected to the ground potential GND, they may be connected to the supply line of the voltage Vcc. Furthermore, although in FIGS. 6 and 8, one end of the capacitor Cb1 is connected to the ground potential GND, it may be connected to the supply line of the voltage Vcc. In this case, the capacitor Cb1 is allowed to have a lower breakdown voltage.

Reference Voltage Vref Used in the Voltage Generation Circuit

In general, characteristics of electro-optical materials vary with temperature. Furthermore, in most cases, the electro-optical device has a capability of adjusting the display characteristics depending on preferences of users or depending on applications. The selection voltage VSP (and the inverted selection voltage VSN) is one of factors which determine the display characteristics of the electro-optical device. Therefore, it is required that the voltage generation circuit have a capability of adjusting or compensating the selection voltage VSP depending on the environment or settings.

One technique to meet the above requirement is to first generate the selection voltage with a fixed value with respect to the fixed reference voltage Vref using the voltage generation circuit 420 shown in FIG. 6 or 8, and then to reduce the generated selection voltage to a desired value via a resistor or a transistor, thereby indirectly obtaining a desired selection voltage. However, this technique produces a loss due to the voltage drop from the original selection voltage to the reduced voltage. Thus, this technique is not suitable for use in electro-optical devices in which low power consumption is required.

In view of the above, it is desirable that the reference voltage Vref can be varied depending on the environment and settings, thereby directly controlling the magnitude of the selection voltage at a desired value. In general, it is desirable that a reference voltage generation circuit have a resistor whose resistance varies with temperature, and which is connected in series or parallel to a reference voltage generator so that the reference voltage varies depending on temperature. The temperature-reference voltage characteristic should be set such that the temperature-transmittance characteristic of the liquid crystal display is compensated by a variation in the reference voltage.

Figure 10A:
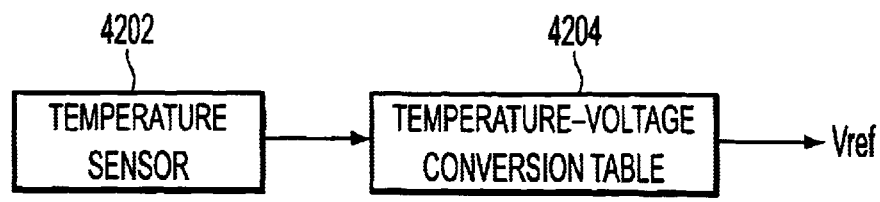
FIGS. 10($a$)–10($c$) are block diagrams illustrating examples of circuit configurations for generating a reference voltage supplied to the voltage generation circuit.
Figure 10B:
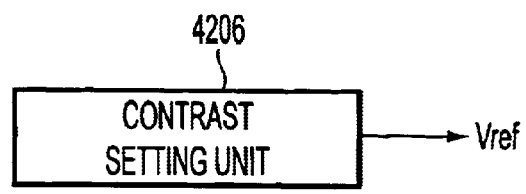
Figure 10C:
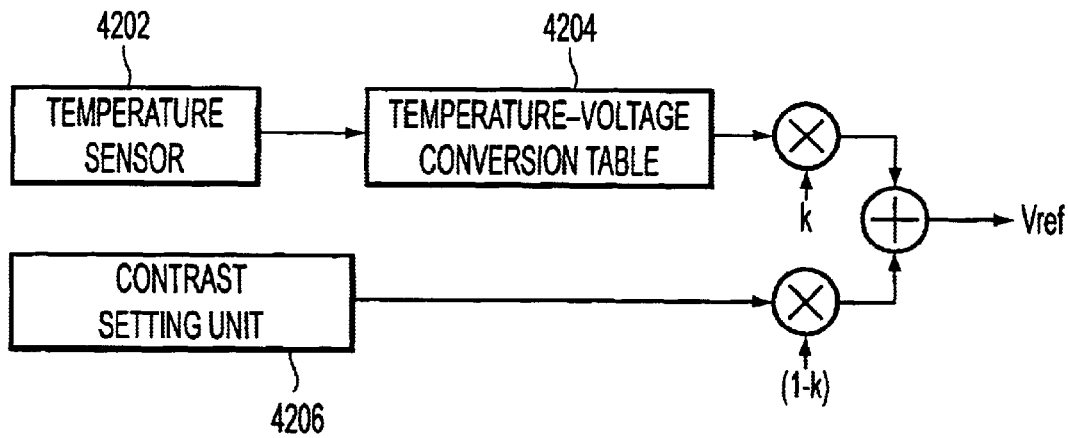

Alternatively, as shown in FIG. 10(a), temperature detected by a temperature sensor 4202 may be converted to a voltage using a temperature-voltage conversion table 4204, and the resultant voltage may be used as the reference voltage Vref. Still alternatively, as shown in FIG. 10(b), a voltage which is set and output by a contrast setting unit 4206 in dependence upon the contrast may be employed as the reference voltage Vref. Still alternatively, as shown in FIG. 10(c), the voltages obtained in FIGS. 10(a) and 10(b) may be multiplied by weighting factor k, and the sum of the resultant voltages may be employed as the reference voltage Vref.

Inverter Circuit

Figure 11A:
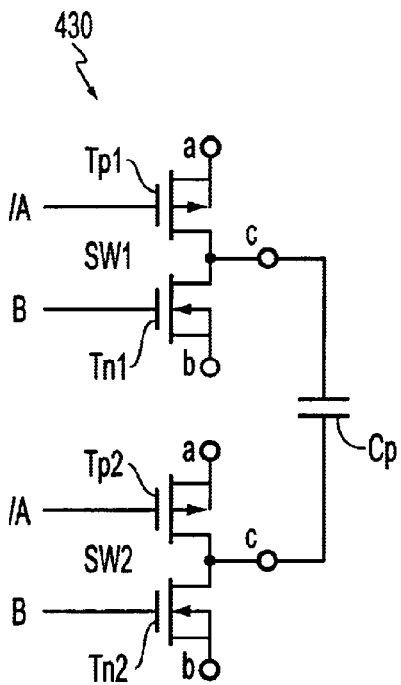
FIGS. 11($a$) and 11($b$) are circuit diagrams illustrating specific examples of the inverter circuit used in the power supply circuit.

Now, the inverter circuit 430 is described below. FIG. 11(a) is a circuit diagram illustrating a specific example of a circuit configuration of the inverter circuit 430 in the power supply circuit 400. In the inverter circuit 430, as shown in FIG. 11(a), the switch SW1 is composed of a p-channel transistor Tp1 and an n-channel transistor Tn1, which are connected in series between the terminals a and b, wherein the signal/A is applied to the gate of the p-channel transistor Tp1 and the signal B is applied to the gate of the n-channel transistor Tn1, and the node between the p-channel and n-channel transistors Tp1 and Tn1 serves as the terminal c. Similarly, the switch SW2 is composed of a p-channel transistor Tp2 and an n-channel transistor Tn2, which are connected in series between the terminals a and b, wherein the signal/A is applied to the gate of the p-channel transistor Tp2 and the signal B is applied to the gate of the n-channel transistor Tn2, and the node between the p-channel and n-channel transistors Tp2 and Tn2 serves as the terminal c. Furthermore, the capacitor Cp is connected between the terminals c of the respective switches SW1 and SW2 composed of transistors serving as switching elements.

In this circuit configuration, when both signals/A and B are at low levels, the transistors Tp1 and Tp2 are turned on and the transistors Tn1 and Tn2 and turned off. As a result, the terminal a is selected in both switches SW1 and SW2. Conversely, if both signals/A and B become high, the transistors Tp1 and Tp2 are turned off and the transistors Tn1 and Tn2 are turned on. As a result, the terminal b is selected in both switches SW1 and SW2.

Figure 11B:
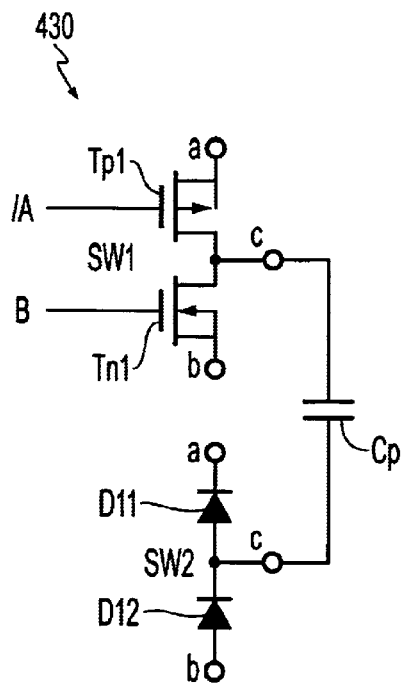

Although in the example shown in FIG. 11(a), the switches SW1 and SW2 are composed of transistors, the transistors of the switch SW2 may be replaced with diodes D11 and D12 as shown in FIG. 11(b). However, in this configuration, the voltage stored in the capacitor Cp becomes smaller by a magnitude corresponding to a forward voltage drop of the diodes D11 and D12. Further, the transistors of the switch SW1 may be replaced with diodes D11 and D12 instead of the transistors of the switch SW2.

Although in the circuit configuration shown in FIGS. 11a and 11b, each transistor is formed of a single-channel transistor, each transistor may be replaced with a transmission gate consisting of p-channel and n-channel transistors connected in a complementary fashion (in which both of the p-channel and n-channel transistors are simultaneously turned on and off).

Oscillator Circuit

Figure 12:
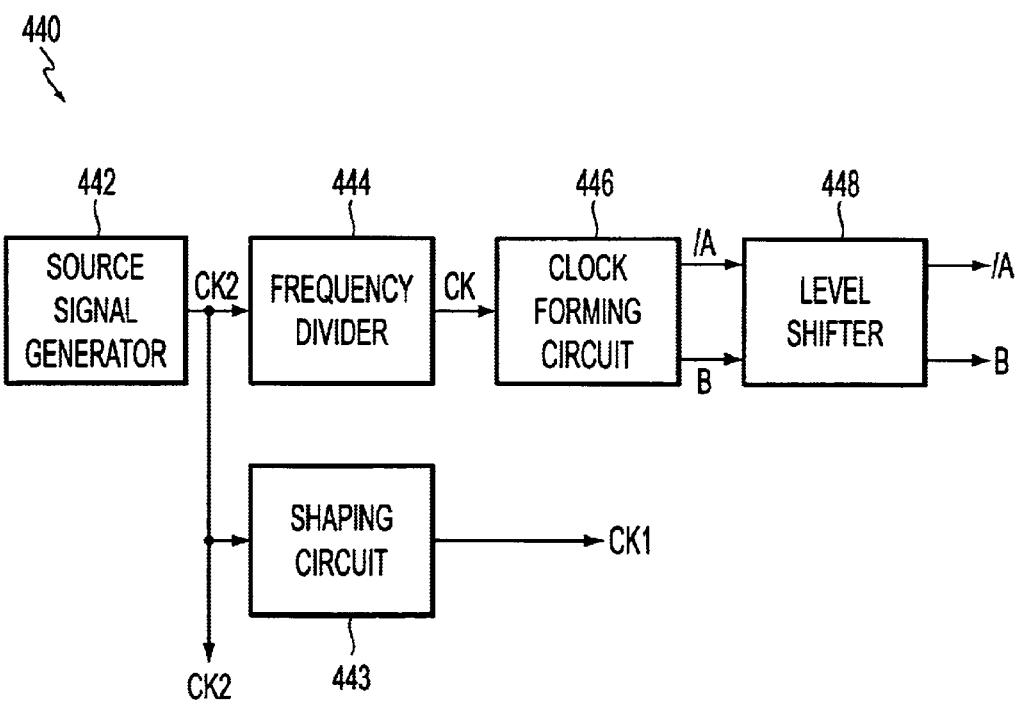
FIG. 12 is a circuit diagram illustrating the configuration of an oscillator circuit in the power supply circuit.

The configuration of the oscillator circuit 440 is described below. The oscillator circuit 440 is used to generate the signals/A and B supplied to the gates of the respective transistors Tp1, Tp2, Tn1, and Tn2, and also to generate the clock signal CK1 (CK2) supplied to the voltage generation circuit 420. FIG. 12 is a block diagram illustrating the configuration of the oscillator circuit 440. In FIG. 12, a source signal generator 442 generates the clock signal CK2 with a duty ratio of about 50% by means of oscillation. One specific circuit configuration of the source signal generator 442 is a CR oscillator circuit formed of three series-connected inverters whose positive output is fed back to its input terminal (1) via a capacitor as shown in FIG. 13(a). Another circuit configuration is a quartz oscillator circuit including a quartz resonator disposed in a feedback path between the output terminal of an inverter to its input terminal (1) as shown in FIG. 13(b).

When it is desired to turn on/off the oscillation of the oscillator circuit 442 shown in FIG. 13(a) or 13(b), the inverter at the first stage of the circuit in FIG. 13(a) or the inverter in FIG. 13(b) is replaced with a NAND circuit such as that shown in FIG. 13(c). In this case, the same feedback signal as that applied to the input terminal (1) of the replaced original inverter is applied to one input terminal of the NAND circuit, and a control signal ON is applied to the other input terminal, wherein a high-level signal is applied as the control signal ON when the oscillator circuit is activated, while a low-level signal is applied as the control signal ON to deactivate the oscillator circuit. In practice, the control signal ON is supplied from a control circuit (not shown) which controls the panel 100 such that the control signal ON is turned off to the low level when the panel 100 does not perform a displaying operation for a long period. If the control signal ON is turned off, no clock signal is supplied in the power supply circuit 400, and thus a reduction in electric power consumption is achieved.

Referring again to FIG. 12, in the case of the second-type voltage generation circuit (FIG. 8), the clock signal CK2 output from the source signal generator 442 is directly supplied. However, in the case of the first-type voltage generation circuit, the waveform of the clock signal CK2 with a duty ratio of about 50% is shaped by a shaping circuit 443, and the resultant signal is supplied as the clock signal CK1.

In practice, when the first-type voltage generation circuit is used, a clock signal with a frequency of about 1 MHz (with a pulse width of about 5 µs) is generated by the oscillator circuit shown in FIG. 13(b), and the frequency is then properly reduced by the shaping circuit 443, thereby generating the clock signal CK1 with a frequency of several hundred kHz. Alternatively, a clock signal with a frequency of several hundred kHz is generated using an oscillator circuit and is then passed through a differentiating circuit, thereby generating the clock signal CK1 with a pulse width of 0.5 µs and a frequency of several hundred kHz. The latter technique has the advantage in that the frequency of the oscillator circuit is lower than that in the former technique, and thus, lower electric power is needed. When the second-type voltage generation circuit is used, a clock signal with a frequency of about 100 kHz is generated using the oscillator circuit shown in FIG. 13(a), and the resultant signal is directly supplied as the clock signal CK2. In this case, the shaping circuit 443 is not necessary.

In FIG. 12, a frequency divider 444 divides the frequency of the clock signal CK2, thereby generating a clock signal CK with a frequency of about 10 kHz. A clock forming circuit 446 generates the signals/A and B with a small logic swing from the clock signal CK, as shown in FIG. 14. More specifically, the clock forming circuit 446 first generates the signals A and /B by inverting the clock signal CK such that the trailing edge of the signal A and the leading edge of the signal/B are delayed with respect to the trailing and leading edges of the clock signal CK. Thereafter, the clock forming circuit 446 inverts the above-described signals A and /B, thereby generating the signal/A and B.

In FIG. 12, components from the front-side end to the clock forming circuit 446 are operated using the power supply 410, and thus the amplitude of the output is limited to the range from GND to Vcc. In contrast, in the inverter circuit 430, transistors Tp1, Tp2, Tn1, and Tn2 forming the switches SW1 and SW2 are switched between voltage differences much higher than the voltage difference between Vcc and GND. To meet this condition, the signals/A and B with the small logic swing generated by the clock forming circuit 446 are converted by a level shifter 448 into signals with a large logic swing, and the resultant signals are supplied to the inverter circuit 430 so that the resultant signal/A with the large logic swing is applied to the gates of the transistors Tp1 and Tp2, and the resultant signal B with the large logic swing is applied to the gates of the transistors Tn1 and Tn2.

Note that there is no period during which the signal/A is at the low level and the signal B is at the high level, as can be seen from FIG. 14. Therefore, when the transistors Tp1 and Tp2 are in the on-state, the transistors Tn1 and Tn2 cannot be in the on-state, and vice versa. This ensures that the terminals a and b are alternately selected in each switch SW1 and SW2, while preventing the capacitor Cp from having leakage which would occur if all four transistors were turned on at the same time.

If the first-type voltage generation circuit 420 (FIG. 6) is employed in the power supply circuit 400 according to the first embodiment, components which have to be externally installed are the inductor L and the capacitor Cb1. On the other hand, when the second-type voltage generation circuit 420 (FIG. 8) is employed, components which have to be externally installed are the piezoelectric transformer 427 and the capacitor Cb1. Additional components required to form the power supply circuit 400 are only the capacitor Cp for polarity inversion and the capacitor Cb2 for storing the negative-polarity selection voltage VSN. Thus, in the power supply circuit 400 according to the present embodiment, a much smaller number of external components are needed than in the conventional power supply circuit in which the selection voltage is generated by stepping up, using the charge pump circuit, the voltage Vcc generated by the single power supply. This allows the components to be installed in a simpler fashion at lower cost.

Furthermore, in this power supply circuit of the first embodiment, the positive-polarity selection voltage VSP is first generated by the voltage generation circuit 420. The generated voltage is stored in the capacitor Cp when the terminals a of the respective switches SW1 and SW2 are selected. When the terminals b of the respective switches SW1 and SW2 are selected thereafter, the polarity of the selection voltage VSP is inverted with respect to the center voltage VC, thereby generating the negative-polarity selection voltage VSN. Thus it is possible to rather easily generate positive and negative selection voltages VSP and VSN which are symmetric with respect to the center voltage VC. Furthermore, this technique prevents a thermal loss due to a charging/discharging current of the electro-optical material, and thus, a further reduction in the electrical power consumption is achieved.

Modifications of the First Embodiment

Figure 15:
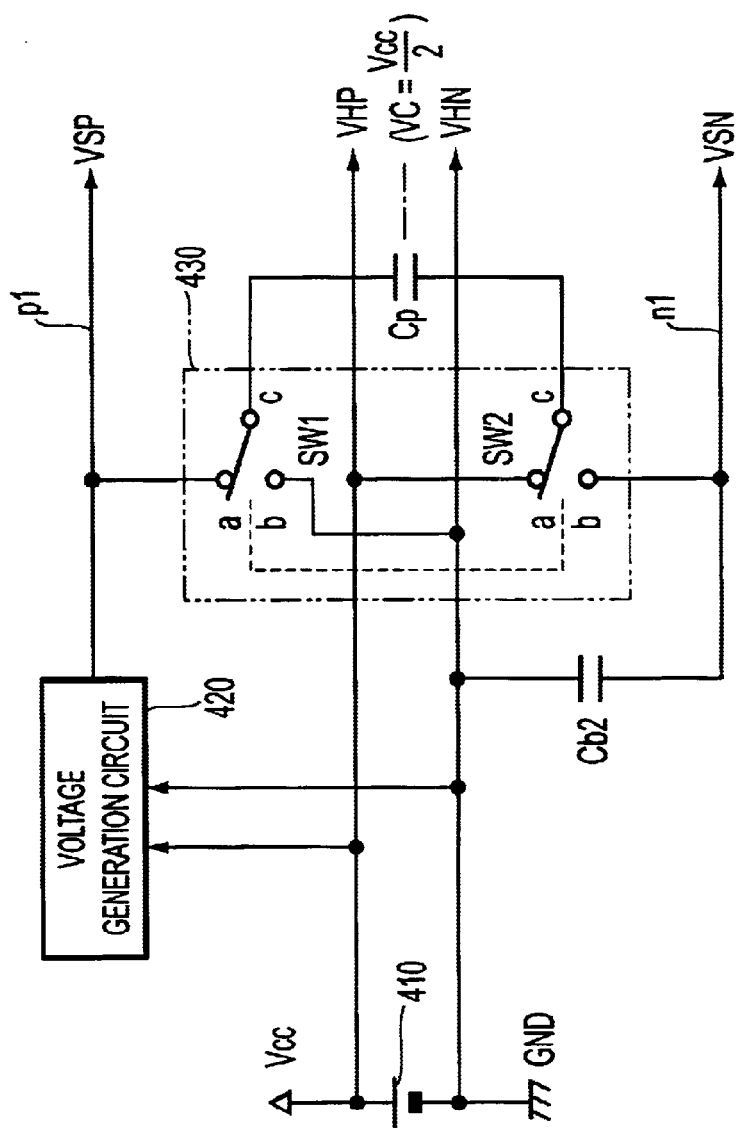
FIG. 15 is a block diagram illustrating a first modification of the power supply circuit.
Figure 16:
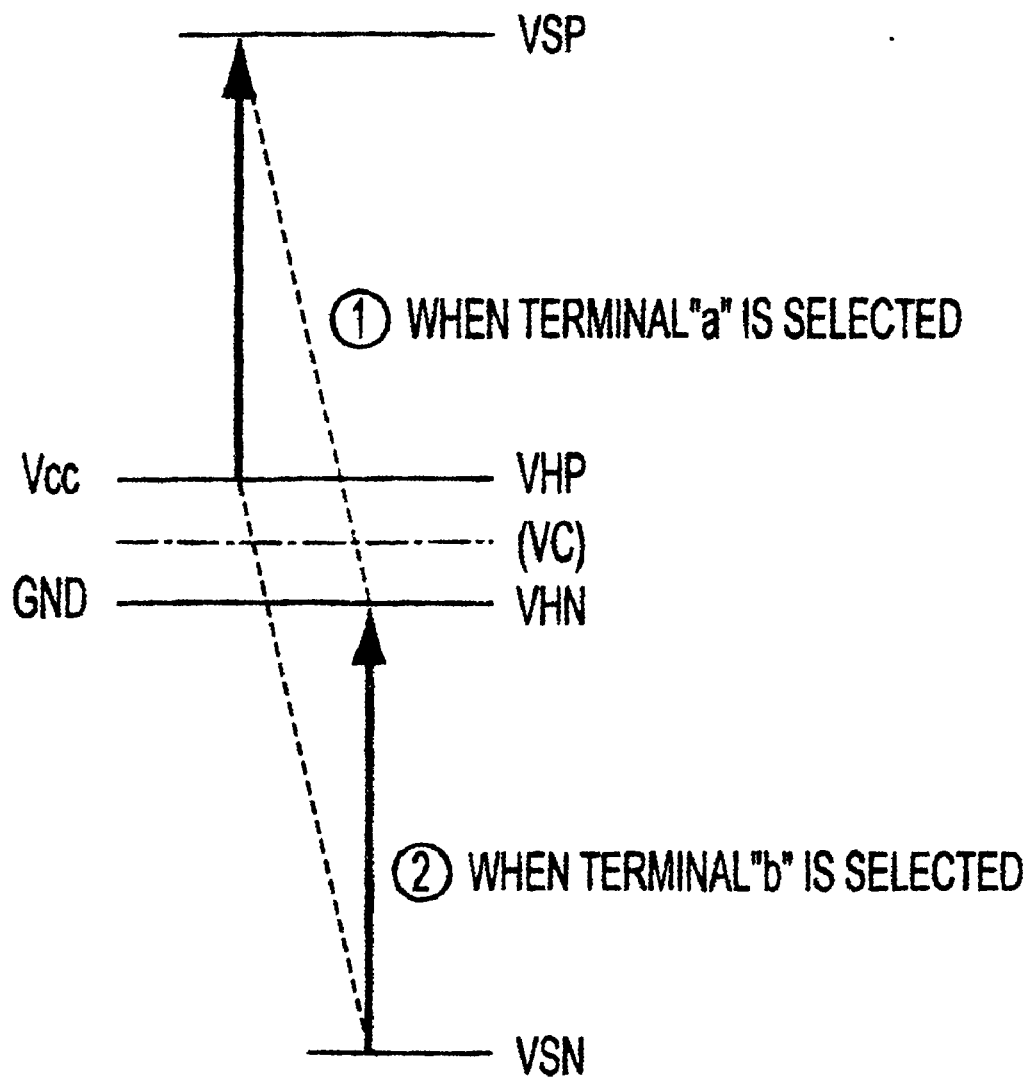
FIG. 16 is a schematic illustration of a polarity inverting operation performed in the first modification of the power supply circuit.

In the inverter circuit 430 described above, the selection terminal b of the switch SW1 is connected to the supply line of the voltage Vcc, and the selection terminal a of the switch SW2 is connected to the ground potential GND. Alternatively, as shown in FIG. 15, the selection terminal b of the switch SW1 may be connected to the ground potential GND, and the selection terminal a of the switch SW2 may be connected to the supply line of the voltage Vcc. In this configuration, if the terminals a of the respective switches SW1 and SW2 are selected, the capacitor Cp is charged such that one end of the capacitor Cp has a high potential corresponding to the selection voltage VSP and the other end has a low potential corresponding to the voltage Vcc, as represented by (1) in FIG. 16. When the terminals b of the respective switches SW1 and SW2 are selected thereafter, the high-potential end of the capacitor Cp is connected to the ground potential GND, and thus the voltage of the low-potential signal line n1 is lowered by a magnitude corresponding to the potential shift (VSP–GND) at the high-potential end of the capacitor Cp, from the voltage Vcc at which the signal line n1 was when the terminals a were selected, as represented by (2) in FIG. 16. As a result, as in the first embodiment, the negative-polarity selection voltage VSN, which is an inversion of the positive-polarity selection voltage VSP with respect to the center voltage VC, appears on the low-potential signal line n1. Note that the oscillator circuit 440 is not shown in FIG. 15 for the purpose of simplicity, as will also be in FIGS. 17, 19, and 23.

Figure 17:
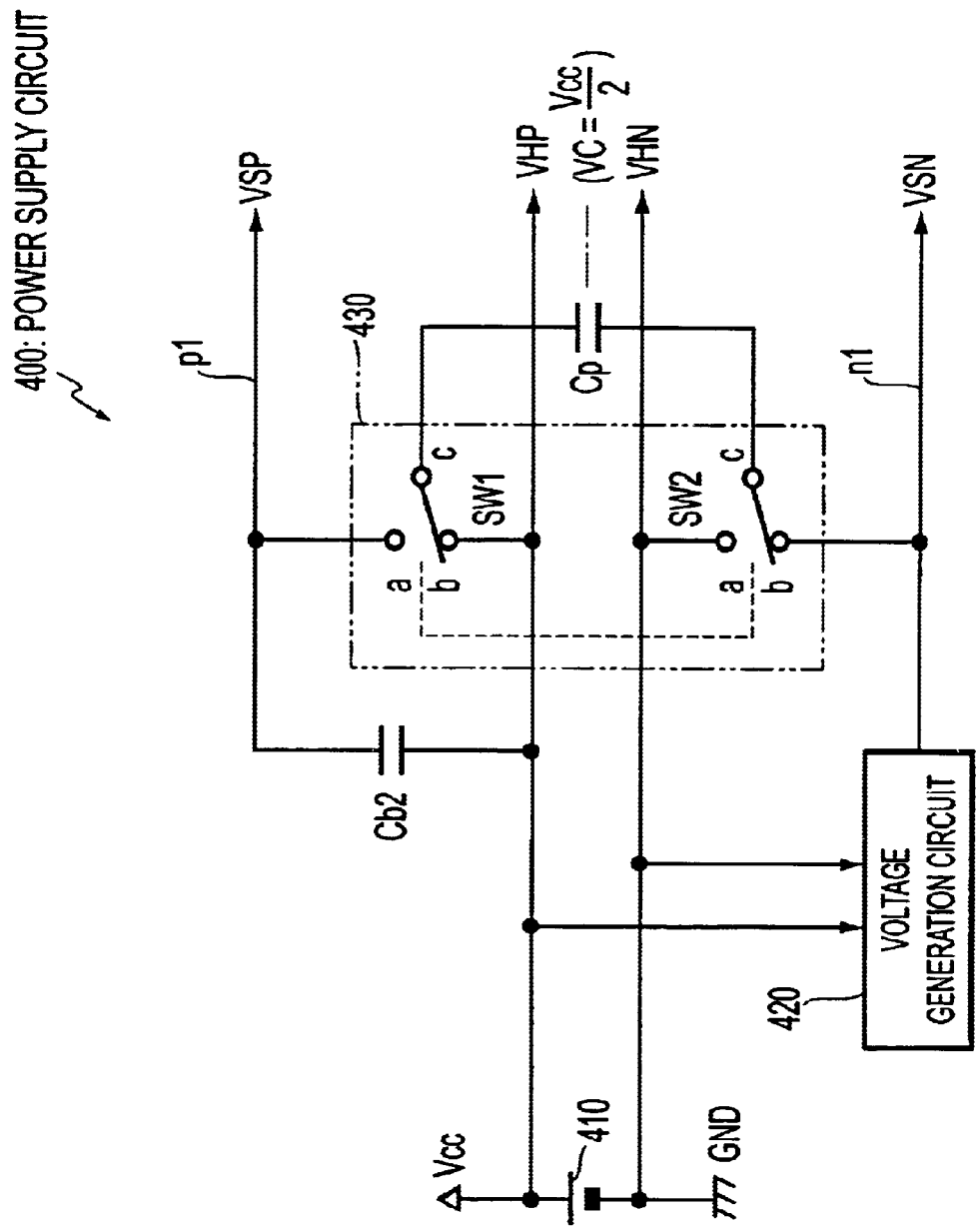
FIG. 17 is a block diagram illustrating a second modification of the power supply circuit.
Figure 18:
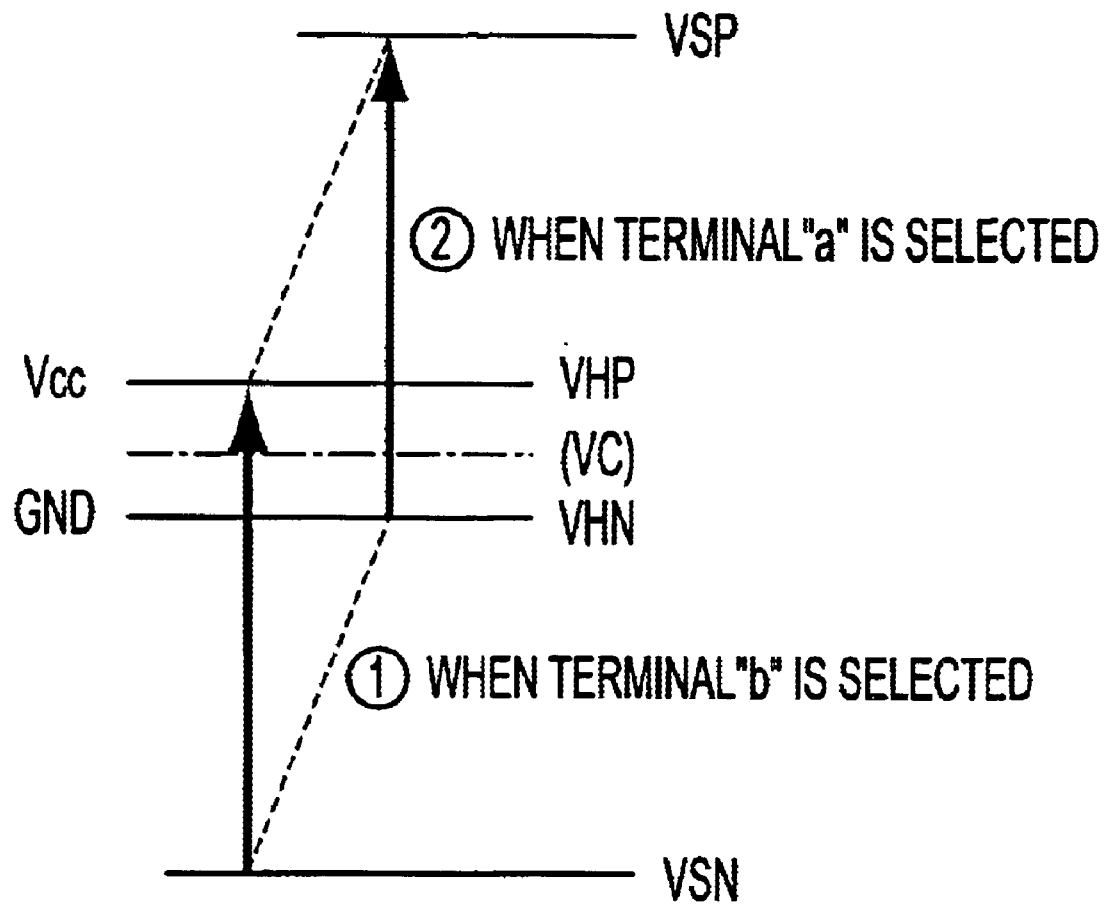
FIG. 18 is a schematic illustration of a polarity inverting operation performed in the second modification of the power supply circuit.

In the voltage generation circuit 420 described above, the positive-polarity selection voltage VSP is generated. Alternatively, as shown in FIG. 17, the voltage generation circuit 420 may generate the negative-polarity selection voltage VSN. In this configuration, if the terminals b of the respective switches SW1 and SW2 are selected, the capacitor Cp is charged such that one end of the capacitor Cp has a high potential corresponding to the voltage Vcc, and the other end has a low potential corresponding to the negative-polarity selection voltage VSN, as represented by (1) in FIG. 18. When the terminals a of the respective switches SW1 and SW2 are selected thereafter, the low-potential end of the capacitor Cp is connected to the ground potential GND, and thus the potential of the high-potential signal line p1 is raised by a magnitude corresponding to the potential shift (GND–VSN) at the low-potential end of the capacitor Cp, from the voltage Vcc at which the signal line p1 was when the terminals b were selected. As a result, the positive-polarity selection voltage VSP, which is the inversion of the negative-polarity selection voltage VSN with respect to the center voltage VC, appears on the high-potential signal line p1.

Figure 19:
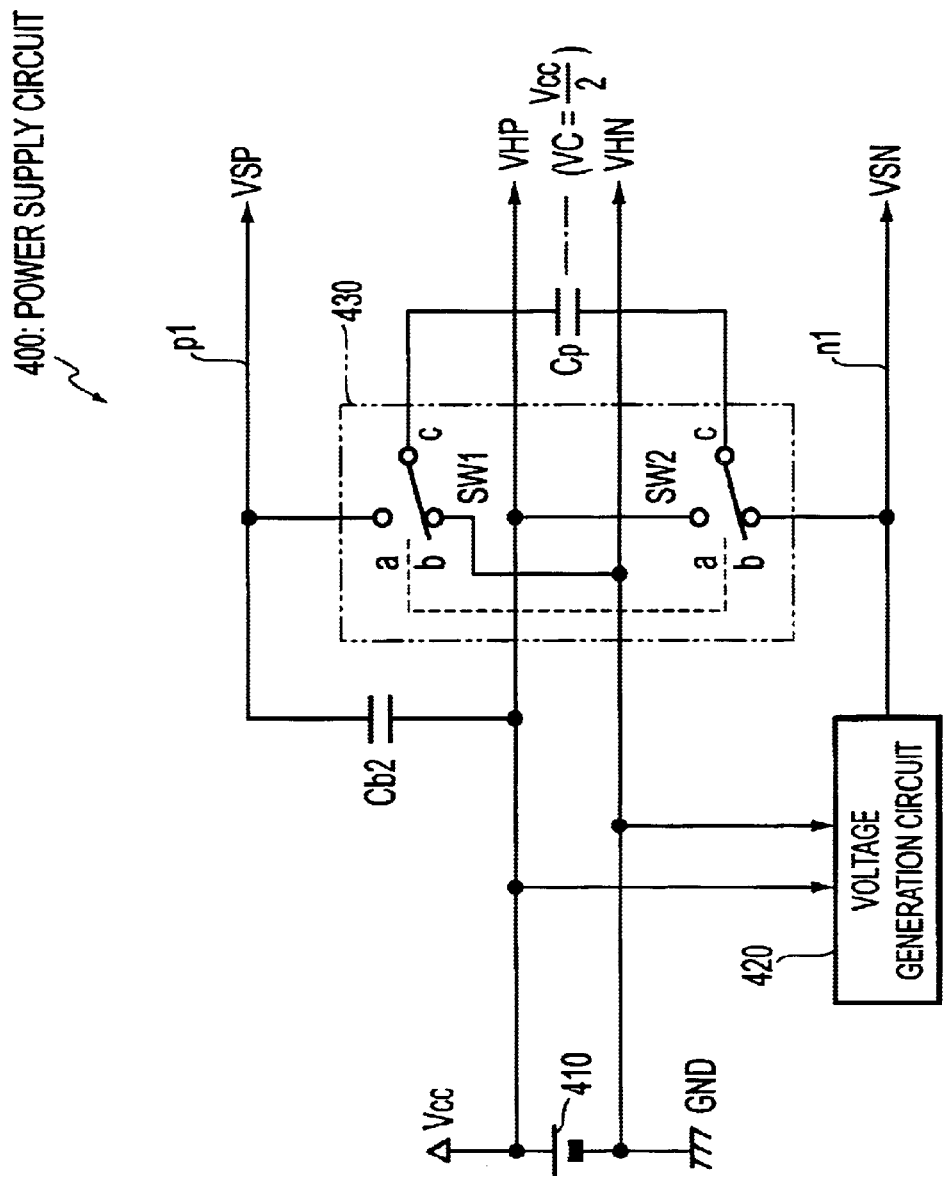
FIG. 19 is a block diagram illustrating a third modification of the power supply circuit.
Figure 20:
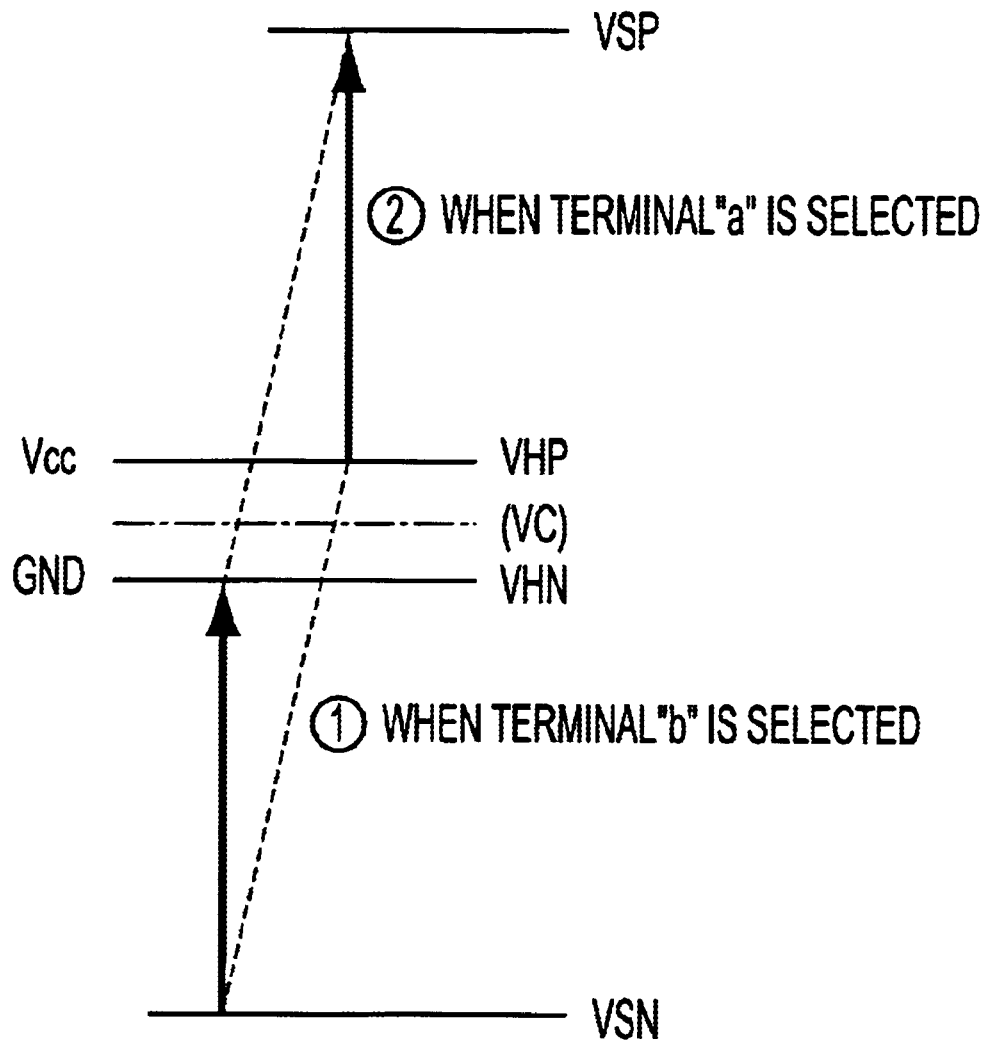
FIG. 20 is a schematic illustration of a polarity inverting operation performed in the third modification of the power supply circuit.

In the voltage generation circuit 420 configured such that the negative-polarity selection voltage VSN is generated, the selection terminal b of the switch SW1 may be connected to the ground potential GND and the selection terminal a of the switch SW2 may be connected to the supply line of the voltage Vcc, as shown in FIG. 19. In this configuration, if the terminals b of the respective switches SW1 and SW2 are selected, the capacitor Cp is charged such that one end of the capacitor Cp has a high potential corresponding to the ground potential GND and the other end has a low potential corresponding to the negative-polarity selection voltage VSN, as represented by (1) in FIG. 20. When the terminals a of the respective switches SW1 and SW2 are selected thereafter, the low-potential end of the capacitor Cp is connected to the voltage Vcc, and thus the potential of the high-potential signal line p1 is raised by a magnitude corresponding to the potential shift (Vcc–VSN) at the low-potential end of the capacitor Cp, from the ground potential GND at which the signal line p1 was when the terminals b were selected, as shown in (2) in FIG. 20. As a result, the positive-polarity selection voltage VSP, which is the inversion of the negative-polarity selection voltage VSN with respect to the center voltage VC, appears on the high-voltage signal line p1.

Figure 21:
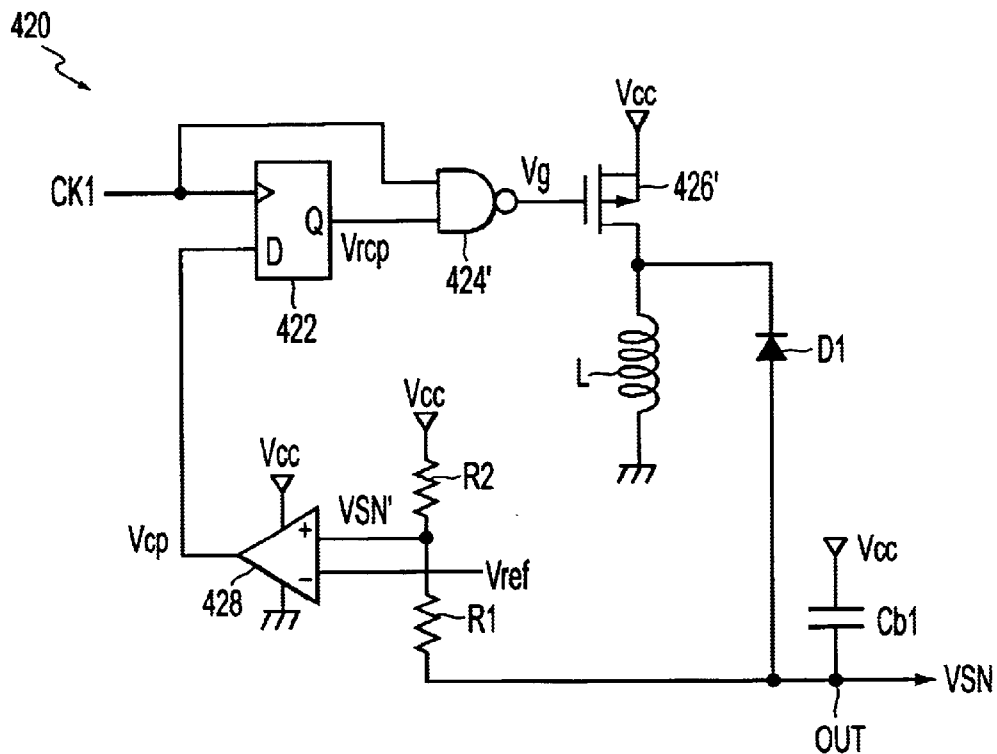
FIG. 21 is a circuit diagram illustrating a configuration of the voltage generation circuit applicable to the third modification of the power supply circuit.

In FIGS. 17 and 19, the voltage generation circuit 420 for generating the negative-polarity selection voltage VSN may be formed to be of the first type as shown in FIG. 21. However, because of the polarity difference, the voltage generation circuit 420 shown in FIG. 21 is different from that shown in FIG. 6 in the following respects. First, the voltage Vcc is replaced with the ground potential GND, and the ground potential GND is replaced with the voltage Vcc. Second, the forward direction of the diode D1 is reversed. Third, signals applied to the positive and negative input terminals, respectively, of the comparator 428 are replaced with each other. Fourth, the n-type transistor 426 is replaced with a p-type transistor 426'. Fifth, the AND gate 424 is replaced with a NAND circuit 424'. In this configuration, when the transistor 426' is turned off, energy stored in the inductor L during an on-period of the transistor 426' is released in a direction with the opposite polarity and stored in the capacitor Cb1 (discharged in the strict sense). The transistor 426' is turned on and off in a similar manner as the transistor 426 described above with reference to FIG. 6. That is, the voltage VSN' obtained by dividing the selection voltage VSN output from the voltage generation circuit 420 is compared with the reference voltage Vref, and the transistor 426' is turned on or off, depending upon the comparison result. Thus, if the negative-polarity selection voltage VSN is high (small in absolute value), the inverted signal of the clock signal CK1 is supplied to the transistor 426', thereby lowering the selection voltage VSN (thereby increasing the absolute value thereof). Conversely, if the negative-polarity selection voltage VSN is low (large in absolute value), the inverted signal of the clock signal CK1 is not applied to the transistor 426', and thus, the selection voltage VSN is raised (reduced in absolute value).

Figure 22:
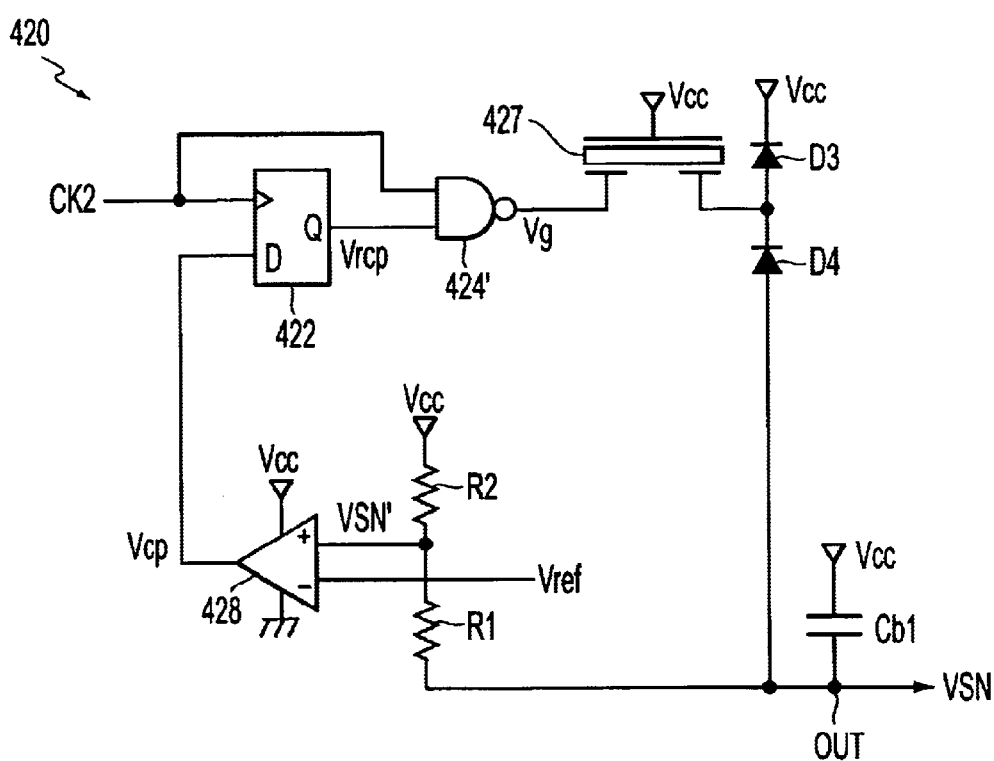
FIG. 22 is a circuit diagram illustrating another configuration of the voltage generation circuit applicable to the third modification of the power supply circuit.

The voltage generation circuit 420 for generating the negative-polarity selection voltage VSN may also be formed to be of the second type as shown in FIG. 22. However, because of the polarity difference, the voltage generation circuit 420 shown in FIG. 22 is different from that shown in FIG. 8 in the following respects. First, the voltage Vcc is replaced with the ground potential GND, and the ground potential GND is replaced with the voltage Vcc. Second, the forward directions of the diodes D3 and D4 are reversed. Third, signals supplied to the positive and negative input terminals, respectively, of the comparator 428 are replaced with each other. Fourth, the AND circuit 424 is replaced with a NAND circuit 424'. In this configuration, if the negative-polarity selection voltage VSN is high, the inverted signal of the clock signal CK2 is supplied to the primary side of the piezoelectric transformer 427, thereby lowering the selection voltage VSN. Conversely, if the negative-polarity selection voltage VSN is low, the inverted signal of the clock signal CK2 is not supplied to the primary side of the piezoelectric transformer 427, and thus, the selection voltage VSN rises up.

In the configuration shown in FIG. 22, the common electrode of the piezoelectric transformer 427 and the anode of the diode D3 are connected to the supply line of the voltage Vcc. Alternatively, they may be connected to the ground potential GND. Furthermore, although in the configurations in FIGS. 21 and 22, one end of the capacitor Cb1 is connected to the supply line of the voltage Vcc, it may instead be connected to the ground potential GND. In this case, the capacitor Cb1 is allowed to have a lower breakdown voltage.

Figure 23:
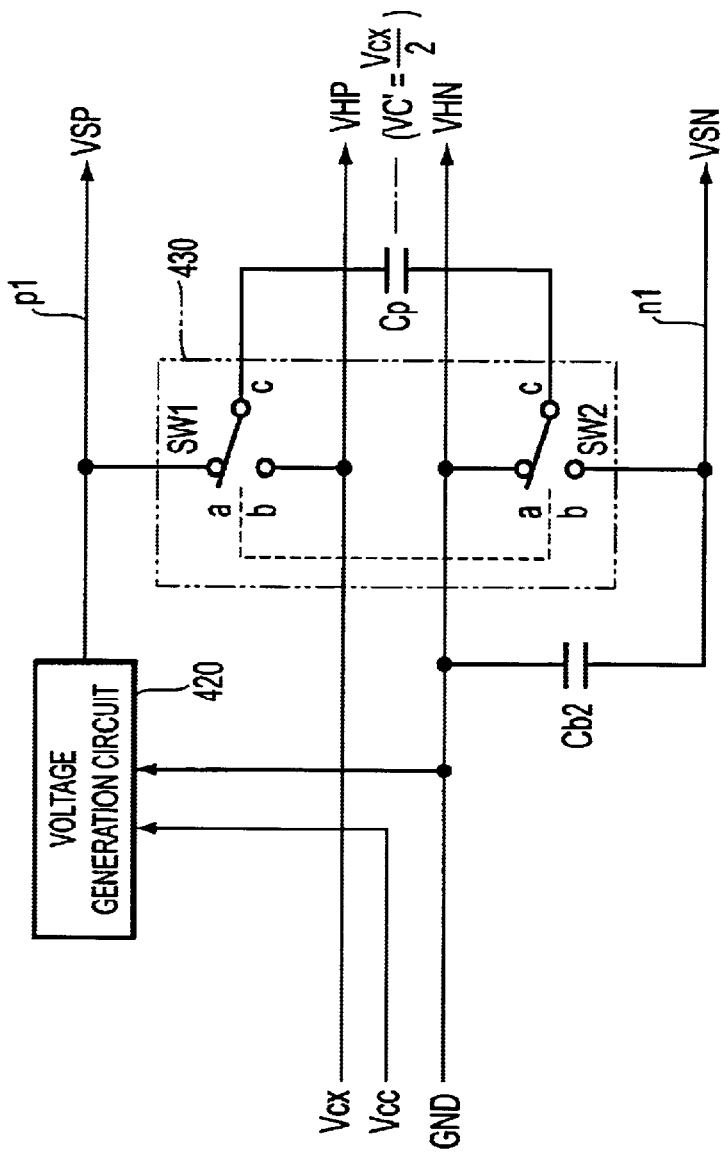
FIG. 23 is a block diagram illustrating a fourth modification of the power supply circuit.
Figure 24:
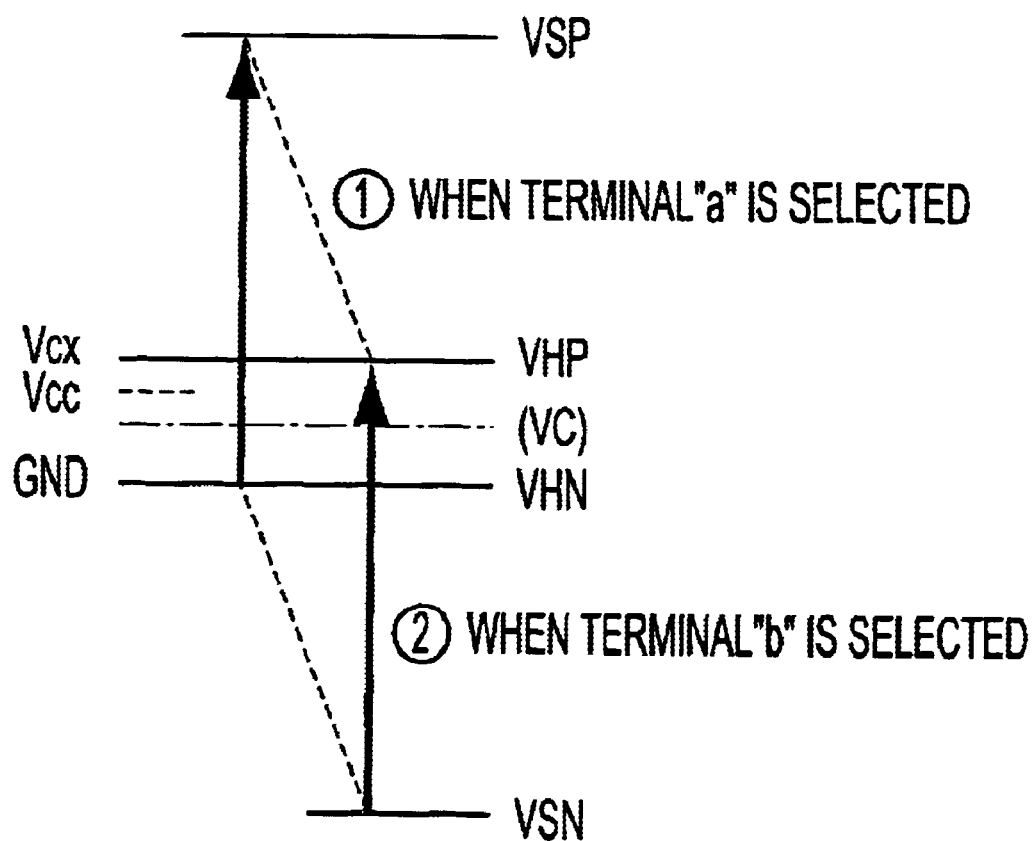
FIG. 24 is a schematic illustration of a polarity inverting operation performed in the fourth modification of the power supply circuit.

In some cases, the characteristics of the electro-optical material and/or other factors make it impossible to use the voltage Vcc generated by the power supply 410 (FIG. 4) as the voltage applied to the data lines. In such a case, a voltage Vcx different from Vcc may be supplied as a high-level data signal voltage (non-selection voltage) VHP, and the ground potential GND may be supplied as a low-level data signal voltage (non-selection voltage) VHN. Furthermore, in this case, the terminals b of the switch SW1 is connected to the voltage supply line Vcx, as shown in FIG. 23. In this configuration, if the terminals a of the respective switches SW1 and SW2 are selected, the capacitor Cp is charged such that one end of the capacitor Cp has a high voltage corresponding to the selection voltage VSP and the other end has a low voltage corresponding to the ground potential GND, as represented by (1) in FIG. 24. When the terminals b of the respective switches SW1 and SW2 are selected thereafter, the high-potential end of the capacitor Cp is connected to the voltage Vcx, and thus the potential of the low-potential signal line n1 is lowered by a magnitude corresponding to the potential shift (VSP–Vcx) at the high-potential end of the capacitor Cp, from the ground potential GND at which the signal line n1 was when the terminals a were selected, as represented by (2) in FIG. 24. As a result, as in the first embodiment, the negative-polarity selection voltage VSN, which is the inversion of the positive-polarity selection voltage VSP with respect to the center value VC' (=Vcx/2) of voltages applied to the data lines, appears on the low-potential signal line n1.

In this configuration, the voltage Vcx may be generated from Vcc–GND using an operational amplifier (not shown) or a DC-DC converter (not shown). Although not shown in the figures, the terminal b of the switch SW1 may be connected to the ground potential GND, and the terminal a of the switch SW2 may be connected to the supply line for the voltage Vcx.

The configuration in which the voltage Vcx is used instead of Vcc may also be applied to the other embodiments. That is, in the configurations shown in FIGS. 15, 17 and 19, Vcc may be replaced with Vcx.

When asymmetry of the current-voltage characteristics of TFDs 220 with respect to the polarity is required to be compensated for by an applied voltage, Vcc–GND may be employed as the data signal voltage, and, in the power supply circuit 400, the positive-polarity selection voltage VSP and the negative-polarity selection voltage VSN may be generated using a voltage Vcx different from Vcc, such that the selection voltages become asymmetric with respect to the center voltage VC of data signals, thereby compensating for the asymmetry of the TFDs 220.

Second Embodiment

In the first embodiment of the power supply circuit 400, TFDs 220 serving as switching elements are employed in the panel 100, and thus, the center voltage VC of the data signal voltages is not actually produced. However, in passive matrix electro-optical devices in which switching elements such as a TFD 220 are not used, a non-selection voltage is generally employed as the center voltage VC of data signal voltages.

Figure 25:
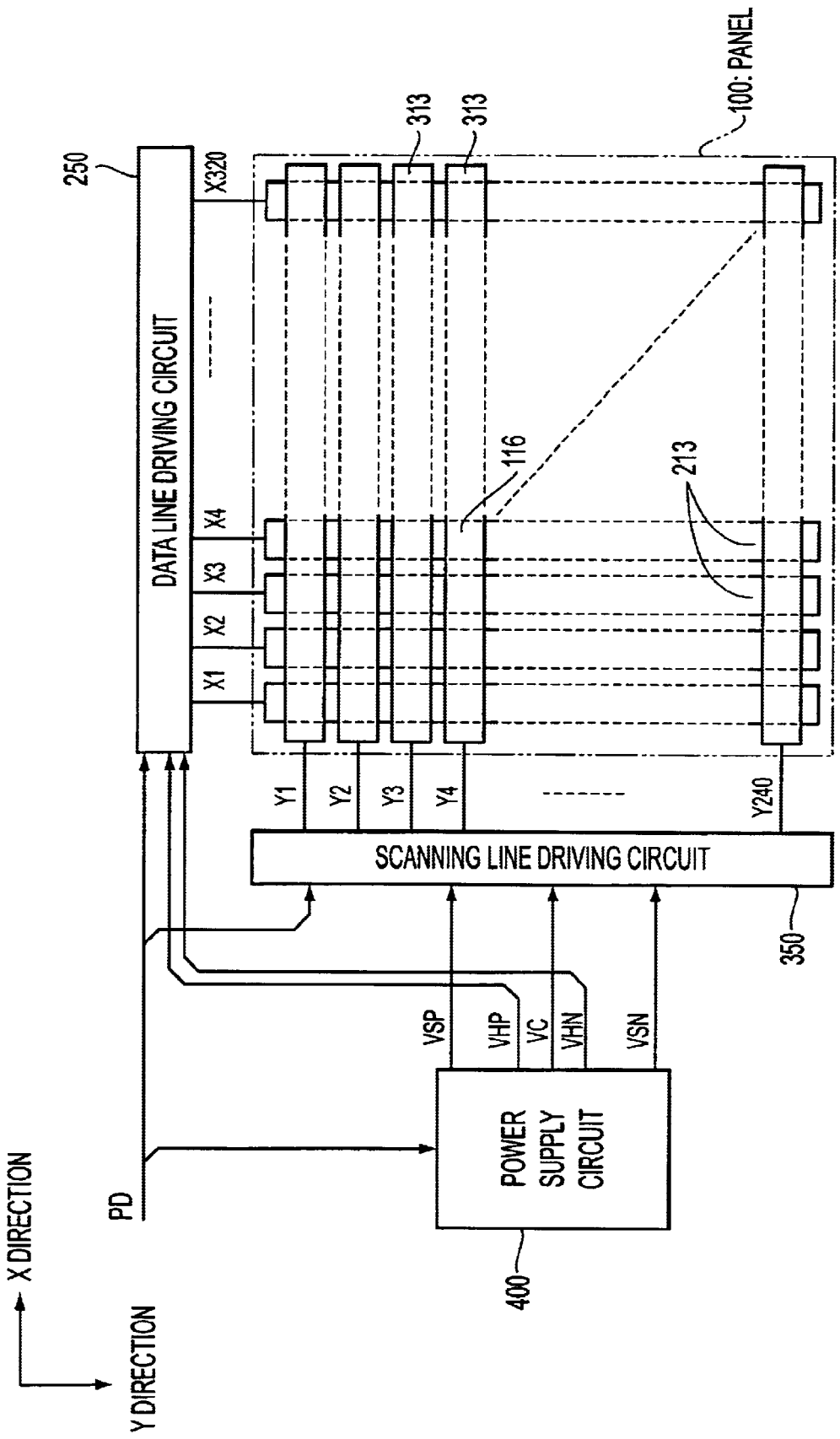
FIG. 25 is a block diagram illustrating the general configuration of an electro-optical device including a power supply circuit according to a second embodiment of the present invention.

In view of the above, in a second embodiment of the present invention, the power supply circuit is formed into a configuration suitable for use with a passive matrix electro-optical device as described below. Before describing the power supply circuit, the general configuration of the electro-optical device including the power supply circuit is first described in a brief fashion. FIG. 25 is a block diagram illustrating the electrical configuration of the electro-optical device 100'. The electro-optical device 100' shown in FIG. 25 is different from the electro-optical device 100 shown in FIG. 1 in the following respects. First, the panel 100' does not include switching elements similar to the TFDs 220, and thus, scanning electrodes (scanning lines) 313 and data electrodes (data lines) 213 simply extend in the row and column directions, respectively. Second, the power supply circuit 400 actually generates the center voltage VC as well as the selection voltages VSP and VSN and the data signal voltages VHP and VHN. Third, a display control signal PD is supplied to the data line driving circuit 250, the scanning line driving circuit 350, and the power supply circuit 400.

Figure 26:
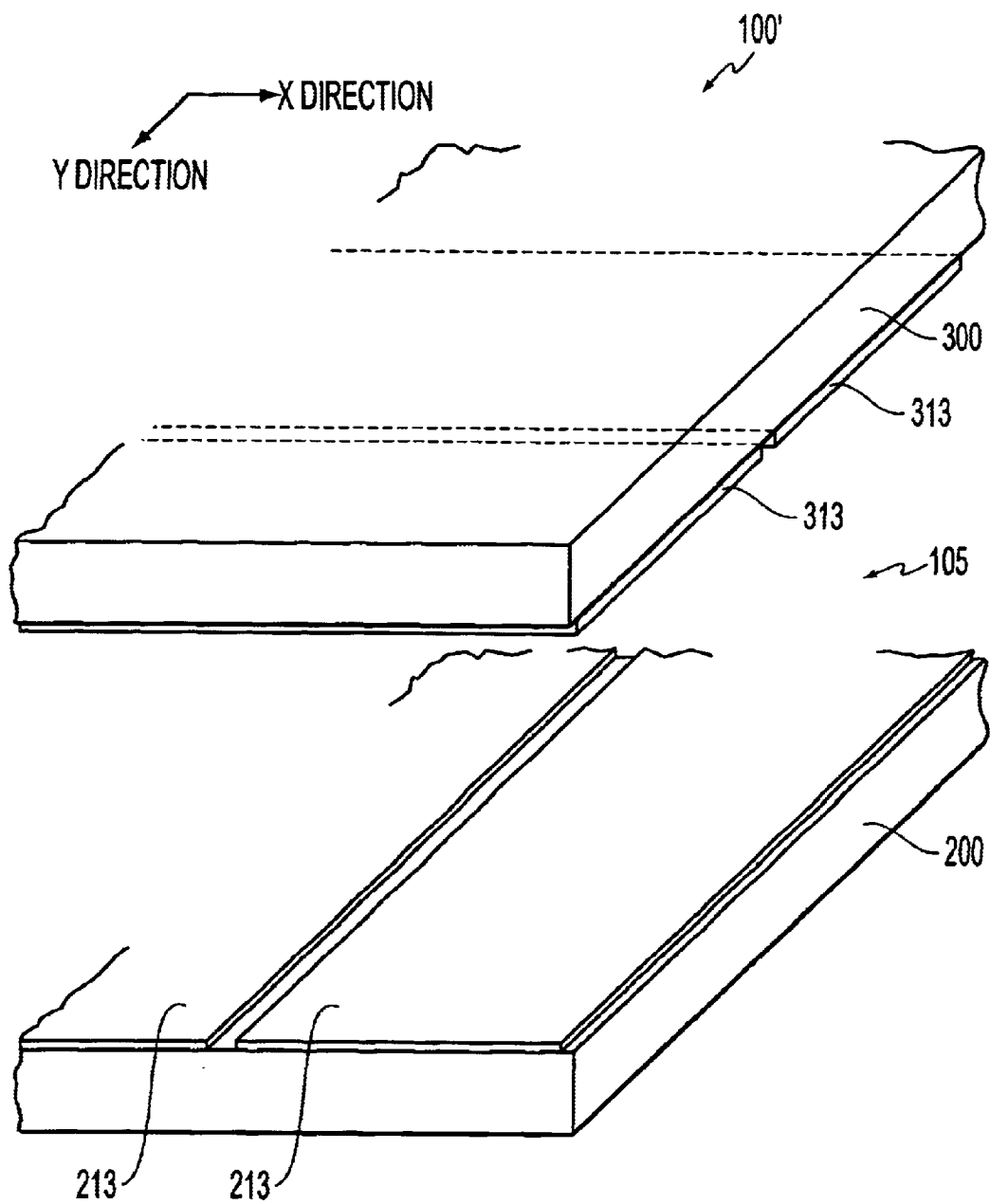
FIG. 26 is a partially cutaway perspective view illustrating the structure of the panel of the electro-optical device.

The first difference described above allows the panel 100' to be formed in a very simple structure as shown in FIG. 26. That is, in the panel 100', the data electrodes 213 are formed on one substrate 200, and the scanning electrodes 313 are formed on the other substrate 300. In the space between these two substrates, a liquid crystal 105 is disposed as an electro-optical material. As for the liquid crystal 105, various types of liquid crystals may be employed. They include a bistable type liquid crystal such as a TN liquid crystal, an STN (super twisted nematic) liquid crystal, a BTN (B1-stable twisted nematic) liquid crystal, a ferroelectric liquid crystal, and a polymer dispersed liquid crystal. Pixels 116 are formed at respective intersections between the data electrodes 213 and the scanning electrodes 313, wherein each pixel 116 is composed of a data electrode 213, a scanning line electrode 313, and a liquid crystal disposed between these two electrodes.

Figure 27:
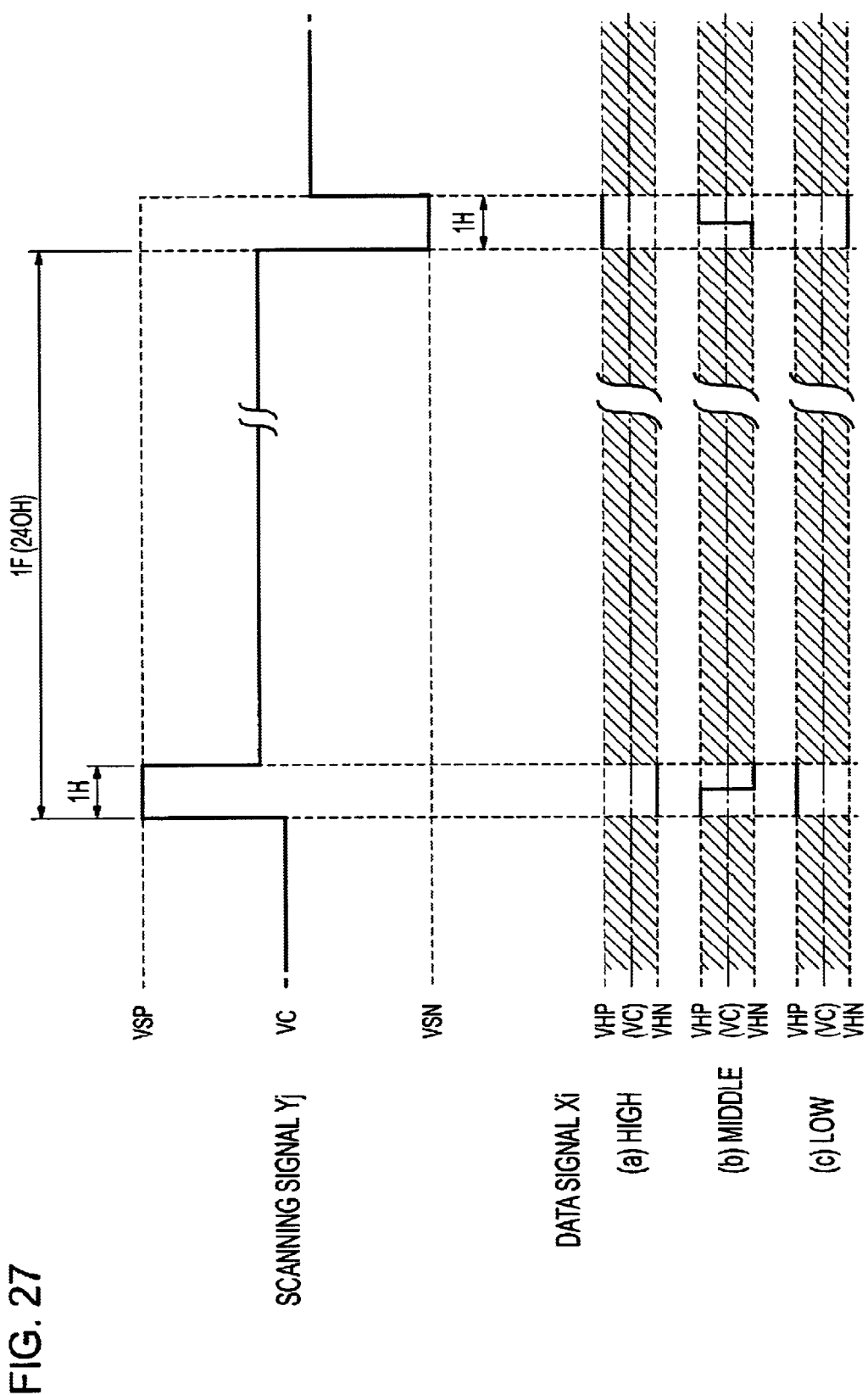
FIG. 27 is a waveform diagram illustrating an example of a driving signal waveform used in the electro-optical device.

The second difference described above is required to drive the electro-optical device using driving signals having waveforms such as those shown in FIG. 27. In FIG. 27, selection voltages VSP and VSN are similar to those in FIG. 3. However, the difference is in that only the center voltage VC is used as the non-selection voltage. Because of this difference, in FIG. 25, the center voltage VC is supplied as the non-selection voltage to the scanning line driving circuit 350.

As shown in FIG. 27, the selection signal associated with the scanning signal Yj is applied as the positive-polarity selection voltage VSP or the negative-polarity selection voltage VSN, over one horizontal scanning period (1H) in which the scanning electrode 313 is selected. In correspondence with the scanning signal Yj, the data signal Xi is applied as follows. That is, when on-level data is displayed by the pixel 116 located at the intersection between the ith data electrode 213, counted from the leftmost position in FIG. 25, and the jth scanning electrode 313, counted from the top position, and when the positive-polarity selection voltage is applied to the jth scanning electrode 313 during one horizontal scanning period (1H) during which the jth scanning electrode 313 is selected, the data signal Xi becomes, as shown in portion (a) of FIG. 27, equal to the low-level data signal voltage VHN having a polarity opposite to that of the selection voltage. On the other hand, when on-level data is displayed by the same pixel, but the negative-polarity selection voltage VSN is applied to the jth scanning electrode 313 during one horizontal period (1H), during which the jth scanning electrode 313 is selected, the data signal Xi becomes equal to the high-level data signal voltage VHP having a polarity opposite to that of the selection voltage, as shown in portion (a) of FIG. 27.

When off-level data is displayed by the pixel 116 located at the intersection between the ith data electrode 213 counted from the leftmost position in FIG. 25 and the jth scanning electrode 313 counted from the top position, and when the positive-polarity selection voltage VSP is applied to the jth scanning electrode 313 during one horizontal scanning period (1H), during which the jth scanning electrode 313 is selected, the data signal Xi becomes equal to the high-level data signal voltage VHP having the same polarity as that of the selection voltage, as shown in portion (c) of FIG. 27. On the other hand, when off-level data is displayed by the same pixel, but the negative-polarity selection voltage VSN is applied to the jth scanning electrode 313 during one horizontal period (1H), during which the jth scanning electrode 313 is selected, the data signal Xi becomes equal to the low-level data signal voltage VHN having the same polarity as that of the selection voltage, as shown in portion (c) of FIG. 27.

Figure 28:
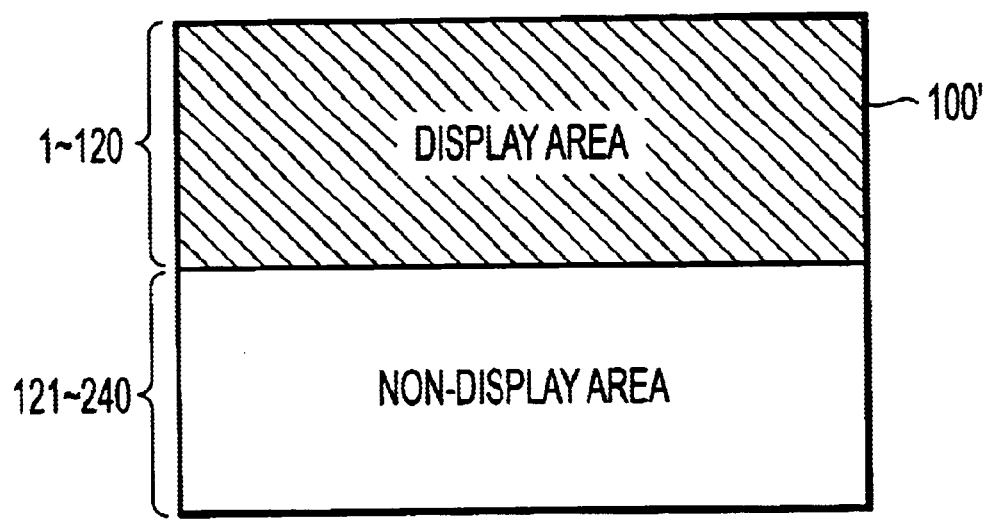
FIG. 28 is a plan view of a panel of the electro-optical device operating in a partially displaying mode.

Now, the third difference is discussed. The display control signal PD is supplied from a control circuit (not shown) to control the display area. When only an area associated with some particular scanning electrodes 313 is displayed but the area associated with the remaining scanning electrodes 313 is not displayed (that is, in a partially displaying mode), the display control signal PD is raised to the high level during the period in which the scanning electrodes 313 associated with the display area are selected, and it is lowered to the low level during the other periods. More specifically, when an area which is scanned by scanning electrodes at the 1st through 120th positions counted from the top position in the panel 100' is selected as the display area, as shown in FIG. 28, and the remaining area which is scanned by scanning electrodes at the 121st through 240th positions is selected as the non-display area as shown in FIG. 28, the display control signal PD is raised to the high level during the first half period (120H) of one vertical scanning period (1F), and is lowered to the low level during the second half period (120H), as shown in FIG. 29.

Figure 29:
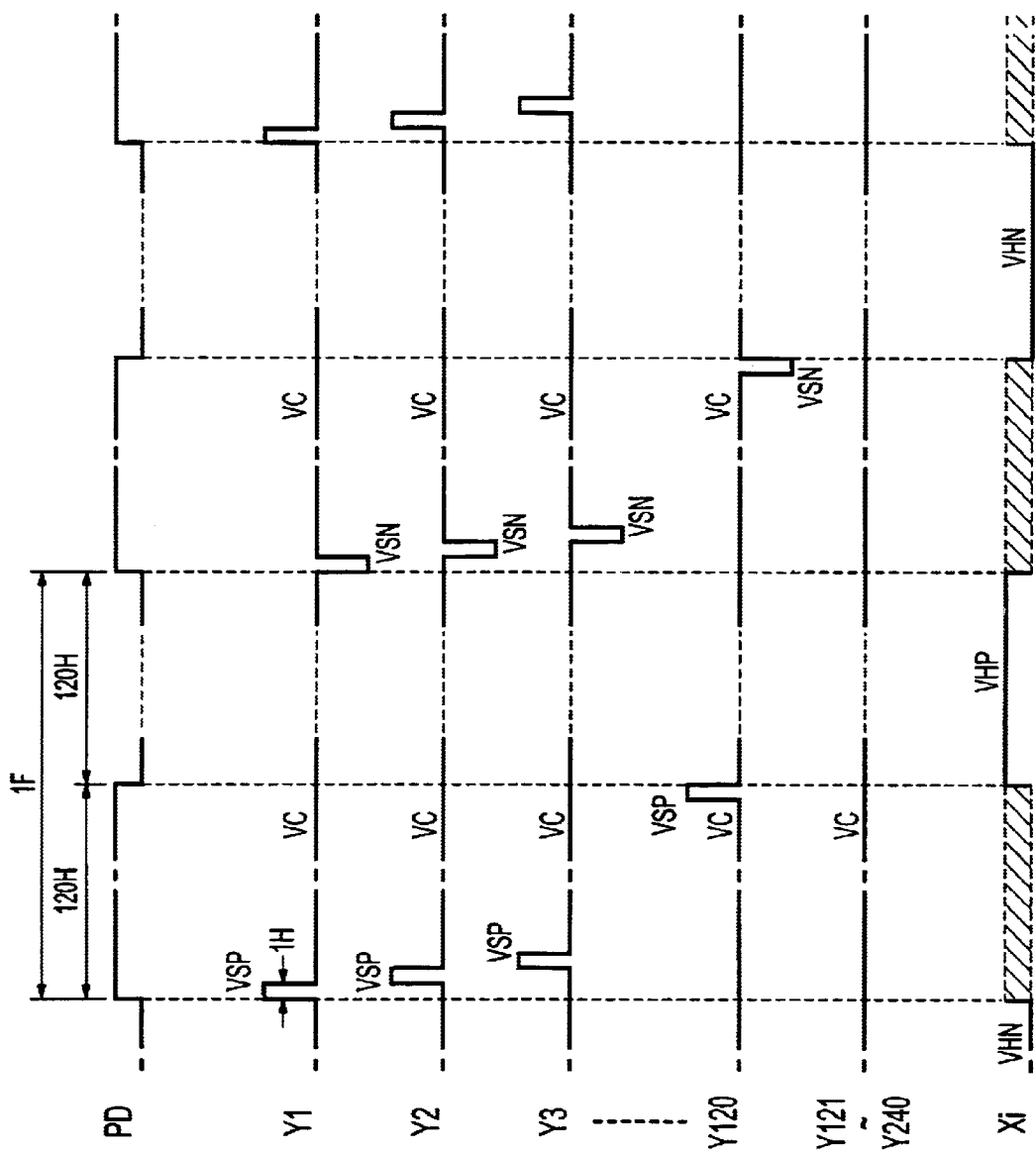
FIG. 29 is a waveform diagram illustrating signal waveforms used by the electro-optical device in the partially displaying mode.

In this process, as shown in FIG. 29, each of the scanning signals Y1–Y120 applied to the scanning electrodes 313 associated with the display area has a value equal to the selection signal VSP or VSN during one horizontal scanning period (1H) in which the corresponding scanning electrode is selected. However, the scanning signals Y121–Y240 applied to the scanning electrodes 313 associated with the non-display area are fixed at the non-selection voltage VC. On the other hand, during the period in which the display control signal PD is at the high level, the value of the data signal Xi is determined depending on the polarity of the selection voltage, and also depending on the content displayed at the pixel located at the intersection with the corresponding scanning electrode 313, as described earlier. However, during the period in which the display control signal PD is at the low level, the data signal Xi is fixed at its voltage level when the scanning signal Y120 becomes equal to the selection voltage. That is, during the period in which the display control signal PD is at the low level, the value of the data signal Xi is fixed at either the voltage VHP or VHN, depending on the polarity of the selection voltage, and also depending on the content displayed at the pixel 116 located at the intersection between the ith data electrode 213 and the 240th scanning electrode 313 located on the boundary of the display area. Because the polarity of the selection voltage associated with the scanning signal Yj is inverted every vertical scanning period (1F), the value of the data signal Xi during the period in which the display control signal PD is at the low level is also inverted every vertical scanning period (1F). Thus, during the period in which the display control signal PD is at the low level, the value of the scanning signals Y1–Y120 fixed at the non-selection voltage VC, and the value of the data signal Xi result in a zero effective value for the voltage applied to the pixels 116 in the non-display area. As a result, off-level data is displayed at the pixels 116 in the nondisplay area.

Power Supply Circuit

Figure 30:
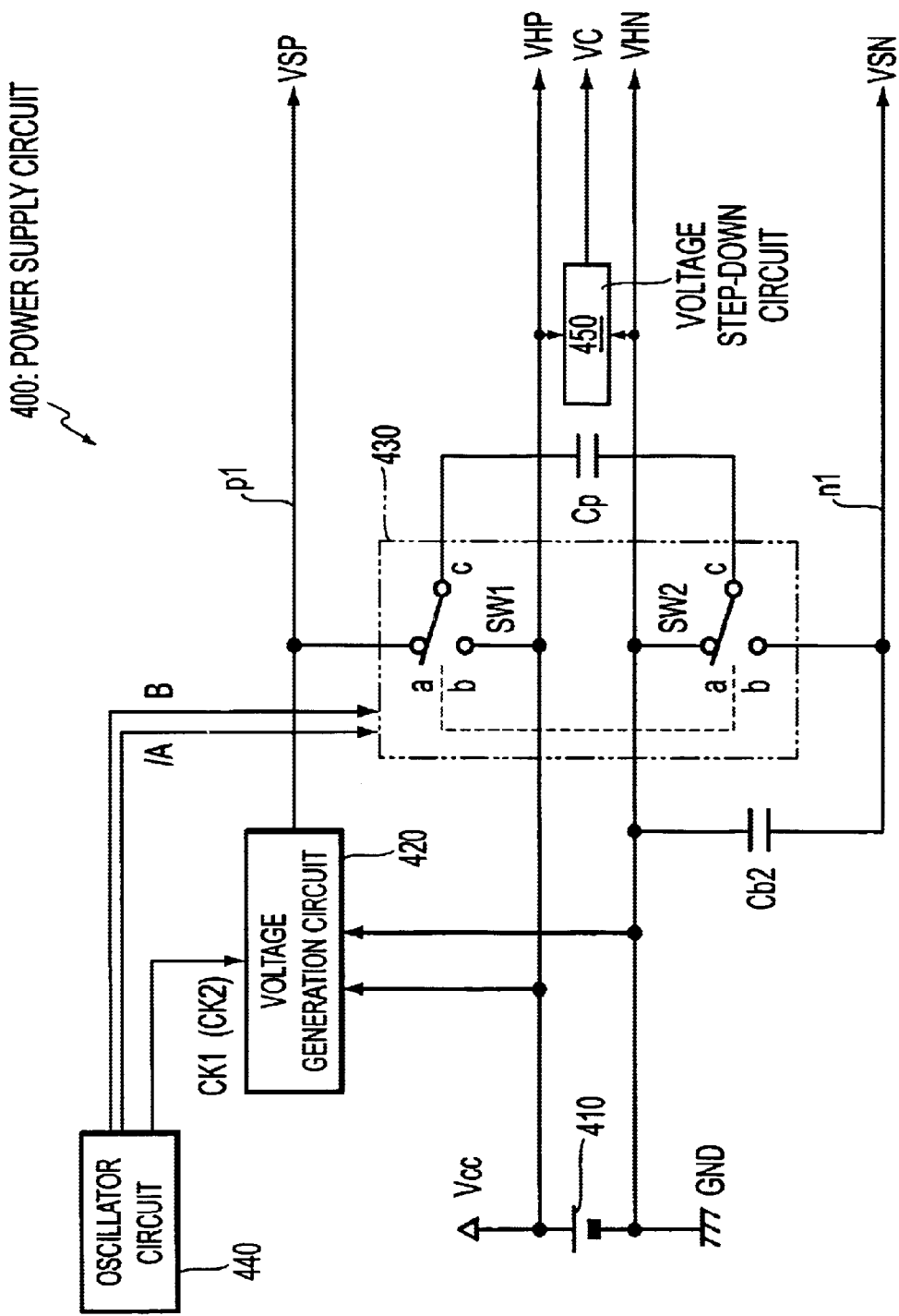
FIG. 30 is a block diagram illustrating the configuration of the power supply circuit in the electro-optical device.

The power supply circuit according to the second embodiment of the present invention is now described below. FIG. 30 is a block diagram illustrating the general configuration of the power supply circuit 400. This power supply circuit 400 is similar to the power supply circuit 400 according to the first embodiment (FIG. 4) in that the selection voltages VSP and VSN are generated from Vcc–GND supplied from a single power supply 410. However, the power supply circuit 400 according to this embodiment is different in that the center voltage VC(=Vcc/2) is generated by a voltage step-down circuit 450 and is supplied as the non-selection voltage. The power supply circuit 400 of this embodiment is also different in that the voltage Vcc and the ground potential GND are supplied as the high-level data signal voltage VHP and the low-level data signal voltage VHN, respectively, without using them in common as the non-selection voltage.

Figure 31:
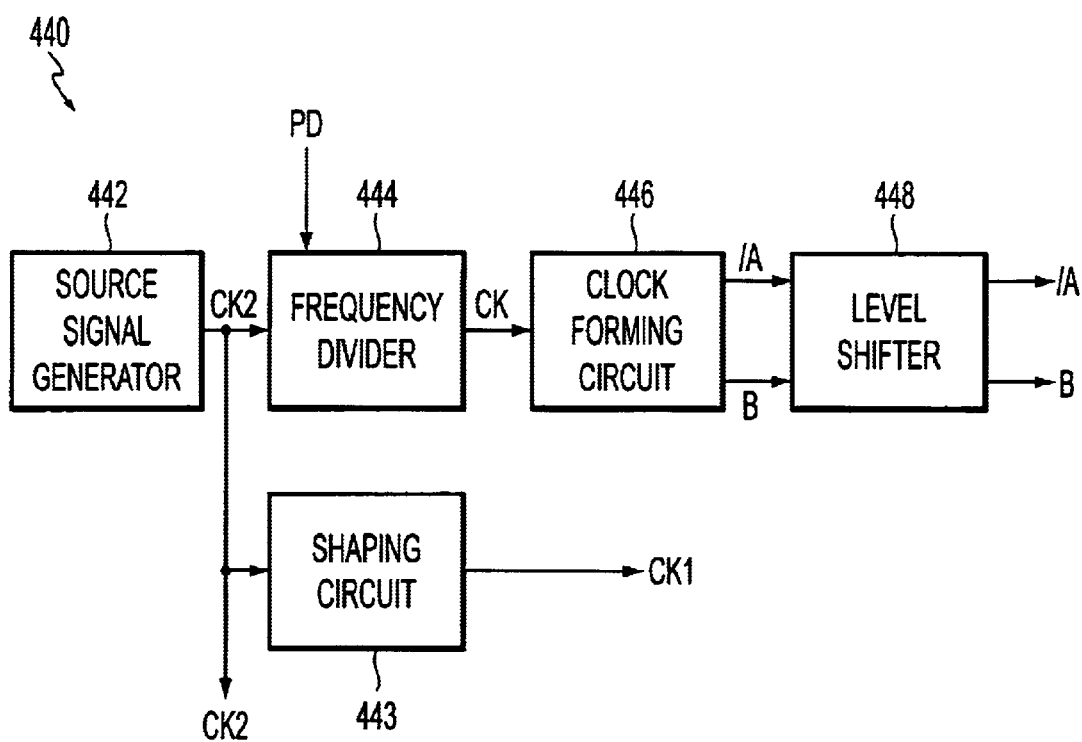
FIG. 31 is a block diagram illustrating the configuration of an oscillator circuit in the power supply circuit.

The power supply circuit 400 of this embodiment also has a slight difference in the oscillator circuit 440. That is, as shown in FIG. 31, the display control signal PD is supplied to the frequency divider 444 which produces the clock signal CK by dividing the frequency of the clock signal CK2 supplied from the source signal generator 442. In the present embodiment, the frequency divider 444 outputs the clock signal CK only when the display control signal PD is at the high level, and the frequency divider 444 stops outputting the clock signal CK when the display control signal PD becomes low. When the outputting of the clock signal CK is stopped, the clock forming circuit 446 does not generate the signals/A and B, and thus, the switching operations of the switches SW1 and SW2 in the inverter circuit 430 are stopped.

When the display control signal PD is at the low level, the voltage applied to the scanning electrodes 313 is fixed at the non-selection voltage VC, and thus, it is not required to generate the positive and negative selection voltages VSP and VSN. Therefore, the switching operations of the switches SW1 and SW2 for generating the other selection voltage from a first selection voltage are useless. In view of the above, in the power supply circuit according to the present embodiment, the switching operations of the switches SW1 and SW2 in the inverter circuit 430 are stopped when the display control signal PD is at the low level, thereby achieving a reduction in the electric power consumption.

Instead of stopping the output of the clock signal CK from the frequency divider 444 when the display control signal PD is at the low level, the division ratio may be increased so as to reduce the frequency of the clock signal CK, thereby reducing the electric power consumption.

The second embodiment is similar to the first embodiment in the other respects. That is, in a first respect, the voltage generation circuit 420 of the second embodiment may be constructed either in the form of the first type (FIG. 6) or in the form of the second type (FIG. 8). In a second respect, the voltage used by the inverter circuit 430 to invert the polarity may also be determined in a similar manner as in the first embodiment. Therefore, the configuration shown in FIG. 30 may be modified such that the terminal b of the switch SW1 is connected to the ground potential GND and the terminal a of the switch SW2 is connected to the supply line of the voltage Vcc. In a third respect, the voltage generation circuit 420 may generate a negative-polarity selection voltage instead of a positive-polarity selection voltage. Therefore, in this second embodiment, the voltage generation circuit 420 may be constructed either in the form shown in FIG. 21 or in the form shown in FIG. 22. In a fourth respect, instead of the voltage Vcc, a voltage Vcx may be employed as the nonselection voltage VHP. In this case, the power supply circuit 400 may be formed by modifying the configuration shown in FIG. 23 such that a voltage step-down circuit 450 is disposed between VHP and VHN. Note that in the power supply circuit 400 of the second embodiment, any combination of the first through fourth respects is also allowed.

Modifications of the Second Embodiment

Figure 32:
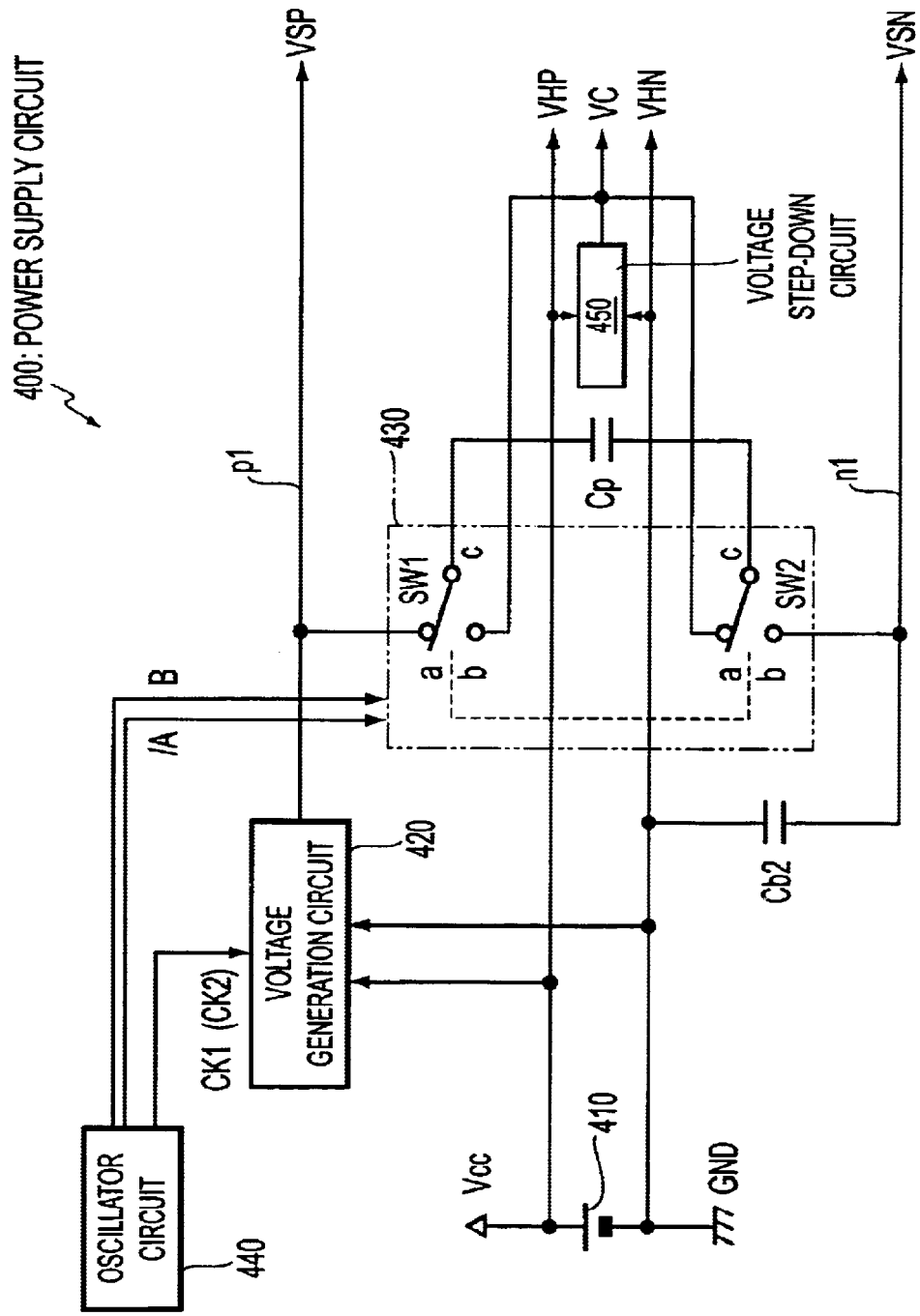
FIG. 32 is a block diagram illustrating a modification of the power supply circuit.

In the power supply circuit 400 shown in FIG. 30, unlike the power supply circuit of the first embodiment, the center voltage VC is actually generated. Therefore, in the inverter circuit 430, it may also be possible to perform the inverting operation with respect to the center voltage VC. More specifically, as shown in FIG. 32, the inverter circuit 430 is constructed in such a manner that the selection terminal b of the switch SW1 and the selection terminal a of the switch SW2 are connected to the supply line for supplying the center voltage VC. In this configuration, when the terminals a of the respective switches SW1 and SW2 are selected, the capacitor Cp is charged such that its one end has a high-level potential equal to the selection voltage VSP and the other end has a low-level potential equal to the center voltage VC. When the terminals b of the respective switches SW1 and SW2 are selected thereafter, the high-potential end of the capacitor Cp is connected to the center voltage VC, and thus, the potential of the low-potential end is lowered by a magnitude equal to the potential shift (VSP–VC) at the high-potential end of the capacitor Cp, from the center voltage VC at which the low-potential end was when the terminals a were selected. As a result, a voltage obtained by inverting the polarity of the positive selection voltage VSP with respect to the center voltage VC, that is, the negative-polarity selection voltage VSN, appears on the potential of the supply line n1 connected to the low-potential end of the capacitor Cp.

In the circuit configuration for polarity inversion with respect to the center voltage VC, the configuration in the above-described respects except for the second respect may be modified. That is, in this modification of the second embodiment, the power supply circuit 400 may also be constructed by combining the first respect associated with the type of the voltage generation circuit 420, the third respect in which the negative-polarity selection voltage is generated by the voltage generation circuit 420 instead of the positive-polarity selection voltage, and the fourth respect in which the voltage Vcx is employed instead of Vcc as the non-selection voltage VHP.

Third Embodiment

In the first and second embodiments described above, the power supply circuit is applied to the electro-optical device in which the scanning lines (scanning electrodes) are sequentially selected one by one. However, this type of electro-optical devices generally need a high voltage for the selection voltage applied to the selection scanning lines.

In view of the above, the third embodiment is concerned with an electro-optical device and a power supply circuit therefor, in which the selection voltage is reduced by employing a scanning method called multi-line selection. In the multi-line selection method, scanning electrodes are selected on a group-by-group basis, wherein each group includes a predetermined plural number of scanning electrodes. In this method, each group of scanning electrodes is selected a plurality of time in each vertical scanning period.

Figure 33:
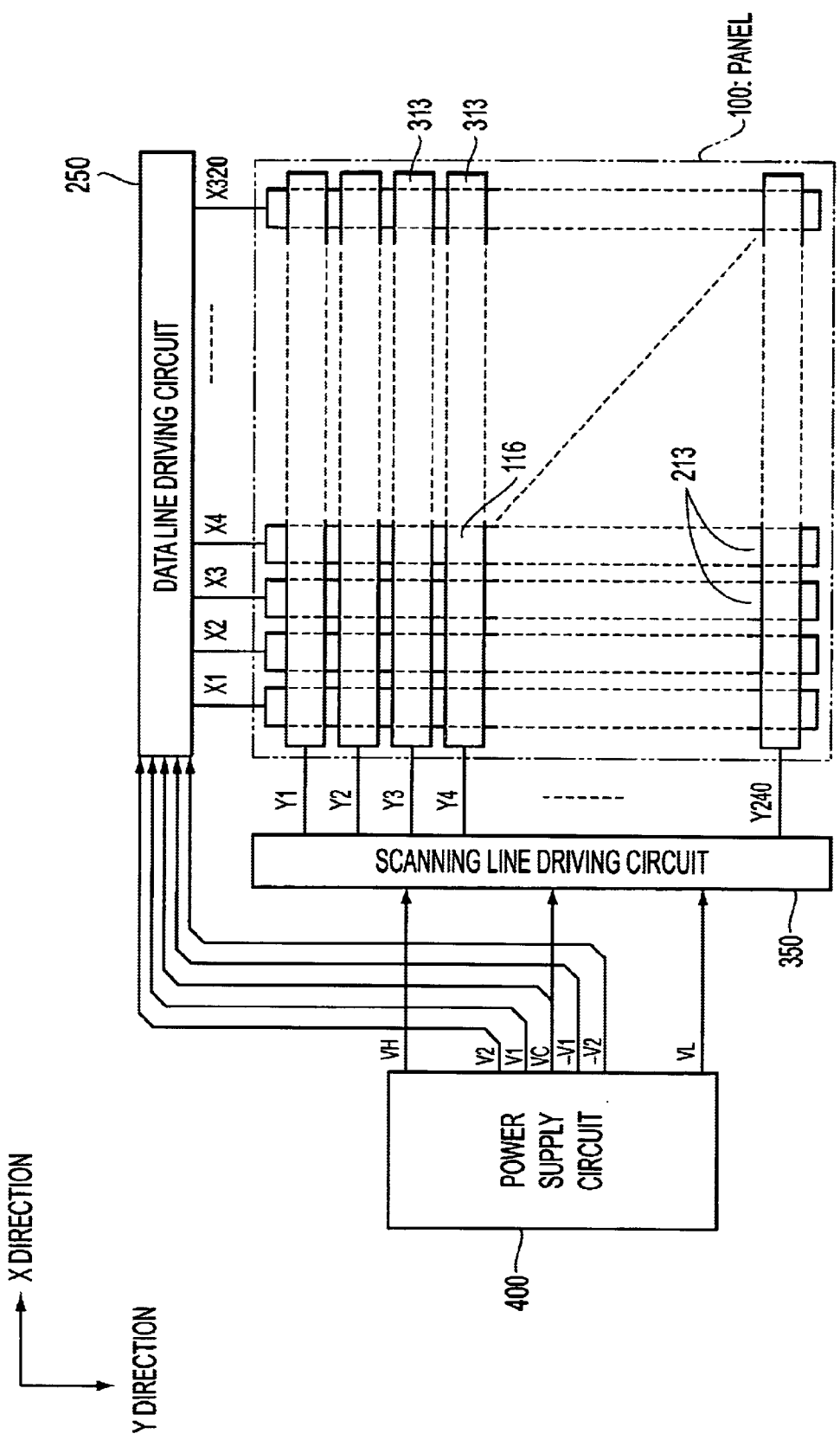
FIG. 33 is a block diagram illustrating the general configuration of an electro-optical device including a power supply circuit according to a third embodiment of the present invention.

FIG. 33 is a block diagram illustrating the electrical configuration of the electro-optical device. The electro-optical device shown in FIG. 33 is similar to that shown in FIG. 25 in that the panel 100' does not include switching elements similar to the TFDs 220, and scanning electrodes 313 and data electrodes 213 simply extend in the row and column directions, respectively. However, there is a difference in that the power supply circuit 400 supplies three different voltages VH, VC, and VL to the scanning line driving circuit 350 and five voltages±V2, ±V1, and VC to the data line driving circuit 250.

Figure 34:
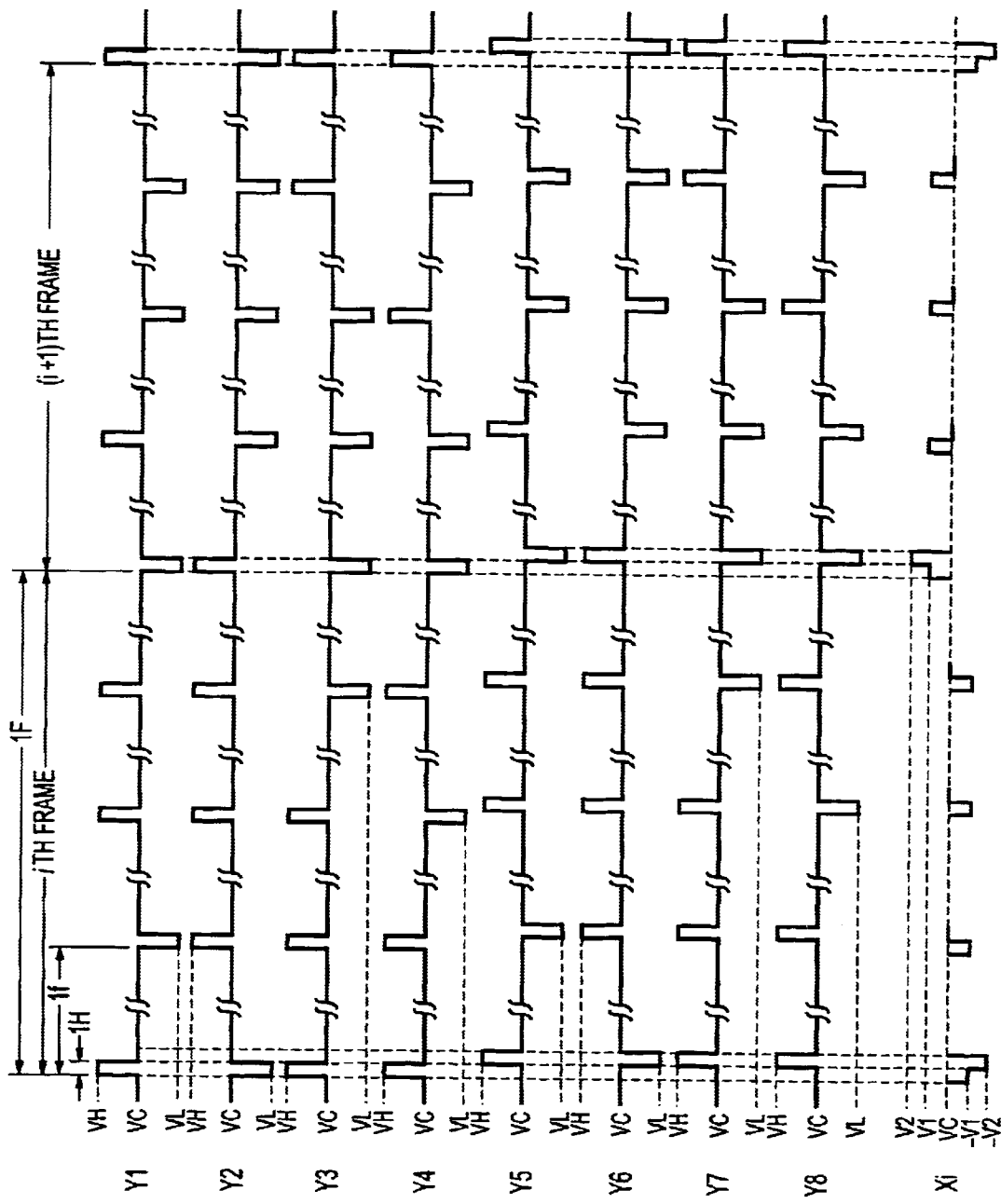
FIG. 34 is a waveform diagram illustrating an example of a driving signal waveform used in the electro-optical device.

This difference is required to drive the electro-optical device using driving signals having waveforms such as those shown in FIG. 34. As shown in FIG. 34, the scanning signals Y1, ... applied to the respective scanning electrodes 313 can have one of the following three values selection voltages VH and VL; and a non-selection voltage VC. On the other hand, the data signals X1, ... applied to the respective data electrodes 213 can have one of the following five values:±V2;±V1; and VC.

In the multi-selection methods, as shown in FIG. 34, each frame (1F) is divided into four equal fields, and four scanning electrodes 313 are selected at a time in each field (1f), wherein selection voltages applied in each selection period are determined such that they become normal and orthogonal. Herein, selection voltages applied to the scanning electrodes are said to be "normal" when they are all equal in effective value during one frame period. On the other hand, they are said to be "orthogonal" when the sum of products of the amplitude of a voltage applied to a particular scanning electrode and the amplitude of voltage applied to another arbitrary scanning electrode becomes 0 when the sum of products are taken for one frame period.

For example, the data signal Xi applied to the ith data electrode 213 is determined as follows. First, a status parameter indicating the pixel status and the status of the scanning voltage is introduced such that, when the selection voltage associated with a selected scanning electrode 313 is positive (VH), the status parameter is set to "1", but the status parameter is set to "−1" when the selection voltage is negative (VL), and such that, when the pixel 116 at the intersection between the selected scanning electrode 313 and the ith data electrode 213 is in the off-state, the status parameter is set to "−1", but it is set to "1" if that pixel is in the on-state. Second, the number of pixel status parameters whose value is different from the parameter value indicating the status of the selection voltage is determined by making comparison for four pixels 116 which intersect with the four respective scanning electrodes which are selected at a time. If the number of pixel status parameters having different values is 4, then the data signal Xi is set to V2, if 3, then to V1, if 2, then to VC, if 1, then to V1, and if 0, then to –V2.

In the specific example shown in FIG. 34, the value of the data signal Xi is determined for a particular case where eight pixels 116 at intersections between the ith data electrode 213 and the scanning electrodes Y1–Y8 are in "ON", "ON", "ON", ON", "ON", "OFF", ON", and "ON", states, respectively.

In the embodiment described above, the selection voltage is applied in a scattered fashion in terms of time. Alternatively, the selection voltage may be applied in a successive fashion in terms of time. Furthermore, the number of scanning electrodes which are selected at a time is not limited to 4, but may be equal to 2, 3, 7, or another value. However, note that the number of data signal voltage levels should be modified depending on the number of scanning electrodes which are selected at a time.

Power Supply Circuit

Figure 35:
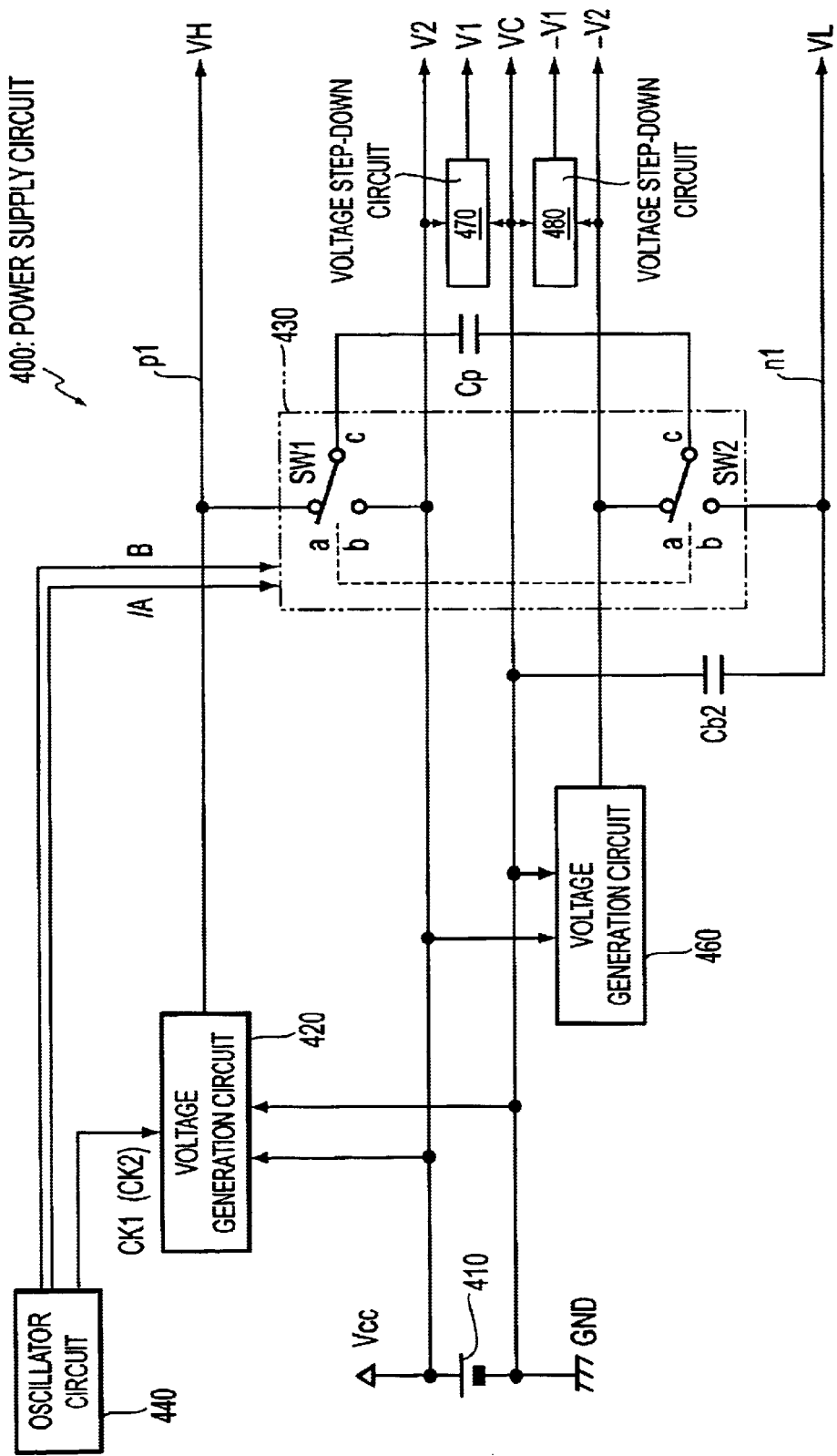
FIG. 35 is a block diagram illustrating the configuration of the power supply circuit in the electro-optical device.

The power supply circuit according to the third embodiment of the present invention is now described below. FIG. 35 is a block diagram illustrating the general configuration of the power supply circuit 400.

In this third embodiment, the power supply circuit receives a voltage Vcc and a ground potential GND from a single power supply 410, and directly outputs the voltages Vcc and GND as a voltage V2 to be used as a data signal voltage and VC, respectively. Note that in the present embodiment, the center voltage VC of data signals is not equal to Vcc/2 as in the first and second embodiments, but equal to the ground potential GND. That is, in the present embodiment, the polarity is defined with respect to a value difference from that employed in the first and second embodiment.

A voltage generation circuit 460 generates a voltage–V2 (=–Vcc) by inverting the polarity of Vcc–GND into a negative polarity. More specifically, the voltage generation circuit 460 may generate the voltage–V2 in a manner similar to the voltage generation circuit 420 shown in FIG. 21 or 22. Alternatively, the voltage–V2 may be generated by first storing a voltage (V2–VC) in a capacitor and then switching the connection of the V2-end of the capacitor to the voltage supply line VC, thereby inverting the voltage into a negative polarity with respect to the center voltage VC. The voltage–V2 may also be generated using an operational amplifier. A voltage step-down circuit 470 generates a voltage V1(=Vcc/2) equal to one-half the voltage difference between Vcc and GND. Similarly, a voltage step-down circuit 480 generates a voltage –V1(=–Vcc/2) equal to one-half the voltage difference between GND and –V2.

A voltage generation circuit 420 generates a positive-polarity selection voltage VH from Vcc–GND supplied from the power supply 410. More specifically, the voltage generation circuit 420 may generate the voltage VH in a similar manner to the voltage generation circuit 420 shown in FIG. 6 or 8, or may generate the voltage VH by means of polarity inversion using a capacitor. The voltage VH may also be generated using an operational amplifier. Note that the selection voltage VH is not required to be as high as the selection voltage VSP. In an inverter circuit 430, a selection terminal a of a switch SW2 is connected to a voltage supply line for supplying the voltage–V2 so that the negative-polarity selection voltage VL is generated by inverting the polarity of the positive-polarity selection voltage VH with respect to the center voltage VC.

Thus, in this power supply circuit 400, the selection voltage VH having a positive polarity with respect to the center voltage VC of data signals is first generated by the voltage generation circuit 420, and then inverted in polarity by the inverter circuit 430, thereby generating the negative-polarity selection voltage VL and also five different voltages used as data signal voltages required in the multi-line selection method.

The third embodiment (and also modifications thereof) is similar to the first or second embodiment in the other respects. That is, in a first respect, the voltage generation circuit 420 of the third embodiment may be constructed either in the form of the first type (FIG. 6) or in the form of the second type (FIG. 8). In a second respect, the voltage used by the inverter circuit 430 for polarity inversion may be selected in a similar manner as in the first or second embodiment. That is, instead of the configuration shown in FIG. 35, the terminal b of the switch SW1 may be connected to the voltage supply line for V2, and the terminal a of the switch SW2 may be connected to the voltage supply line for Vcc. In a third respect, the voltage generation circuit 420 may generate a negative-polarity selection voltage instead of a positive-polarity selection voltage. Therefore, in this third embodiment, the voltage generation circuit 420 may be constructed either in the form shown in FIG. 21 or in the form shown in FIG. 22. In a fourth respect, a voltage Vcx different from Vcc may be employed as the voltage V2, and this voltage Vcx may be inverted into a negative polarity with respect to the center voltage VC, thereby generating the voltage–V2. Note that in the power supply circuit 400 of this third embodiment, any combination of the first through fourth respects is also allowed.

Modifications of Third Embodiment

Figure 36:
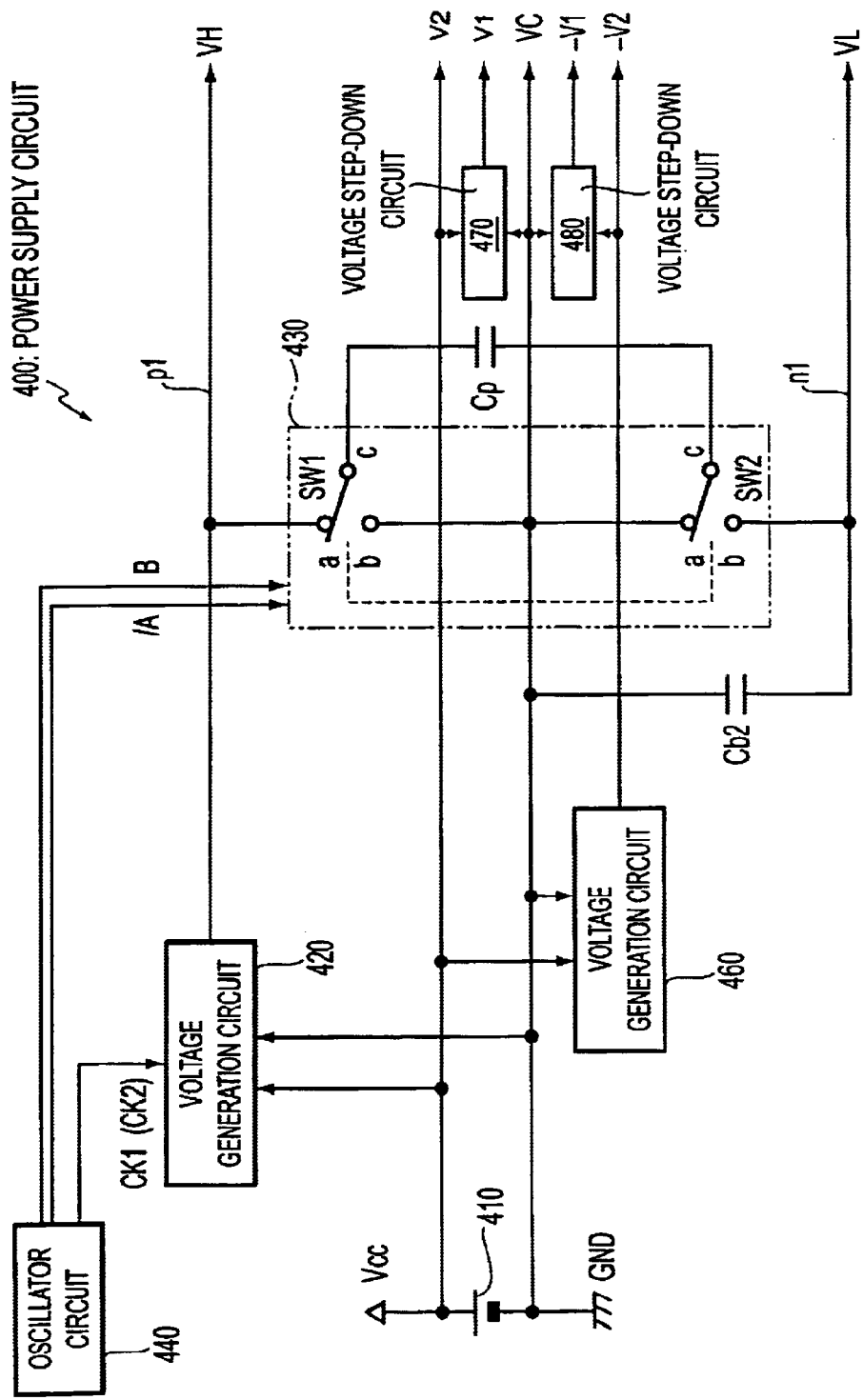
FIG. 36 is a block diagram illustrating a modification of the power supply circuit.

In the power supply circuit 400 shown in FIG. 35, like the power supply circuit of the second embodiment, the center voltage VC is actually generated. Therefore, in the inverter circuit 430, it may also be possible to perform the inverting operation with respect to the center voltage VC. More specifically, as shown in FIG. 36, the inverter circuit 430 is constructed in such a manner that the selection terminal b of the switch SW1 and the selection terminal a of the switch SW2 are connected to the voltage supply line for supplying the center voltage VC. In this configuration, when the terminals a of the respective switches SW1 and SW2 are selected, the capacitor Cp is charged such that its one end has a high-level potential equal to the selection voltage VH and the other end has a low-level potential equal to the center voltage VC. When the terminals b of the respective switches SW1 and SW2 are selected thereafter, the high-voltage end of the capacitor Cp is connected to the center voltage VC, and thus the potential of the low-potential end is lowered, by a magnitude equal to the potential shift (VH–VC) at the high-potential end of the capacitor Cp, from the center voltage VC at which the low-potential end was when the terminals a were selected. As a result, the potential of the supply line n1 connected to the low-potential end of the capacitor Cp becomes equal to a voltage obtained by inverting the positive-polarity selection voltage VH with respect to the center voltage VC. Thus, the negative-polarity selection voltage VL is obtained.

In the circuit configuration for polarity inversion with respect to the center voltage VC, the configuration in the above-described respects except for the second respect may be modified. That is, the power supply circuit 400 of this third embodiment may also be constructed by combining the first respect associated the type of the voltage generation circuit 420, the third respect in which the negative-polarity selection voltage is generated by the voltage generation circuit 420 instead of the positive-polarity selection voltage, and the fourth respect in which the voltage Vcx is employed as V2 instead of Vcc.

In the electro-optical devices shown in FIGS. 35 and 36, although not discussed above, the partially displaying mode is also possible. In this case, the display control signal PD is supplied to the data line driving circuit 250, the scanning line driving circuit 350, and the power supply circuit 400, thereby controlling them in a similar manner to the second embodiment.

In the first, second, and third embodiments described above, the display device using a liquid crystal as the electro-optical material is described as an example of the electro-optical device. The invention may also be applied to a wide variety of devices using an electro-optical effect, such as an electroluminescence device, a fluorescent display tube, and a plasma display. That is, the present invention is applicable to any electro-optical device having a configuration similar to any of those disclosed above.

Electronic Equipment

Figure 37:
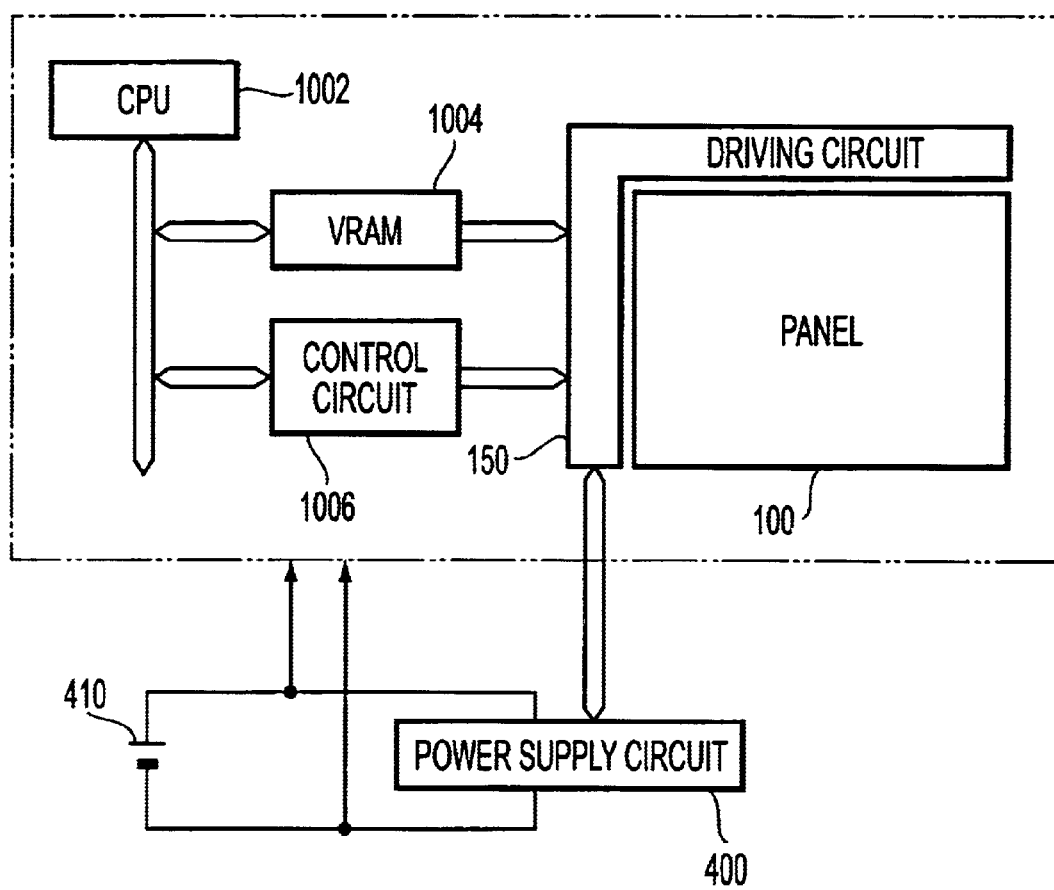
FIG. 37 is a block diagram illustrating the general configuration of an electronic equipment using an electro-optical device according to an embodiment of the invention.

The electro-optical device described above may be applied to a portable-type electronic equipment, as described below. FIG. 37 illustrates the general configuration of the electronic equipment. In FIG. 37, a CPU (central processing unit) 1002 controls various parts of the electronic equipment via a bus. A VRAM 1004 has storage areas corresponding, in a one-to-one fashion, to the respective pixels of a panel 100. Data to be displayed is written by the CPU 1002 into the VRAM 1004 in a random fashion, and then read out from the VRAM in a sequential fashion, depending on the scanning direction. A control circuit 1006 generates various timing signals required to drive the panel 100, and supplies the resultant timing signals to a driving circuit 150. The driving circuit 150 includes the data line driving circuit 250 and the scanning line driving circuit 350 described above. A power supply circuit 400 generates, from the voltage supplied by a power supply 410, voltages which are used as scanning signals and data signals in the driving circuit 150. The power supply 410 is also used as a power supply for the electronic equipment. This electronic equipment needs a reduced number of externally mounted components used in the power supply circuit 400, and thus, simplification of the assembly process and a cost reduction can be achieved.

Portable Telephone

Figure 38:
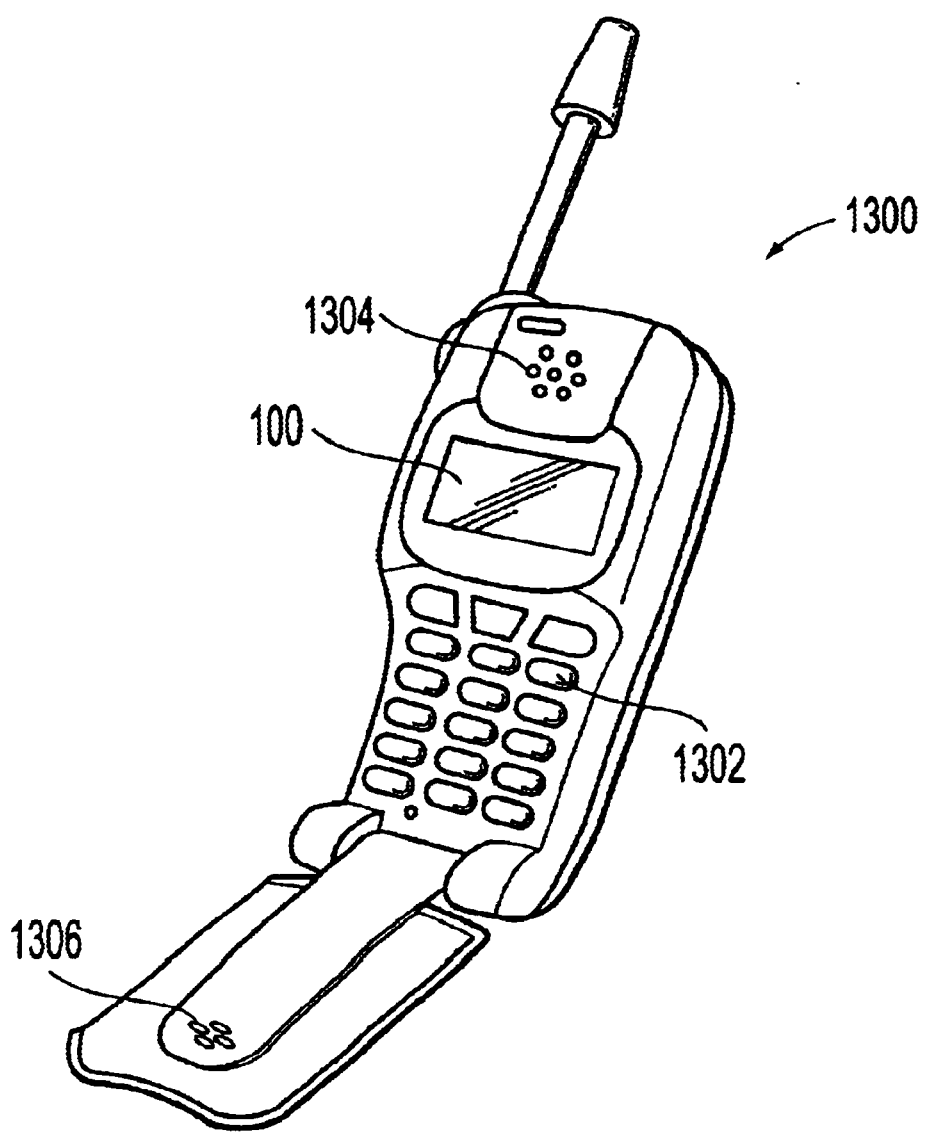
FIG. 38 is a perspective view illustrating the structure of a portable telephone which is an example of an electronic equipment using the electro-optical device.

The display device described above may be applied to a portable telephone as described below. FIG. 38 is a perspective view of the portable telephone. In FIG. 38, the portable telephone 1300 includes a plurality of command buttons 1302, an earpiece 1304, a mouthpiece 1306, and a panel 100. The panel 100 has the capability of operating in the partially displaying mode described above. More specifically, for example, the full area is used for displaying when an incoming call arrives or when an outgoing call is made. In the waiting operation, only necessary information associated with the electric field strength, numbers, characters, or the like is displayed in a limited area, and the other area is set as the non-display area. This allows a reduction in power consumed by the panel 100 during the waiting operation, and thus, the maximum allowable waiting time becomes longer.

The electro-optical device according to the present embodiment may be applied to various electronic equipments in which low power consumption is essentially important, such as a portable telephone as described above, a pager, a watch, and a PDA (Personal Digital Assistant). In addition, the electro-optical device according to the present embodiment may also be applied to other electronic equipments such as a liquid crystal television set, a video tape recorder having a viewfinder or a monitor, a car navigation system, a calculator, a word processor, a work station, a video telephone, a POS terminal, and a device having a touch panel.

As described above, the present invention has the advantage that the number of components such as a voltage storage element and an inductor, which are externally mounted because of difficulty of formation on a semiconductor substrate, can be reduced compared with the number of components required in conventional configurations in which positive and negative selection voltages are generated using a charge pump circuit or a switching regulator. Therefore, simplification of the assembly process and a cost reduction can be achieved.

What is claimed is:

1. A power supply circuit that supplies a potential to an electro-optical device that includes a plurality of scanning lines and a plurality of data lines, said scanning lines crossing said data lines, and said potential serving as a selection voltage for selecting a scanning line from said plurality of scanning lines, said power supply circuit comprising:

a voltage generation circuit that generates one of a selection voltage having a positive polarity and a selection voltage having a negative polarity, defined with respect to a median value of signal voltages applied to said data lines;

a voltage storage element that stores a voltage based on said one selection voltage generated by said voltage generation circuit; and an inverter circuit that inverts the polarity of the voltage stored in said voltage storage element with respect to a predetermined reference value, and that outputs the inverted voltage as another one of said selection voltage having a positive polarity and said selection voltage having a negative polarity, said voltage generation circuit comprising:
a switching element; and
an inductor that stores electric power between a first input potential and a second input potential when said switching element turns on, and that releases the stored electric power when said switching element turns off,
using the electric power released from said inductor, said voltage generation circuit generating said one of the selection voltage having a positive potential and the selection voltage having a negative polarity with respect to the median value of signal voltages applied to said data lines, wherein the inverted voltage is a separately available output as another one of said selection voltage.

2. The power supply circuit, according to claim 1, said voltage generation circuit farther comprising a control circuit that controls a turning-on/off operation of said switching element in accordance with a comparison result of a voltage based on the electric power released from said inductor with respect to a target voltage.

3. The power supply circuit, according to claim 1, a turning-on/off operation of said switching element being controlled in response to a pulse signal.

4. The power supply circuit, according to claim 1, said inverter circuit comprising a voltage storage element having an electrode connected to a voltage terminal that is switched in response to a clock signal.

5. The power supply circuit, according to claim 1, when only a first area covered by some of said plurality of scanning lines is displayed and a second area covered by remaining scanning lines is not displayed, and when a scanning line in said second area is selected, polarity inversion by said inverter circuit not being performed or being performed at a reduced frequency.

6. A power supply circuit that supplies a potential to an electro-optical device that includes a plurality of scanning lines and a plurality of data lines, said scanning lines crossing said data lines, and said potential serving as a selection voltage for selecting a scanning line from said plurality of scanning lines, said power supply circuit comprising:

a voltage generation circuit that generates one of a selection voltage having a positive polarity and a selection voltage having a negative polarity, defined with respect to a median value of signal voltages applied to said data lines;

a voltage storage element that stores a voltage based on said one selection voltage generated by said voltage generation circuit; and an inverter circuit that inverts the polarity of the voltage stored in said voltage storage element with respect to a predetermined reference value, and that outputs the inverted voltage as another one of said selection voltage having a positive polarity and said selection voltage having a negative polarity, said voltage generation circuit comprising a transformer that inputs a pulse signal via a primary side of said transformer, and said voltage generation circuit generating said one of the selection voltage having a positive polarity and the selection voltage having a negative polarity using a voltage output from a secondary side of said transformer, wherein the inverted voltage is a separately available output as another one of said selection voltage.

7. The power supply circuit for an electro-optical device, according to claim 6, said transformer being a piezoelectric transformer that generates mechanical vibration in response to a voltage applied to the primary side of the transformer, that converts said mechanical vibration to a voltage, and that outputs the voltage resulting, from the secondary side.

8. The power supply circuit, according to claim 6, said voltage generation circuit further comprising a control circuit that controls a supply of said pulse signal to the primary side of said transformer in accordance with a comparison result of a voltage based on an output from the secondary side of said transformer with respect to a target voltage.

9. The power supply circuit, according to claim 6, said inverter circuit comprising a voltage storage element having an electrode connected to a voltage terminal that is switched in response to a clock signal.

10. The power supply circuit, according to claim 6, when only a first area covered by some of said plurality of scanning lines is displayed and a second area covered by remaining scanning lines is not displayed, and when a scanning line in said second area is selected, polarity inversion by said inverter circuit not being performed or being performed at a reduced frequency.

11. A driving circuit of an electro-optical device, that drives pixels disposed at intersections between a plurality of scanning lines and a plurality of data lines, said driving circuit comprising:

a power supply circuit that generates a selection voltage having a positive polarity and a selection voltage having a negative polarity, said positive polarity and said negative polarity being defined with respect to a median value of signal voltages applied to said data lines; and a scanning line driving circuit that applies said selection voltage having a positive polarity and said selection voltage having a negative polarity, generated by said power supply circuit, to respective scanning lines in a predetermined order, said power supply circuit comprising:

a voltage generation circuit that generates one of said selection voltages having a positive polarity and said selection voltage having a negative polarity, from a first input potential and a second input potential;

a voltage storage element that stores a voltage based on said one selection voltage generated by said voltage generation circuit; and an inverter circuit that inverts the polarity of the voltage stored in said voltage storage element with respect to a predetermined reference value, and that outputs the inverted voltage as another one of said selection voltage having a positive polarity and said selection voltage having a negative polarity, said voltage generation circuit comprising:

a switching element; and an inductor that stores electric power between the first input potential and the second input potential when said switching element turns on, and that releases the stored electric power when said switching element turns off, said voltage generation circuit generating said one of the selection voltage having a positive polarity and the selection voltage having a negative polarity using the electric power released from said inductor, wherein the inverted voltage is a separately available output as another one of said selection voltage.

12. A driving circuit of an electro-optical device, that drives pixels disposed at intersections between a plurality of scanning lines and a plurality of data lines, said driving circuit comprising:

a power supply circuit that generates a selection voltage having a positive polarity and a selection voltage having a negative polarity, said positive polarity and said negative polarity being defined with respect to a median value of signal voltages applied to said data lines; and a scanning line driving circuit that applies said selection voltage having a positive polarity and said selection voltage having a negative polarity, generated by said power supply circuit, to respective scanning lines in a predetermined order, said power supply circuit comprising:

a voltage generation circuit that generates one of said selection voltage having a positive polarity and said selection voltage having a negative polarity, from a first input potential and a second input potential;

a voltage storage element that stores a voltage based on said one selection voltage generated by said voltage generation circuit; and an inverter circuit that inverts the polarity of the voltage stored in said voltage storage element with respect to a predetermined reference value, and that outputs the inverted voltage as another one of said selection voltage having a positive polarity and said selection voltage having a negative polarity, said voltage generation circuit comprising a transformer that inputs a pulse signal via a primary side of said transformer, and said voltage generation circuit generating said one of the selection voltage having a positive polarity and the selection voltage having a negative polarity using a voltage output from a secondary side of said transformer, wherein the inverted voltage is a separately available output as another one of said selection voltage.

13. A method of driving an electro-optical device, for driving pixels disposed at intersections between a plurality of scanning lines and a plurality of data lines, said method comprising:

a first step of turning on and turning off a switching element such that, when said switching element is turned on, electric power is stored in an inductor between a first input potential and a second input potential, and when said switching element is turned off, the electric power stored in said inductor is released, thereby generating one of a selection voltage having a positive polarity and a selection voltage having a negative polarity with respect to a median value of signal voltages supplied to said data lines and thereby storing a voltage based on said one selection voltage; and a second step of inverting the polarity of said voltage stored in said first step, with respect to a predetermined value, and outputting the inverted voltage as another one of said selection voltage having a positive polarity and said selection voltage having a negative polarity, selection voltages generated in said first and second steps being applied to respective scanning lines in a predetermined order, wherein the inverted voltage is a separately available output as another one of said selection voltage.

14. A method of driving an electro-optical device, for driving pixels disposed at intersections between a plurality of scanning lines and a plurality of data lines, said method comprising:

a first step of inputting a pulse signal to a primary side of a transformer, and generating, using a voltage output from a secondary side of said transformer, one of a selection voltage having a positive polarity and a selection voltage having a negative polarity with respect to a median value of signal voltages supplied to said data lines, and storing a voltage based on said one selection voltage; and a second step of inverting the polarity of said voltage stored in said first step, with respect to a predetermined value, and outputting the inverted voltage as another one of said selection voltage having a positive polarity and said selection voltage having a negative polarity, selection voltages generated in said first step and said second step being applied to respective scanning lines in a predetermined order, wherein the inverted voltage is a separately available output as another one of said selection voltage.

15. An electro-optical device comprising:

pixels disposed at intersections between a plurality of scanning lines and a plurality of data lines;

a power supply circuit that generates a selection voltage having a positive polarity and a selection voltage having a negative polarity, said positive polarity and said negative polarity being defined with respect to a median value of signal voltages supplied to said data lines; and a scanning line driving circuit that applies said selection voltage having a positive polarity and said selection voltage having a negative polarity, generated by said power supply circuit, to respective scanning lines in a predetermined order, said power supply circuit comprising:
a voltage generation circuit that generates one of said selection voltage having a positive polarity and said selection voltage having a negative polarity, from a first input potential and a second input potential;
a voltage storage element that stores a voltage based on said one selection voltage generated by said voltage generation circuit; and
an inverter circuit that inverts the polarity of the voltage stored in said voltage storage element with respect to a predetermined reference value, and that outputs the inverted voltage as another one of said selection voltage having a positive polarity and said selection voltage having a negative polarity,
said voltage generation circuit comprising:
a switching element; and
an inductor that stores electric power between the first input potential and the second input potential when said switching element turns on, and that releases the stored electric power when said switching element turns off,
said voltage generation circuit generating said one of the selection voltage having the positive polarity and the selection voltage having a negative polarity using the electric power released from said inductor, wherein the inverted voltage is a separately available output as another one of said selection voltage.

16. An electronic equipment comprising the electro-optical device according to claim 15, said electro-optical device serving as a display unit.

17. An electro-optical device comprising:

pixels disposed at intersections between a plurality of scanning lines and a plurality of data lines;

a power supply circuit that generates a selection voltage having a positive polarity and a selection voltage having a negative polarity, said positive polarity and said negative polarity being defined with respect to a median value of signal voltages supplied to said data lines; and a scanning line driving circuit that applies said selection voltage having a positive polarity and said selection voltage having a negative polarity, generated by said power supply circuit, to respective scanning lines in a predetermined order, said power supply circuit comprising:
a voltage generation circuit that generates one of said selection voltages having a positive polarity and said selection voltage having a negative polarity, from a first input potential and a second input potential;
a voltage storage element that stores a voltage based on said one selection voltage generated by said voltage generation circuit; and
an inverter circuit that inverts the polarity of the voltage stored in said voltage storage element with respect to a predetermined reference value, and that outputs the inverted voltage as another one of said selection voltage having a positive polarity and said selection voltage having a negative polarity,
said voltage generation circuit comprising a transformer that inputs a pulse signal via a primary side of said transformer, and said voltage generation circuit generating said one of the selection voltage having a positive potential and the selection voltage having a negative polarity using a voltage output from a secondary side of said transformer, wherein the inverted voltage is a separately available output as another one of said selection voltage.

18. An electronic equipment comprising the electro-optical device according to claim 17, said electro-optical device serving as a display unit.

19. An electro-optical device comprising:

pixels disposed at intersections between a plurality of scanning lines and a plurality of data lines; and a power supply circuit that generates a selection voltage having a positive polarity and a selection voltage having a negative polarity, said positive polarity and said negative polarity being defined with respect to a median value of signal voltages supplied to said data lines, said power supply circuit comprising:

a voltage generation circuit that generates one of the selection voltage having a positive polarity and the selection voltage having a negative polarity from a first input potential and a second input potential using an inductor or a transformer driven in response to a pulse signal;

a voltage storage element that stores a voltage based on said one selection voltage generated by said voltage generation circuit; and an inverter circuit that inverts the polarity of the voltage stored in said voltage storage element with respect to a predetermined reference value, and that outputs the inverted voltage as another one of said selection voltage having a positive polarity and said selection voltage having a negative polarity, when only a first area covered by some of said plurality of scanning lines is displayed and a second area covered by remaining scanning lines is not displayed, and when a scanning line extending in said second area is selected, polarity inversion by said inverter circuit not being performed or being performed at a reduced frequency, wherein the inverted voltage is a separately available output as another one of said selection voltage.

20. An electronic equipment comprising the electro-optical device according to claim 19, said electro-optical device serving as a display unit.

* * * * *